United States Patent
Someya et al.

[11] Patent Number: 5,920,654
[45] Date of Patent: Jul. 6, 1999

[54] IMAGE PROCESSING SYSTEM THAT INCLUDES DISCRIMINATION OF AN INTERPOLATION DIRECTION

[75] Inventors: Jun Someya; Kazuhiro Chiba; Kazuyoshi Watabu; Yoshie Yamamoto; Mamoru Inamura; Takeshi Nagayama; Noriko Bamba; Noboru Sunada, all of Nagaokakyo, Japan

[73] Assignee: Mitsubishi Denki Kabushiki Kaisha, Tokyo, Japan

[21] Appl. No.: 08/574,572

[22] Filed: Dec. 14, 1995

Related U.S. Application Data

[63] Continuation of application No. 07/931,198, Aug. 17, 1992, abandoned.

[30] Foreign Application Priority Data

| Aug. 23, 1991 | [JP] | Japan | 3-211802 |
| Sep. 9, 1991 | [JP] | Japan | 3-228934 |
| Sep. 13, 1991 | [JP] | Japan | 3-234741 |
| Sep. 13, 1991 | [JP] | Japan | 3-234742 |
| Feb. 7, 1992 | [JP] | Japan | 4-022694 |

[51] Int. Cl.$^6$ .................................................. G06K 9/36
[52] U.S. Cl. .................................... 382/270; 382/300
[58] Field of Search .................................... 382/270, 276, 382/299, 300; 358/428, 525; 348/448

[56] References Cited

U.S. PATENT DOCUMENTS

| 4,064,484 | 12/1977 | Mese et al. | 382/52 |
| 4,334,244 | 6/1982 | Chan et al. | 358/166 |
| 4,511,989 | 4/1985 | Sakamoto | 358/525 |
| 4,783,698 | 11/1988 | Harney | 358/428 |
| 4,941,045 | 7/1990 | Birch | 348/448 |
| 4,991,021 | 2/1991 | Nikoh et al. | 358/162 |
| 5,093,721 | 3/1992 | Rabii | 348/448 |
| 5,125,042 | 6/1992 | Kerr et al. | 358/428 |
| 5,347,599 | 9/1994 | Yamashita et al. | 382/54 |
| 5,481,311 | 1/1996 | Boie | 348/448 |

FOREIGN PATENT DOCUMENTS

| 0234354 | 9/1987 | European Pat. Off. | G11B 20/18 |
| 0234757 | 9/1987 | European Pat. Off. | H04N 5/21 |
| 61-71773 | 4/1986 | Japan . | |
| 2-131689 | 5/1990 | Japan . | |

OTHER PUBLICATIONS

Signal Processing of HDTV, II, Sep. 1, 6, 7, 1989, pp. 619–631.
Peter Elmer, "The Design of a High Bit Rate HDTV Codec".
Patent Abstracts of Japan, JP–A–02071682, May 30, 1990.
Patent Abstracts of Japan, JP–A–02179184, Dec. 14, 1992.
Patent Abstracts of Japan, JP–A–04223785, Sep. 27, 1990.

*Primary Examiner*—Andrew Johns

[57] ABSTRACT

In an image processing system, an outline correction of image data and a smoothing for noise removal are performed. Generally, the outline correction is performed by emphasizing a high frequency component, and the smoothing is performed by removing the high frequency component. Within one image data, by properly switching the emphasizing and the removal of the high frequency component, while the outline correction is carried out, the noise removal can be performed. An absolute value of a high frequency component Fa extracted from the image data Pi by a first differential filter is compared with a discrimination threshold value K, and depending on the comparison result, either Fa or –Fa as the correction data Fo is selected by a selector and is added to the image data Pi. As a result, when Fo=Fa, the high frequency component is emphasized, and when Fo=–Fa, smoothing is performed. A pixel interpolation and a multi picture formation are also disclosed.

76 Claims, 60 Drawing Sheets

| | P(n-1,m) | | | n-1 LINE |
|---|---|---|---|---|
| P(n,m-2) | P(n,m-1) | P(n,m) | P(n,m+1) P(n,m+2) | n LINE |
| | | P(n+1,m) | | n+1 LINE |
| m-2 COLUMN | m-1 COLUMN | m COLUMN | m+1 COLUMN  m+2 COLUMN | |

0<K<Kmax

K = Kmax

Fig. 23

| abc→<br>def↓ | u0<br>(000) | u1<br>(001) | u2<br>(010) | u3<br>(011) | u4<br>(100) | u5<br>(101) | u6<br>(110) | u7<br>(111) |
|---|---|---|---|---|---|---|---|---|
| d0 (000) | 0 | 0 | 0 | 0 | 0 | 0 | 0 | 0 |
| d1 (001) | 0 | 0 | 0 | 0 | 0 | 0 | 0 | 1 |
| d2 (010) | 0 | 0 | 1 | 1 | 0 | 0 | 1 | 1 |
| d3 (011) | 0 | 0 | 1 | 1 | 0 | 1 | 1 | 1 |
| d4 (100) | 0 | 0 | 0 | 0 | 0 | 0 | 0 | 1 |
| d5 (101) | 0 | 0 | 0 | 1 | 0 | 0 | 1 | 1 |
| d6 (110) | 0 | 0 | 1 | 1 | 0 | 1 | 1 | 1 |
| d7 (111) | 0 | 1 | 1 | 1 | 1 | 1 | 1 | 1 |

◯ : SAMPLE PIXEL

✕ : OMITTED PIXEL

IMAGE PROCESSING SYSTEM THAT INCLUDES DISCRIMINATION OF AN INTERPOLATION DIRECTION

This application is a continuation of application Ser. No. 07/931,198 filed on Aug. 17, 1992, now abandoned.

BACKGROUND OF THE INVENTION i) Field of the Invention

The present invention relates to an image processing system. More particularly, it relates to a first group of embodiments such as an outline correction circuit for correcting an outline of image information; a second group of embodiments such as a signal processing of video or image related devices, particularly, a pixel interpolation circuit and its applied devices for interpolating missed or omitted pixels; third and fourth groups of embodiments such as an interpolation devices for forming or producing missed or omitted data in a processing system of digital image signals or a transmission line, particularly, a pixel interpolation device relating to an image signal processing device such as a video printer or the like; and a fifth group of embodiments such as a multipicture formation device for forming one image from a plurality of reduced images to be used in a video printer, particularly, a multipicture formation device for improving an image quality by using a thinning filter when an image is reduced, in an image processing system.

ii) Description of the Related Arts

FIG. 65 illustrates a conventional outline correction circuit, for example, as disclosed in Japanese Patent Laid-Open No.Sho 61-71773. In FIG. 65, the outline correction circuit includes two registers 100 and 101, four multipliers 102, 103, 104 and 107, two adders 105 and 108 and a factor setting device 106. Input image data Pi are input to the outline correction circuit and output image data Po are output therefrom. In this case, Pi+1 and Pi+2 denote data delayed by one unit time and two unit times, respectively.

FIG. 66 shows a relationship between an input level and output level of the multiplier 107 shown in FIG. 65.

Next, the operation of the outline correction circuit described above will now be described. The input image data Pi are input to the register 100 and the multiplier 102 and are delayed one unit time in the register 100, and the register 100 outputs one unit time delayed image data Pi+1 to the register 101, the multiplier 103 and the adder 108. The register 101 further delays the one unit time delayed image data Pi+1 to output two unit times delayed image data Pi+2 to the multiplier 104. The multiplier 101 multiplies a factor −1 to the image data Pi to output −Pi to the adder 105, and the multiplier 103 multiplies a factor 2 to the image data Pi+1 to output 2(Pi+1) to the adder 105. The multiplier 104 multiplies a factor −1 to the image data Pi+2 to output −(Pi+2) to the adder 105. The adder 105 adds the input data to output an addition result to the multiplier 107 and the factor setting device 106. The multiplier 107 multiplies a multiplication factor sent from the factor setting device 106 to the addition result sent from the adder 105 to output a multiplication result to the adder 108. In this case, the factor setting device 106 outputs the multiplication factor so that the multiplier 107 may keep the relationship between the input and output levels shown in FIG. 66. That is, when the output of the adder 105 is smaller than a predetermined value, the factor setting device 106 considers the input signal to be a noise and outputs a small multiplication factor so as to reduce the output. The adder 108 adds the output of the multiplier 107 to the output of the register 100 to output the outline emphasized image data Po.

In the conventional outline correction circuit, as described above, an outline emphasis to reduce a noise emphasis can be performed. However, a noise removal and a discrimination threshold value adjustment can not be carried out, and thus a preferable image for a user can not be necessarily obtained.

FIG. 67 shows a conventional pixel interpolation circuit, for example, as disclosed in Japanese Patent Laid-Open No.Hei 2-131689. In FIG. 67, the pixel interpolation circuit is comprised of an interpolation data formation circuit 200, a pair of low pass filters (hereinafter referred to as "LPFs") 201a and 201b, a selector circuit 228, a correlative discrimination circuit 229 and a one line delay circuit 230 for delaying the input image data. The interpolation data formation circuit 200 includes registers 207, 208, 209 and 210, adders 211, 212 and 213 and ½ (half) multipliers 214, 215 and 216. The LPF 201a includes registers 202a, 203a and 205a and adders 204a and 206a, and the LPF 201b includes registers 202b, 203b and 205b and adders 204b and 206b. The correlative discrimination circuit 229 includes registers 217, 218, 219 and 220, subtracters 221, 222 and 223, absolute value circuits 224, 225 and 226, and a minimum value discrimination circuit 227.

Next, the operation of the above-described pixel interpolation circuit will now be described. The input image data Pi are input to the one line delay circuit 230 and are delayed one line therein. The input image data Pi are also input to the interpolation data formation circuit 200 and the LPF 201a, and the one one delayed image data output from the one line delay circuit 230 are input to the interpolation data formation circuit 200 and the LPF 201b. In the interpolation data formation circuit 200, by using the registers 207, 208, 209 and 210, the adders 211, 212 and 213 and the half multipliers 214, 215 and 216, for the interpolation pixel, addition averaging values in the upward, downward and inclined directions are calculated as interpolation data.

On the other hand, in the LPF 201a and the LPF 201b, by using the registers 202a, 203a, 205a, 202b, 203b and 205b and the adders 204a, 206a, 204b and 206b, horizontal low frequency components (hereinafter referred to as "horizontal low components") of the respective input image data are picked up and output to the correlative discrimination circuit 229. In the correlative discrimination circuit 229, by using the registers 217, 218, 219 and 220, the subtracters 221, 222 and 223, and the absolute value circuits 224, 225 and 226, differential absolute values in the upward, downward and inclined directions centering around the interpolation pixel are calculated. The calculated differential absolute values are input to the minimum value discrimination circuit 227, and the minimum value discrimination is performed therein. At this time, the direction of the minimum value is the most correlated direction, and thus the selector circuit 228 selects the interpolation data of the most correlated direction from the three outputs of the multipliers 214, 215 and 216 of the interpolation data formation circuit 200 and outputs the selected interpolation data as the output image data Po.

In the conventional pixel interpolation circuit, as described above, relating to an image whose signal frequency band is offset to the low side (hereinafter referred to as "low band image"), a correlative difference among the upward, downward and inclined directions is small, and hence an interpolation result with sufficient effects can not be obtained.

FIG. 68 shows a pixel interpolation device of color signals for use in a conventional video printer. In FIG. 68, the pixel interpolation device comprises a Y/C separation circuit 482 for separating a video signal input from an input terminal 481 into a luminance signal Y and a color signals C, an A/D (analog-digital) converter 483 for converting the separated analog color signal C into digital image data, a thinning switch 484 for thinning the conversion data every pixel, and an image memory 433 for storing the thinned conversion data to be output from an output terminal 485.

Next, the operation of the above-described pixel interpolation device will now be described. In FIG. 68, the analog color signals C separated in the Y/C separation circuit 482 are sampled by a sampling frequency 2 f sc (subcarrier frequency) in the A/D converter 483 to obtain sampled digital signals 512a. FIG. 69 shows a pixel arrangement of the signals 512a, wherein H represents a one pixel interval and V represents one line interval. Then, the signals 512a are thinned every pixel in the thinning switch 484 to obtain signals 512b. Since the thinned signals 512b are resampled signals every sampling clock f sc, the image information is reduced by half, and thus the capacity of the image memory 433 for storing the signals 512b can be reduced by half compared with a case for storing the signals 512a. FIG. 70 shows a pixel arrangement of the signals 512b, wherein X indicates an omitted or missed pixel by the sampling. The image memory 433 stores one frame of the signals 512b at a predetermined timing and outputs from the first line at a predetermined timing. At this time, no particular interpolation calculation for the omitted pixels is not carried out, and the just preceding data as the omitted pixel data can be simply used as it is.

In the conventional pixel interpolation device, as described above, no particular interpolation processing for the omitted pixels is performed and thus the image quality is largely deteriorated. Further, the border lines or outlines of the edges in the inclined direction are jagged.

FIG. 71 shows a conventional multipicture formation device for a vide printer. In FIG. 71, the multipicture formation device is comprised of an image memory 602 for storing one field of video signals input from an input terminal 601 (the video signals constituting one field by ⅟60 sec and two fields by ⅟30 sec and two fields constituting one frame or one picture), a thinning switch 608 for thinning the data read out of the image memory 602, a register 606 for storing one line of data of a multipicture, and a printer 607 for printing the image data.

Next, the operation of the multiImage frame formation device described above will now be described. The video signals input from the input terminal 601 are stored for one field in the image memory 602 at any timing, and in response to a request signal REQ output by the printer 607, the data are read line by line out of the image memory 602 in an interlaced manner. The readout data are thinned to ¼ pixels by the thinning switch 608. As a result, by the above-described operation, as shown in FIG. 72, the data stored in the image memory 602 are thinned to ¼ pixels and ½ line in the horizontal and vertical directions, respectively, to be compressed to ⅟16 picture of data (one field of data are the half of the line numbers of one picture, as described above).

FIG. 73(a) shows a process for forming a multipicture by the compressed data. As shown in FIG. 73(a), one line of data are thinned to ¼ pixels by the thinning switch 608, and the one line of thinned data are then stored into four core areas of the four-divided register 606. The printer 607 successively prints out the data stored in the register 606 as the one line of data and outputs the request signal REQ to the image memory 602 at the same time. The above-described operation is repeated until the one field of data stored in the image memory 602 are output four times to print out the same 16 multipicture, as shown in FIG. 73(b).

In the multipicture formation device, as described above, considerable aliasing noises occur in the thinned image data.

SUMMARY OF THE INVENTION

It is therefore an object of the present invention to provide an image outline correction circuit in view of the aforementioned problems of the prior art, which is capable of performing an outline emphasis and a noise removal and varying a discrimination threshold value of an emphasis.

It is another object of the present invention to provide a pixel interpolation circuit and its applied devices in view of the above-described problems of the prior art, having sufficient effects even in a low band image.

It is a further object of the present invention to provide a pixel interpolation device and its applied devices in view of the above-described problems of the prior art, which is capable of reducing image quality deterioration and smoothly reproducing border lines or outlines of edges in an inclined direction.

It is still another object of the present invention to provide a multipicture formation device in view of the aforementioned problems of the prior art, which is capable of removing aliasing noises while maintaining sharpness of an image.

The first group of the embodiments have the following features.

In the outline correction circuit according to the present invention, the high frequency component of the digital image data quantized by the predetermined sampling frequency is extracted, and the extracted value is compared with the freely set discrimination threshold value so as to discriminate between the noise and the outline. When it is discriminated to be the outline, the high frequency component is added to the original image data to emphasize the outline. When it is discriminated to be the noise, the high frequency component is subtracted from the original image data to remove the noise.

Therefore, in the outline correction of the present invention, either the smoothing by the integral processing of the image data or the emphasizing of the outline by the differential processing is properly selected on the basis of the extracted high frequency component of the image. Hence, the noise removal and the outline emphasizing can be performed at the same time.

In the outline correction circuit according to the present invention, a plurality of high frequency components of the digital image data quantized by the predetermined sampling frequency are extracted by a plurality of extracting means for the outline emphasis and the noise removal, and the extracted values are compared with the freely set discrimination threshold value so as to discriminate between the noise and the outline. When it is discriminated to be the outline, the high frequency component is added to the original image data to emphasize the outline. When it is discriminated to be the noise, the high frequency component is subtracted from the original image data to remove the noise.

Hence, in the outline correction of the present invention, a plurality of high frequency component extraction devices having different characteristics are provided, and by using different high frequency components, the outline emphasis and the noise removal are performed. Thus, the outline correction can be carried out without emphasizing the periodic noise such as the dot disturbance or the like.

In the outline correction circuit according to the present invention, the high frequency component of the digital image data quantized by the predetermined sampling frequency is extracted, and the extracted value is compared with the freely set discrimination threshold value so as to discriminate between the noise and the outline. When it is discriminated to be the outline, after the discrimination threshold value is subtracted from the high frequency component, the high frequency component is added to the original image data to emphasize the outline. When it is discriminated to be the noise, the high frequency component is subtracted from the original image data to remove the noise. The structure of the aforementioned aspects of the present invention can be combined with the structures of the above-described two previous aspects of the present invention.

Accordingly, in the outline correction of the present invention, the subtraction of the high frequency component extracted at the outline emphasis and the discrimination threshold value is carried out. Thus, the processing difference at the border between the outline emphasis and the noise removal can be reduced, and hence a naturally processed image can be obtained.

In the outline correction circuit according to the present invention, any voltage is determined and the determined voltage is quantized to obtain the discrimination threshold value of the outline. Hence, the discrimination threshold value of the outline can be freely set. The construction of the aforementioned aspect of the present invention can be combined with the constructions of the above-described three previous aspects of the present invention.

Hence, in the outline correction of the present invention, user can input a continuous variable discrimination threshold value. Thus, the correction result of the outline can be variable, and the correction can be performed to the preferable outline.

In the outline correction circuit according to the present invention, a plurality of discrimination threshold values are previously stored, and the outline correction is carried out by selecting the suitable discrimination threshold value from the stored discrimination threshold values depending on the purpose. The structure of the aforementioned aspect of the present invention can be combined with the structures of the previously described three previous aspects of the present invention.

Therefore, in the outline correction of the present invention, from the plurality of discrimination threshold values previously stored, the proper discrimination threshold value can be selected depending on the purpose of the user. Hence, the preferable outline correction result can be selected in a simple manner.

The second group of the embodiments have the following features.

In a pixel interpolation circuit according to the present invention, the reference pixels for required the interpolation are extracted every other pixel from the digital image data quantized by the predetermined sampling frequency, and the necessary threshold value for checking the correlativity from the extracted reference pixels is calculated. The threshold value is compared with the reference pixels to perform the binary coding. From the binary coding result, the interpolation directions are determined, and the average of the reference pixels present in the interpolation directions is output as the interpolation result.

In the pixel interpolation of the present invention, the interpolation is properly carried out by using the reference pixel data of every other pixel. Hence, the good interpolation result can be obtained even in the low band image, and the good interpolation result can be obtained at the frequency to be readily recognized.

Also, in the pixel interpolation circuit according to the present invention, a part of the image is extracted from the digital image data quantized by the predetermined sampling frequency, and the reference pixels suitable for the interpolation are selected from the extracted pixels depending on the characteristic of the input image. The necessary threshold value for checking the correlativity is calculated from the selected reference pixels, and the threshold value is compared with the reference pixels to perform the binary coding. From the binary coding result, the interpolation directions are determined, and the average of the reference pixels present in the interpolation directions is output as the interpolation result.

In the pixel interpolation of the present invention, the reference pixels can be selected by the characteristic of the input image data. Hence, the good interpolation results can be obtained in both the low band image and the high band image.

Further, in the pixel interpolation circuit according to the present invention, the reference pixels required for the interpolation are extracted from the input binary image data, and by the combinations of the extracted reference pixels, the interpolation pixels are output.

In the pixel interpolation of the present invention, the reference pixels are directly used as the addresses of the interpolation table. Thus, the good interpolation result can be obtained by the simple structure.

Also, in the pixel interpolation circuit according to the present invention, by discriminating that the interpolation part of the input binary image data is the dummy gradation part or the character part, the interpolation table is switched.

In the pixel interpolation of the present invention, the interpolation table for the dummy gradation part and the interpolation table for the character part are mutually switched (passive). Hence, the good interpolation results can be obtained in both the dummy gradation part and the character part.

In the image transmission device according to the present invention, the uncorrected error pixel data within the error of the received image data detected by the error correction code are corrected in the pixel interpolation circuits described above.

In the image transmission of the present invention, the uncorrected data by the error correction code within the detected data errors can be replaced with the interpolation data. Hence, the image with no data omission can be transmitted.

Also, in the pixel correction device according to the present invention, the output image signals of the CCD image sensor are quantized, and the obtained image data are input to the pixel interpolation circuits described above to calculate the interpolation data. By comparing the interpolation data with the output data of the CCD, the trouble of the CCD is detected, and the omitted data are replaced with the interpolation data.

In the pixel correction of the present invention, the omitted pixels by the trouble of the CCD image sensor can be interpolated. Hence, the error pixels caused in the image sensor are corrected to obtain the good output image, a yield improvement of the CCD sensor can be expected.

Further, in the dropout correction device according to the present invention, the image signals reproduced in the VTR are quantized with the predetermined sampling frequency, and the image data are input to the pixel interpolation circuits described above to calculate the interpolation data. When the dropout is detected in the reproduction of the VTR, the omitted pixels by the dropout are replaced with the interpolation pixels obtained by the pixel interpolation circuit to correct the dropout.

In the dropout correction of the present invention, at the dropout occurrence time, the dropout data are replaced with the interpolation data. Thus, the influence of the dropout given to the image can be reduced to the minimum.

The third group of the embodiments have the following features.

According to the present invention, the pixel interpolation device includes the extraction means for extracting the pixel block around the omitted pixel, the binary coding means for calculating the threshold value using the pixels of the pixel block and performing the binary coding of the pixels of the pixel block on the basis of the threshold value, the interpolation reference pixel selector means for setting directions of the interpolation with respect to the combinations of the pixel arrangements obtained by the binary coding and selecting the interpolation reference pixels corresponding to the set directions, and the interpolation pixel value calculation means for calculating the interpolation pixel value from the selected interpolation reference pixels.

Also, in the pixel interpolation device, as the threshold calculation means, the threshold calculation means for calculating the threshold value by averaging all pixels of the pixel block is used.

Further, the signal processing device includes means for converting the two-dimensional matrix sampled data group to the offset sampled data group, the memory means for storing the offset sampled data group, and the pixel interpolation device for restoring the matrix sampled data group by calculating the interpolation value of the omitted pixels read out of the memory means so as to reduce the memory capacity to the half. As the pixel interpolation device, any of the above-described interpolation devices can be preferably used.

In the image transmission device according to the present invention, on the receiving side of the transmission device for transmitting the image data having the error correction code, the errors of the received data are detected and the uncorrected data are interpolated by the interpolation data calculated by the pixel interpolation device. As the pixel interpolation device, any of the above-described pixel interpolation devices can be preferably used.

Also, the pixel correction device includes the pixel interpolation device, the means for calculating the differential absolute value from the output of the pixel interpolation device and the output of the CCD image sensor, and sensor output replacing means for comparing the calculated differential absolute value with the threshold data input from outside and replacing the output of the image sensor with the interpolation pixel value. As the pixel interpolation device, any of the above-described pixel interpolation devices can be preferably used.

In the third group of the embodiments, the pixel block around the omitted pixel is binary-coded to detect the local change direction of the image, and by the detection result, the interpolation directions are properly switched. Hence, the image quality drop is reduced, and particularly the border lines in the inclined directions can be smoothed.

The fourth group of the embodiments have the following features.

According to the present invention, the pixel interpolation device includes the extraction means for extracting the pixel block around the omitted pixel, the binary coding means for calculating the threshold value from the pixel data of the pixel block and binary-coding the pixels of the pixel block on the basis of the threshold value, the means for selecting the necessary data for the interpolation calculation depending on the binary code data, and the means for calculating the interpolation pixel value from the selected data. The threshold value is the average value of the maximum and minimum values of the pixel data of the pixel block or the average value of the pixel data of the pixel block.

Hence, in the pixel interpolation device according to the present invention, the local change direction of the image is detected by the binary coding of the pixel block around the omitted pixel, and by the detection result, the interpolation reference data are suitably selected so as to reduce the image quality drop. In particular, the border lines in the inclined directions can be smoothed.

Also, the pixel interpolation device according to the present invention is the more simplified device of the above-described pixel interpolation device, and includes the extraction means for extracting the pixel block around the omitted pixel and means for calculating the interpolation pixel value from the data extracted from the pixel data of the pixel block except the maximum and minimum values. The interpolation pixel value is the average value of the pixel data of the pixel block except the maximum and minimum values or any data of the pixel data of the pixel block except the maximum and minimum values.

Therefore, in the pixel interpolation device according to the present invention, since the interpolation pixel data are obtained from the most selected interpolation reference data in the above-described pixel interpolation device, although the image quality is dropped a little compared with the above-described pixel interpolation device, almost the same value can be obtained. Further, since the interpolation pixel value is simply determined without considering the change direction of the image in particular, the circuit scale is largely reduced, and the processing speed becomes fast.

The fifth group of the embodiments have the following features.

In the multipicture formation device according to the present invention, one field of the digital video signals are stored in the memory, and the 16 multipicture is formed from the data stored in the memory. When the data read out of the memory are thinned, the thinning filters such as the horizontal direction digital filter having the transfer characteristic $H(Z)=(1+Z^{-2})^2/4(Z^{-2}$: two pixel delay in space) and the vertical direction digital filter having the following transfer characteristic $H(Z)=(1+Z^{-1})^2/4(Z^{-1}$: one line delay in space) are used.

Also, in the multipicture formation device according to the present invention, the digital video signals are thinned to $\frac{1}{16}$ picture of data, and from the thinned video signals, any 16 reduced pictures are stored in a memory for forming the 16 multipicture. In this case, when thinning the input video signals, the same thinning filters as described above are used.

Hence, in the multipicture formation device according to the present invention, since the thinning filters are used when the data are thinned, the aliasing noise of the thinned data is reduced. Also, in the same 16 multipicture formation device, since the data read out of the memory are thinned by using the thinning filters, the input image data are kept in the memory as it is.

The multipicture formation device according to the present invention includes the same 16 multipicture formation device and the different 16 multipicture formation device and also includes the selector switch for selecting one of these devices.

Therefore, in the multipicture formation device of the present invention, by switching the selector switch, both the same 16 image multipicture and the different 16 image multipicture can be formed.

BRIEF DESCRIPTION OF THE DRAWINGS

The objects, features and advantages of the present invention will become more apparent from the consideration of the following detailed description, taken in conjunction with the accompanying drawings, in which:

FIG. 2 is a schematic view showing a part of quantized digital image data shown in the circuit shown in FIG. 1;

FIG. 23 is a schematic view showing an interpolation table used in a pixel interpolation circuit according to the present invention;

FIG. 31 is a schematic view showing another interpolation table used in a pixel interpolation circuit according to the present invention;

FIG. 46 is a block diagram of an embodiment 3-3 of a pixel interpolation device according to the present invention, applied to a signal processing device having an image memory such as a video printer or the like;

FIGS. 60a, 60b and 60c are schematic diagrams showing frequency characteristics of a horizontal direction LPF shown in FIG. 58;

DESCRIPTION OF THE PREFERRED EMBODIMENTS

Figure 1:
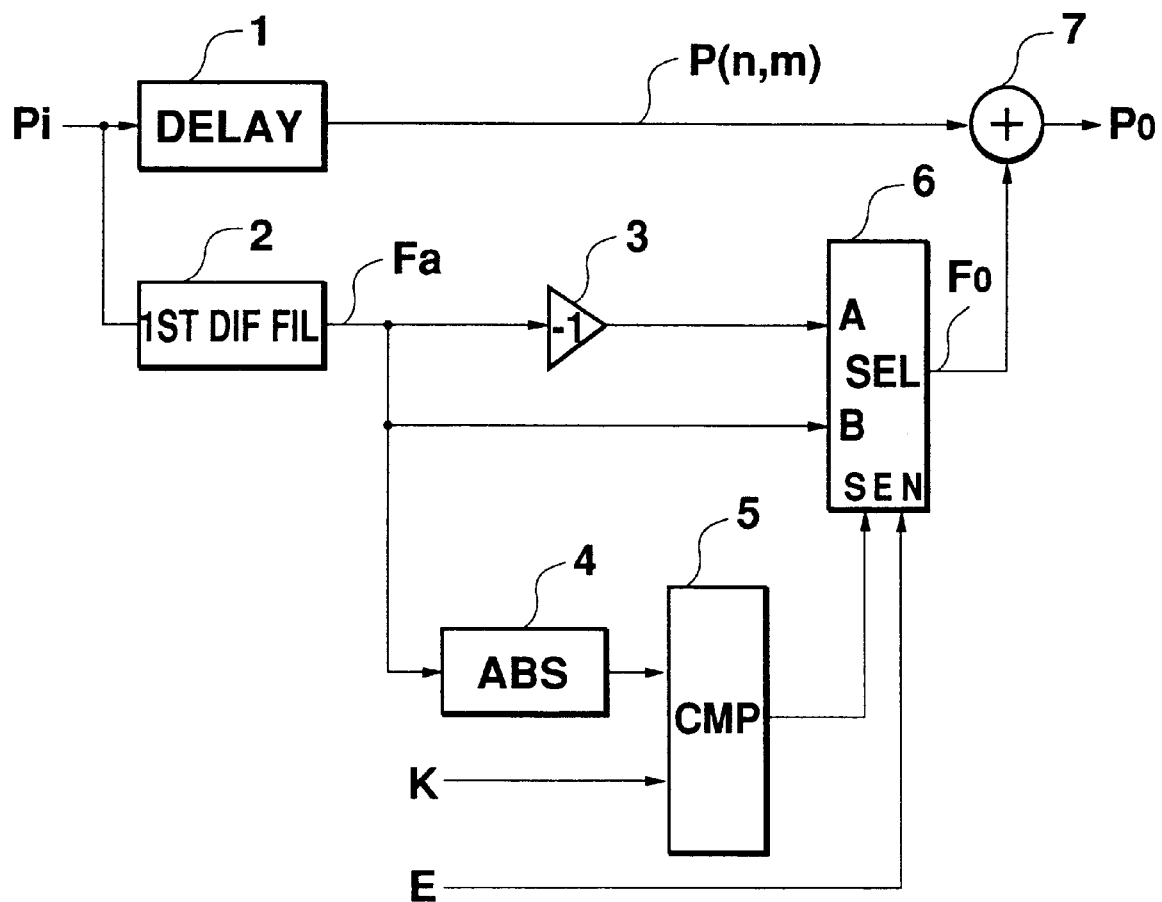
FIG. 1 is a block diagram of an embodiment 1-1 of an outline correction circuit according to the present invention.

The present invention will now be described in connection with five groups of preferred embodiments in an image processing system with reference to the accompanying drawings, wherein like reference characters designate like or corresponding parts throughout the views and thus the repeated description thereof can be omitted for the sake of brevity.

First, the first group of the preferred embodiments of the present invention will be described.

In FIG. 1, there is shown the embodiment 1-1 of an outline correction circuit according to the present invention. As shown in FIG. 1, the outline correction circuit is comprised of a delay circuit 1 for delaying pixel data a predetermined time, a first differential filter 2 for extracting a high frequency component of an image, a multiplier 3 for multiplying −1, an absolute value circuit 4, a comparator 5, a selector 6 for selecting one of two input signals and an adder 7. In FIG. 1, there are also shown input image data Pi, a discrimination threshold value K, an output control signal E for the selector 6, output data Fa of the first differential filter 2, correction data Fo output from the selector 6, outline corrected output image data Po output by the adder 7, and a pointed pixel P(n,m). FIG. 2 shows a part of quantized two-dimensional image data including the pointed pixel P(n,m).

Next, the operation of the outline correction circuit described above will now be described. The input image data Pi are input to the delay circuit 1 and the first differential filter 2. The first differential filter 2 picks up a differential value (the high frequency component of the image) Fa of the pointed pixel P(n,m) and its peripheral pixels. For instance, the high frequency component Fa is represented as follows.

$$Fa = 4P(n,m) - P(n-1,m) - P(n+1,m) - P(n,m-1) - P(n,m+1) \quad (1)$$

The high frequency component Fa is input to the multiplier 3, one input terminal of the selector 6 and the absolute value circuit 4. The multiplier 3 outputs smoothed data −Fa to another input terminal of the selector 6, and the absolute value circuit 4 calculates an absolute value |Fa| (|x| represents an absolute value of x) and outputs it to the comparator 5. The comparator 5 compares the |Fa| with a discrimination threshold value K determined by, for example, a key input, and outputs a control signal for the selector 6. The selector 6 selects either the smoothed data −Fa when the comparison result in the comparator 5 is |Fa|≦K, or outline emphasized data Fa when the comparison result in the comparator 5 is |Fa|>K. The output control signal E for compulsorily making the output of the selector 6 zero is used when no correction is required. The selected data in the selector 6 as the correction data Fo are input to the adder 7, and the adder 7 adds the predetermined time delayed pointed pixel P(n,m) to the correction data Fo to output an addition result as the output image data Po.

Figure 3:
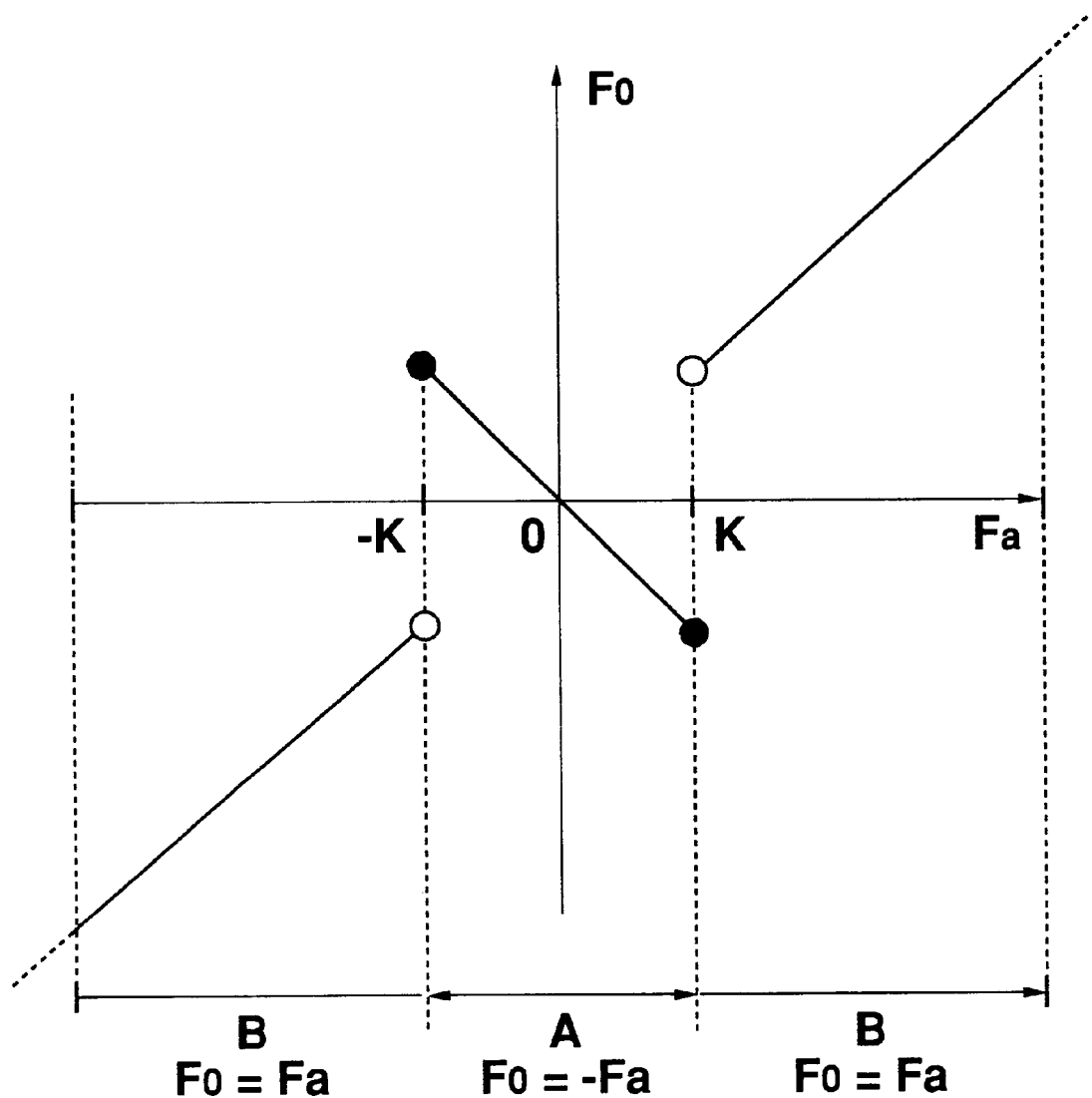
FIG. 3 is a schematic diagram showing a relationship among a high frequency component, correction data and a discrimination threshold value shown in the circuit shown in FIG. 1.

FIG. 3 shows a relationship among the high frequency component Fa, the correction data Fo and the discrimination threshold value K. In FIG. 3, the high frequency component Fa and the correction data Fo are exhibited in the horizontal and vertical axes, respectively. Now, when −K≦Fa≦K in a range A in FIG. 3, since the selector 6 selects the smoothed data −Fa, the correction data Fo are −Fa, and at this time, the output image data Po are expressed as follows.

$$Po = P(n, m) - Fa \quad (2)$$
$$= P(n, m) -$$
$$\{4P(n, m) - P(n - 1, m) - P(n + 1, m) -$$
$$P(n, m - 1) - P(n, m + 1)\}$$

Hence, the image is smoothed. Also, when Fa<−K and Fa>K in ranges B in FIG. 3, the selector 6 selects the outline emphasized data Fa, and Fo=Fa. Thus, at this time, the output image data Po are expressed as follows.

$$Po = P(n, m) + Fa \quad (3)$$
$$= P(n, m) +$$
$$\{4P(n, m) - P(n - 1, m) - P(n + 1, m) -$$
$$P(n, m - 1) - P(n, m + 1)\}$$

Accordingly, the outline of the image is emphasized. Hence, by determining the discrimination threshold value K to a supposed noise level, in an image area, in which the high frequency component is the supposed noise level, the noise removal by the smoothing is carried out, and in the other area, the outline emphasizing is performed. Further, of course, by always performing Fo=0 by using the output control signal E, an image wherein the outline correction is not carried out can be output.

Figure 4:
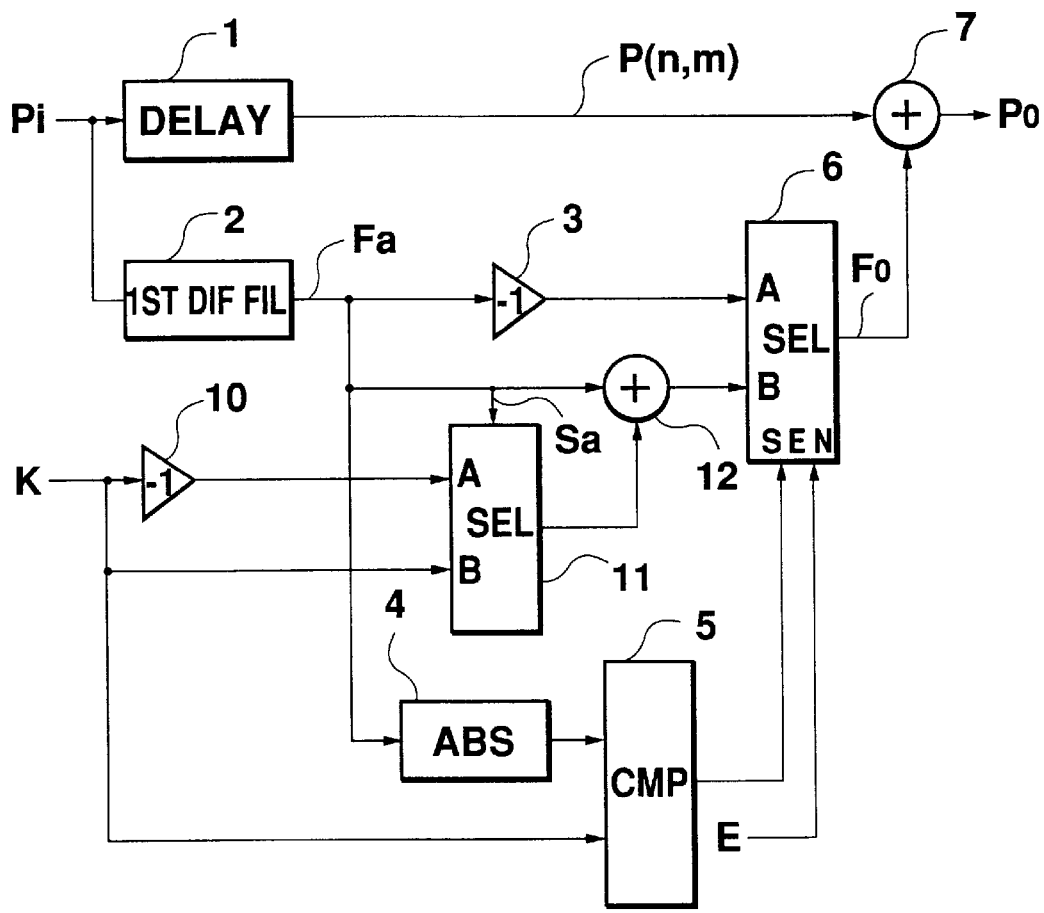
FIG. 4 is a block diagram of an embodiment 1-2 of an outline correction circuit according to the present invention.

In FIG. 4, there is shown the embodiment 1-2 of an outline correction circuit according to the present invention. In this embodiment, in addition to the parts of the embodiment 1-1 shown in FIG. 1, the outline correction circuit further includes a multiplier 10 for multiplying −1, a selector 11 and an adder 12, and a code bit Sa of the high frequency component Fa represents either negative or positive of the high frequency component Fa and is input to the selector 11.

Next, the operation of this outline correction circuit will now be described. The discrimination threshold value K is multiplied by −1 in the multiplier 10 to obtain −K. The obtained −K and the discrimination threshold value K are input to the selector 11, and by the code bit Sa, the selector 11 selects either −K or K. That is, in the selector 11, when the high frequency component Fa is positive, −K is selected, and when the high frequency component Fa is negative, K is selected. The adder 12 adds the output of the selector 11 and the high frequency component Fa and outputs the addition result as the outline emphasized data to the selector 6. The other part of the operation is the same as the embodiment 1-1 and thus can be omitted for the sake of brevity.

Figure 5:
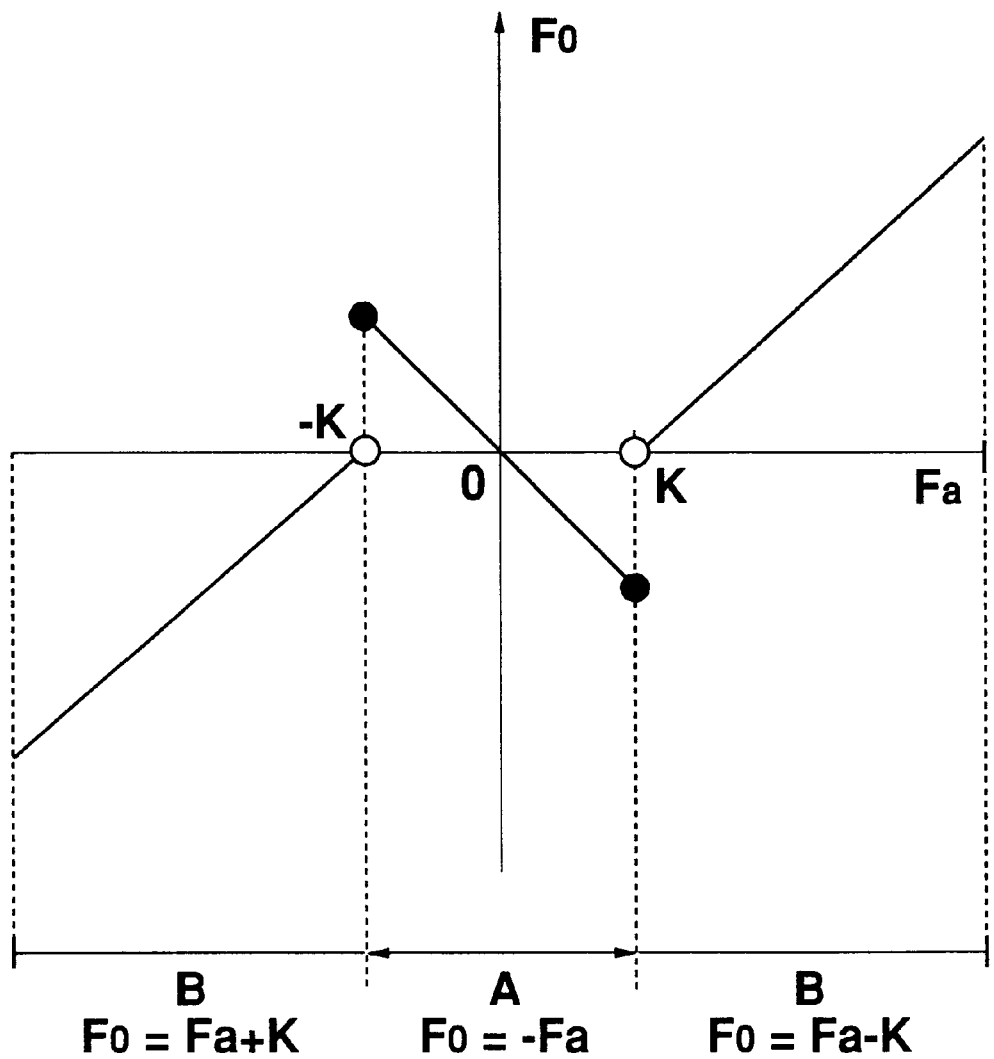
FIG. 5 is a schematic diagram showing a relationship among a high frequency component, correction data and a discrimination threshold value shown in the circuit shown in FIG. 4.

FIG. 5 shows a relationship among the high frequency component Fa, the correction data Fo and the discrimination threshold value K in the embodiment 1-2 shown in FIG. 4. In this embodiment, when −K≦Fa≦K in the range A in FIG. 5, Fo=−Fa in the same manner as the embodiment 1-1, and thus the image is smoothed. Also, when Fa<−K, Fo=Fa−(−K), and when Fa>K, Fo=Fa−K. Thus, the outline of the image is emphasized in the ranges B in FIG. 5. Hence, in this embodiment, the difference of the processing result at the border between the smoothing area and the outline emphasizing area in the image can be decreased compared with the embodiment 1-1, and thus a more natural image can be output.

Figure 6:
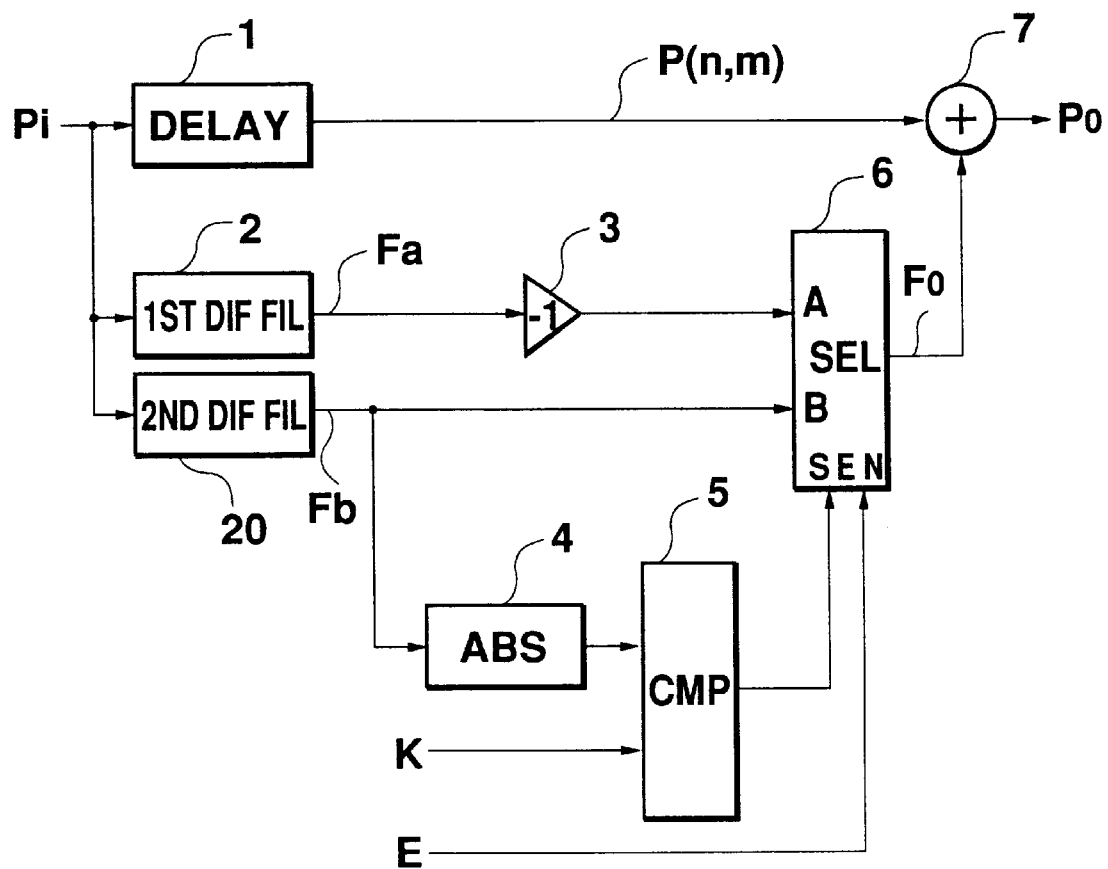
FIG. 6 is a block diagram of an embodiment 1-3 of an outline correction circuit according to the present invention.

In FIG. 6, there is shown the embodiment 1-3 of an outline correction circuit according to the present invention. In this embodiment, a second differential filter 20 for extracting another high frequency component Fb different from the high frequency component Fa of the first differential filter 2 is provided. The input image data Pi are input to the first differential filter 2 and the second differential filter 20. The first differential filter 2 outputs the high frequency component Fa to the selector 6 via the multiplier 3, and the second differential filter 20 outputs the high frequency component Fb to the absolute value circuit 4 and the selector 6.

Next, the operation of this outline correction circuit will now be described. The input image data Pi are input to the delay circuit 1, the first differential filter 2 and the second differential filter 20. The first differential filter 2 extracts the high frequency component Fa. Assuming that P(n,m) in FIG. 2 is the pointed pixel, Fa is represented by formula (1) in the embodiment 1-1. The high frequency component Fa is multiplied by −1 in the multiplier 3 and −Fa is input to the selector 6. Further, the second differential filter 20 picks up the high frequency component Fb. In this embodiment, Fb is expressed as follows.

$$Fb=4P(n,m)-P(n-1,m)-P(n+1,m)-P(n,m-2)-P(n,m+2) \quad (4)$$

That is, the second differential filter 20 calculates the differential value on the basis of the external pixels of the adjacent pixels to the pointed pixel in the horizontal direction. The high frequency component Fb is input to the absolute value circuit 4 and the selector 6. In the comparator 5, an absolute value |Fb| of Fb is compared with a discrimination threshold value K. Based on this comparison result, the selector 6 selects either −Fa or Fa outputs the selected one as the correction data Fo to the adder 7. In the adder 7, the predetermined time delayed pointed pixel P(n,m) is added to the correction data Fo, and the addition result is output as the output image data Po.

Figure 7:
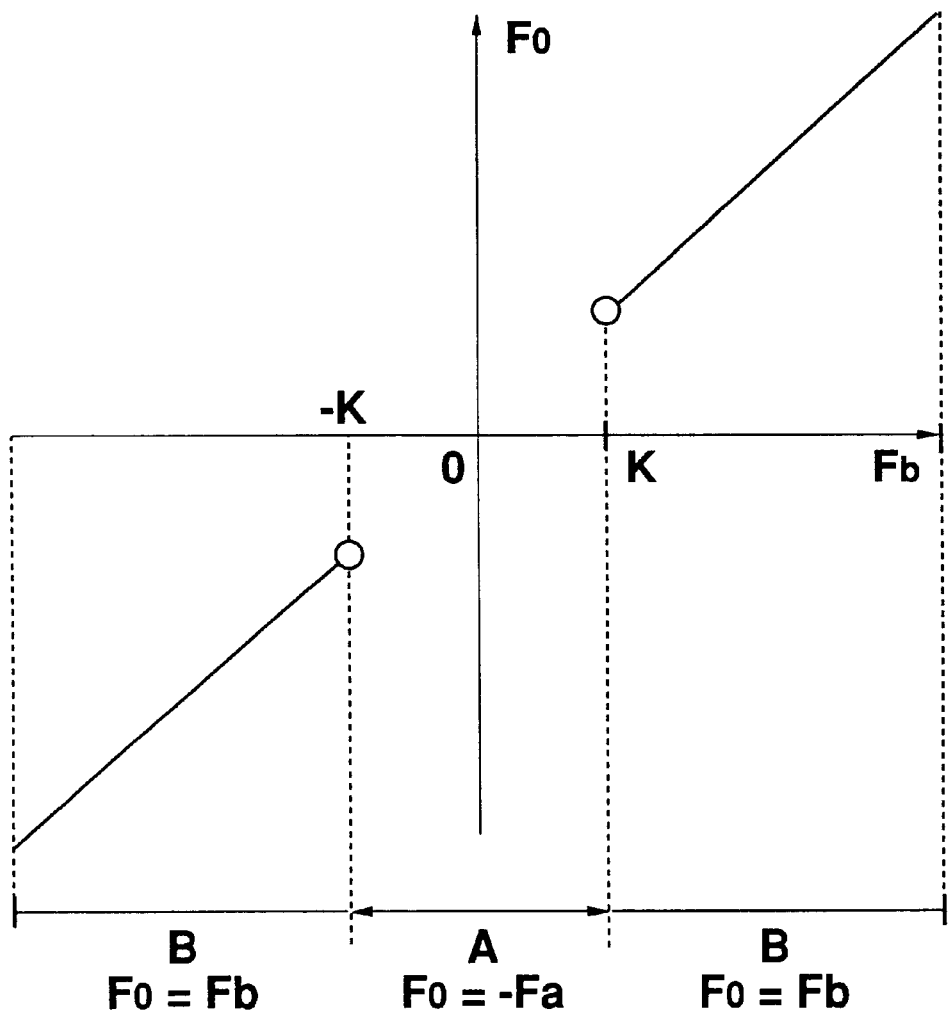
FIG. 7 is a schematic diagram showing a relationship among a high frequency component, correction data and a discrimination threshold value shown in the circuit shown in FIG. 6.

FIG. 7 shows a relationship among the high frequency component Fb, the correction data Fo and the discrimination threshold value K in the embodiment 1-3 shown in FIG. 6. In FIG. 7, the high frequency component Fb and the correction data Fo are exhibited in the horizontal and vertical axes, respectively. In this case, when −K≦Fb≦K in the range A in FIG. 7, the correction data Fo are −Fa, and at this time, the output image data Po are expressed by formula (2). Hence, the image is smoothed. Also, when Fb<−K and Fb>K in the ranges B in FIG. 7, Fo=Fb. Thus, at this time, the output image data Po are expressed as follows.

$$Po = P(n, m) + Fb \tag{5}$$

$$= P(n, m) + \{4P(n, m) - P(n-1, m) - P(n+1, m) - P(n, m-2) - P(n, m+2)\}$$

Thus, the outline of the image is emphasized. Hence, by determining the discrimination threshold value K to a supposed noise level, in an area of the image, in which the high frequency component is the supposed noise level, the noise removal by the smoothing is carried out, and in the other area, the outline emphasizing is performed. For example, when the input image data are obtained by sampling by using a sub-carrier wave having a 4 times of frequency (approximately 14.4 MHz), depending on the images, a dot disturbance can be caused in the adjacent pixels. However, in this embodiment, even in such a case, in the image area where the high frequency component is considered as the noise level, the smoothing of the dot disturbance is performed, and in the other area, the outline emphasizing every other pixel is carried out. Hence, the dot disturbance can not be emphasized, and the outline emphasizing of the image, the noise removal and the dot disturbance removal can be carried out at the same time.

Figure 8:
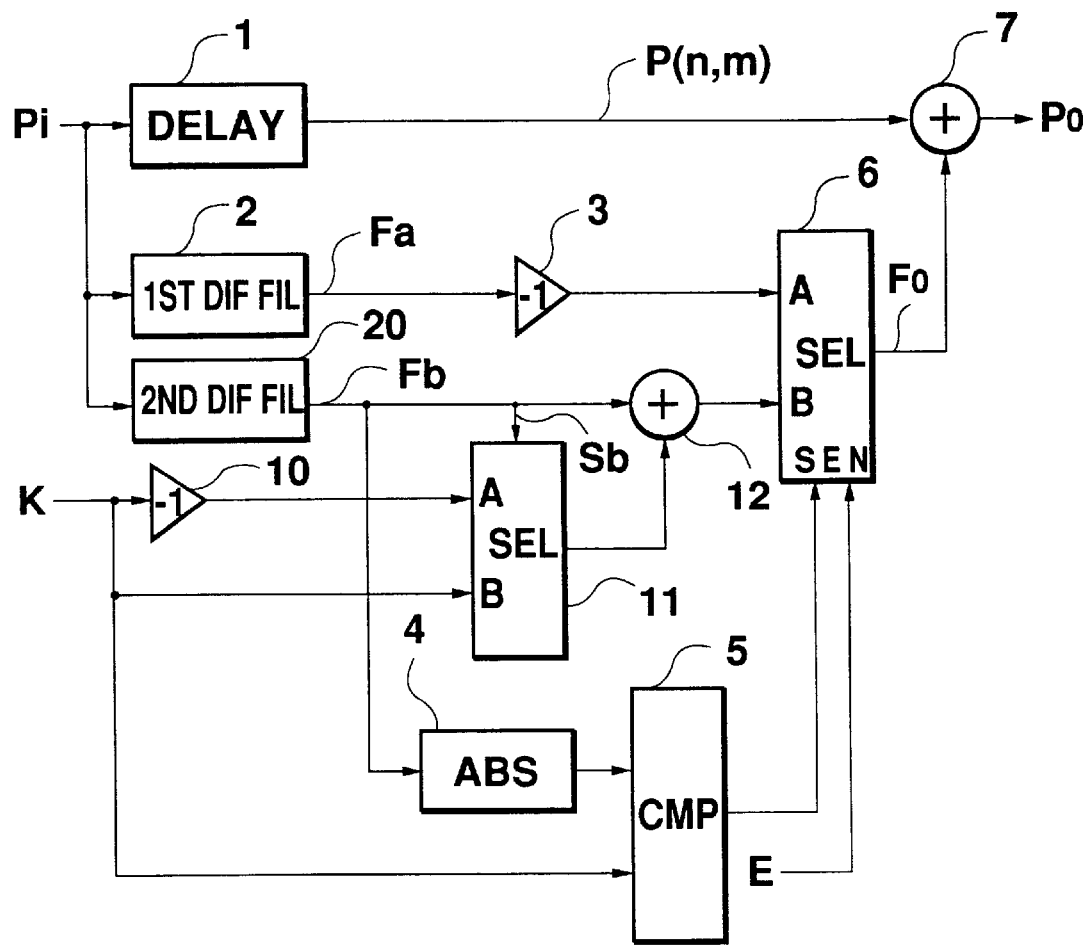
FIG. 8 is a block diagram of an embodiment 1-4 of an outline correction circuit according to the present invention.

In FIG. 8, there is shown the embodiment 1-4 of an outline correction circuit according to the present invention. In FIG. 8, a code bit Sb for representing the negative or positive of the high frequency component Fb is input to the selector 11. In this embodiment, by the code bit Sb of the second differential filter 20, the selector 11 selects either –K or K. That is, this embodiment is a combination of the embodiment 1-2 and the embodiment 1-3.

Next, the operation of this outline correction circuit will now be described. The discrimination threshold value K is multiplied by –1 in the multiplier 10 to obtain –K. Both –K and K are input to the selector 11, and the selector 11 selects either –K or K by the code bit Sb of the high frequency component Fb. The adder 12 adds the output of the selector 11 and the high frequency component Fb and outputs the addition result to the selector 6. The other part of the operation is the same as the embodiment 1-3 described above and thus can be omitted for the sake of brevity.

Figure 9:
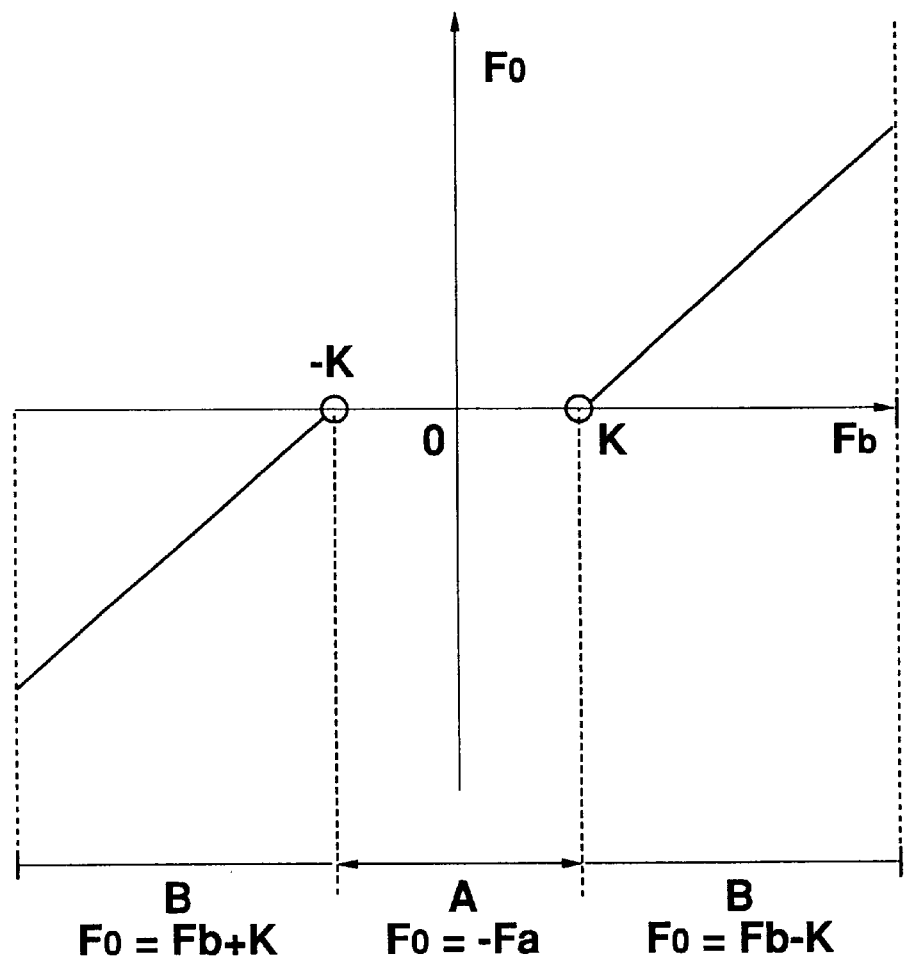
FIG. 9 is a schematic diagram showing a relationship among a high frequency component, correction data and a discrimination threshold value shown in the circuit shown in FIG. 8.

FIG. 9 shows a relationship among the high frequency component Fb, the correction data Fo and the discrimination threshold value K in the embodiment 1-4 shown in FIG. 8. In this embodiment, when –K≦Fb≦K in the range A in FIG. 9, Fo=–Fa in the same manner as the embodiment 1-3, and thus the image is smoothed. Also, when Fb<–K, Fo=Fb–(–K), and when Fb>K, Fo=Fb–K. Thus, the outline of the image is emphasized in the ranges B in FIG. 9. Hence, in this embodiment, the difference of the processing result at the border between the smoothing area and the outline emphasizing area in the image can be reduced as compared with the embodiment 1-3, and thus a more natural image can be output.

Figure 10:
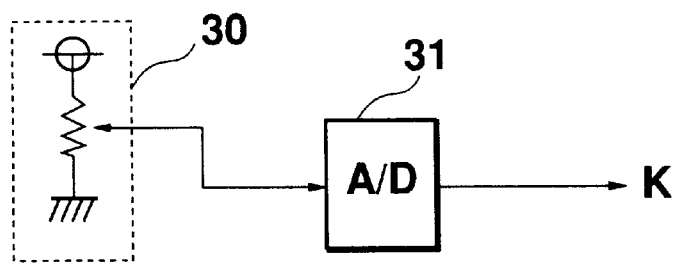
FIG. 10 is a block diagram of one embodiment of a correction data input means used in the circuit according to the present invention.

The embodiment 1-5 of an outline correction circuit according to the present invention will be described. In this embodiment, the input discrimination threshold value K can be continuously variable. FIG. 10 shows one embodiment of means for generating a continuous variable discrimination threshold value, and the other part of the outline correction circuit is the same as the embodiment 1-1 described above. In FIG. 10, the continuous variable discrimination threshold value generating means includes a variable resistor 30 and an A/D converter 31.

Next, the operation of the embodiment 1-5 of the outline correction circuit will now be described. By the variable resistor 30, a certain voltage is generated. This voltage is converted into digital data by the A/D converter 31 to obtain the discrimination threshold value K. The obtained discrimination threshold value K is input to the comparator 5 in FIG. 1. The other part of the operation is the same as the embodiment 1-1 and thus can be omitted for the sake of brevity.

Figure 11A:
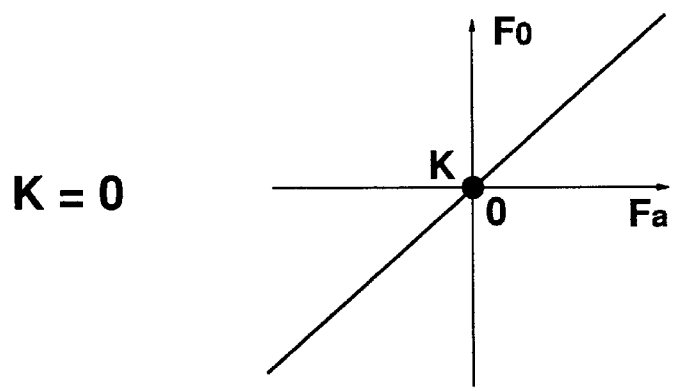
FIGS. 11a, 11b and 11c are schematic diagrams showing a relationship among a high frequency component, correction data and a discrimination threshold value used in embodiments 1-5 and 1-9 of an outline correction circuit according to the present invention.
Figure 11B:
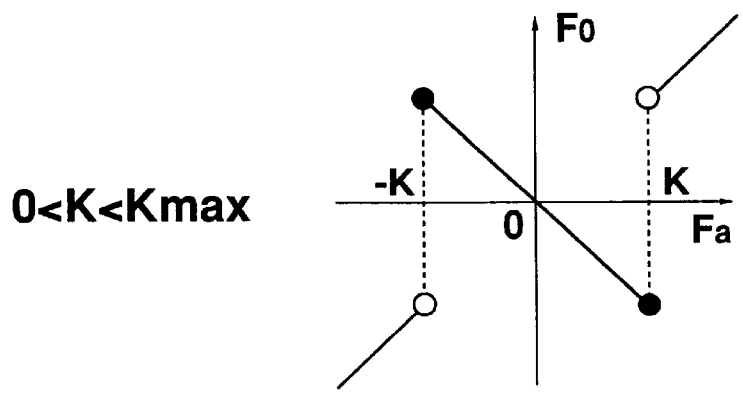
Figure 11C:
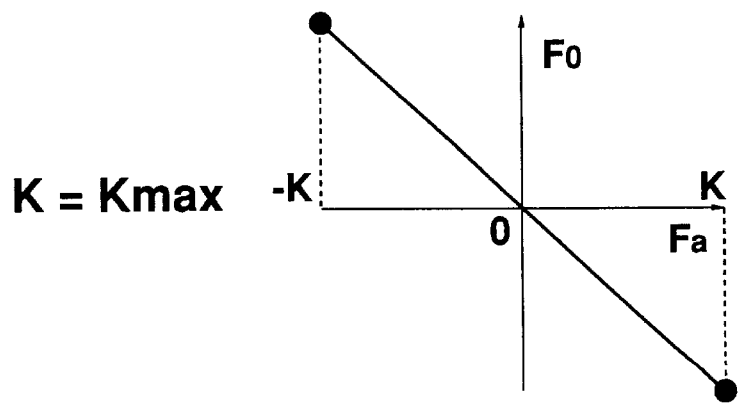

FIGS. 11a, 11b and 11c show a relationship among the high frequency component Fa, the correction data Fo and the discrimination threshold value K in the embodiment 1-5. That is, FIGS. 11a, 11b and 11c show the relationship between Fa and Fo when K=0, when 0<K<Kmax (Kmax is the possible maximum value of K), and when K=Kmax, respectively. When K=0, Fo=Fa in all high frequency components Fa, and only the outline emphasizing is performed. When 0<K<Kmax, the noise removal and the outline emphasizing are carried out depending on the relationship between K and Fa in the same manner as the embodiment 1-1. When K=Kmax, Fo=–Fa in all range of Fa, and only the smoothing is performed. In this embodiment, as described above, by continuously setting any discrimination data depending on the image by a user, an original image can be freely corrected to a preferable image from a soft image to a hard image.

The embodiment 1-6 of an outline correction circuit according to the present invention will now be described. In this embodiment, the input discrimination threshold value K can be continuously variable. The discrimination threshold value K generated by the continuous variable discrimination threshold value generating means shown in FIG. 10 is input to the multiplier 10, the selector 11 and the comparator 5 shown in FIG. 4. The other part of the operation is the same as the embodiment 1-2 and thus can be omitted for the sake of brevity.

Figure 12A:
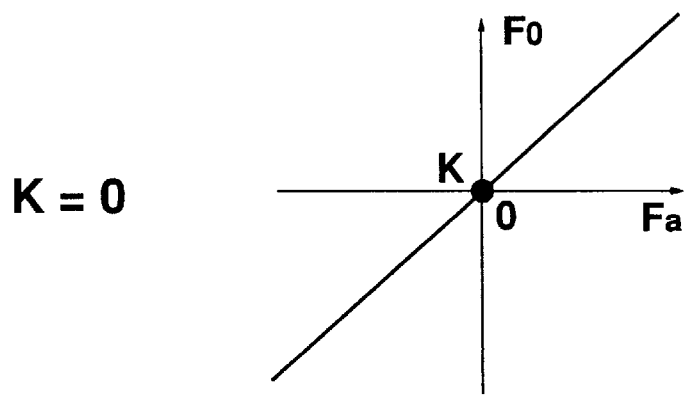
FIGS. 12a, 12b and 12c are schematic diagrams showing a relationship among a high frequency component, correction data and a discrimination threshold value used in embodiments 1-6, 1-10 and 1-11 of an outline correction circuit according to the present invention.
Figure 12B:
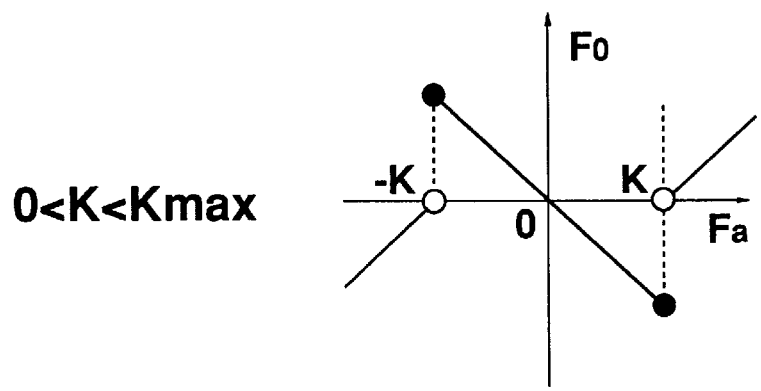
Figure 12C:
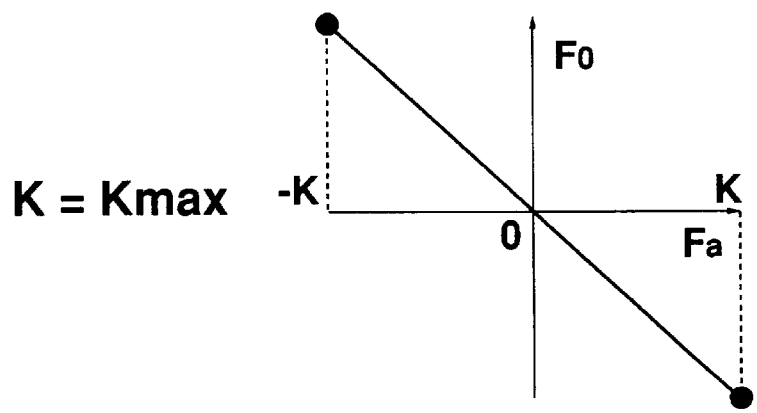

FIGS. 12a, 12b and 12c show a relationship among the high frequency component Fa, the correction data Fo and the discrimination threshold value K in the embodiment 1-6. That is, FIGS. 12a, 12b and 12c show the relationship between Fa and Fo when K=0, when 0<K<Kmax (Kmax is the possible maximum value of K), and when K=Kmax, respectively. When K=0, Fo=Fa in all high frequency components Fa, and only the outline emphasizing is performed. When 0<K<Kmax, the noise removal and the outline emphasizing are carried out depending on the relationship between K and Fa in the same manner as the embodiment 1-2. When K=Kmax, Fo=–Fa in all range of Fa, and only the smoothing is performed. In this embodiment, as described above, by continuously setting any discrimination data depending on the image by a user, an original image can be freely corrected to a preferable image from a soft image to a hard image. Further, when 0<K<Kmax, as compared with embodiment 1-5, the difference of the processing at the border between the smoothing and the outline emphasizing can be reduced, and thus a more natural image can be obtained.

The embodiment 1-7 of an outline correction circuit according to the present invention will now be described. In this embodiment, the input discrimination threshold value K can be continuously variable. The discrimination threshold value K generated by the continuous variable discrimination threshold value generating means shown in FIG. 10 is input to the comparator 5 shown in FIG. 6. The other part of the operation is the same as the embodiment 1-3 and thus can be omitted for the sake of brevity.

Figure 13A:
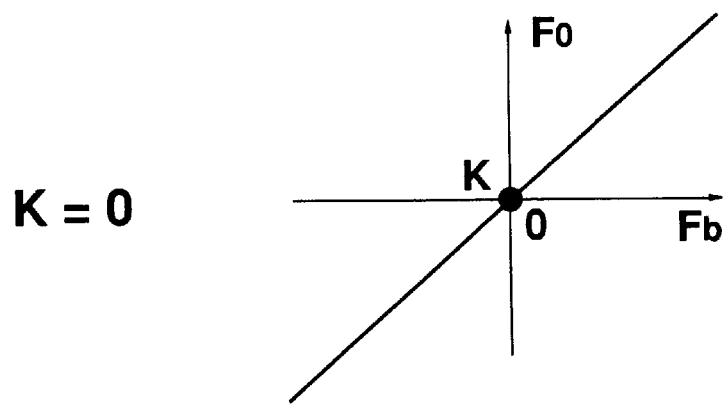
FIGS. 13a, 13b and 13c are schematic diagrams showing a relationship among a high frequency component, correction data and a discrimination threshold value used in embodiments of an outline correction circuit according to the present 1-7, 1-10, 1-11 and 1-12 invention.
Figure 13B:
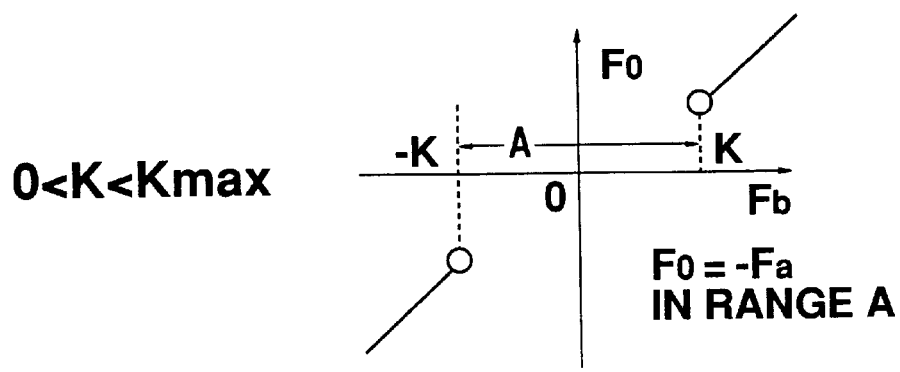
Figure 13C:
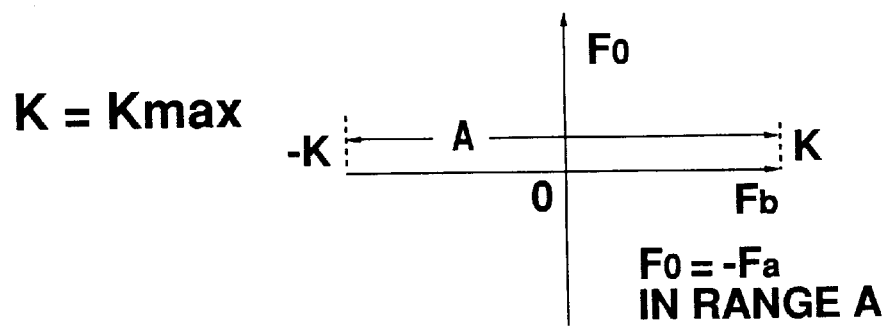

FIGS. 13a, 13b and 13c show a relationship among the high frequency component Fb, the correction data Fo and the discrimination threshold value K in the embodiment 1-7. That is, FIGS. 13a, 13b and 13c show the relationship between Fb and Fo when K=0, when 0<K<Kmax (Kmax is the possible maximum value of K), and when K=Kmax, respectively. When K=0, Fo=Fb in all high frequency components Fb, and only the outline emphasizing is performed. When 0<K<Kmax, the noise removal and the outline emphasizing are carried out depending on the relationship between K and Fb in the same manner as the embodiment 1-3. When K=Kmax, Fo=−Fa in all range of Fb, and only the smoothing is performed. In this embodiment, as described above, by continuously setting any discrimination threshold value depending on the image by a user, an original image can be freely corrected to a preferable image from a soft image to performed. In this embodiment, as described above, by continuously setting any discrimination threshold value depending on the image by a user, an original image can be freely corrected to a preferable image from a soft image to a hard image.

The embodiment 1-8 of an outline correction circuit according to the present invention will now be described. In this embodiment, the input discrimination threshold value K can be continuously variable. The discrimination threshold value K generated by the continuous variable discrimination threshold value generating means shown in FIG. 10 is input to the multiplier 10, the selector 11 and the comparator 5 shown in FIG. 8. The other part of the operation is the same as the embodiment 1-4 and thus can be omitted for the sake of brevity.

Figure 14A:
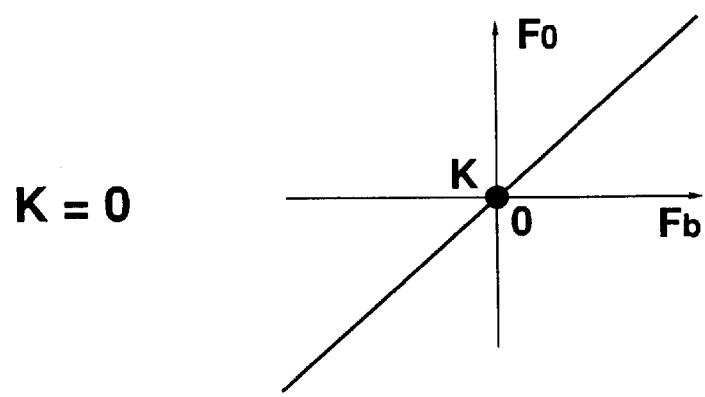
FIGS. 14a, 14b and 14c are schematic diagrams showing a relationship among a high frequency component, correction data and a discrimination threshold value used in an embodiment 1-8 of an outline correction circuit according to the present invention.
Figure 14B:
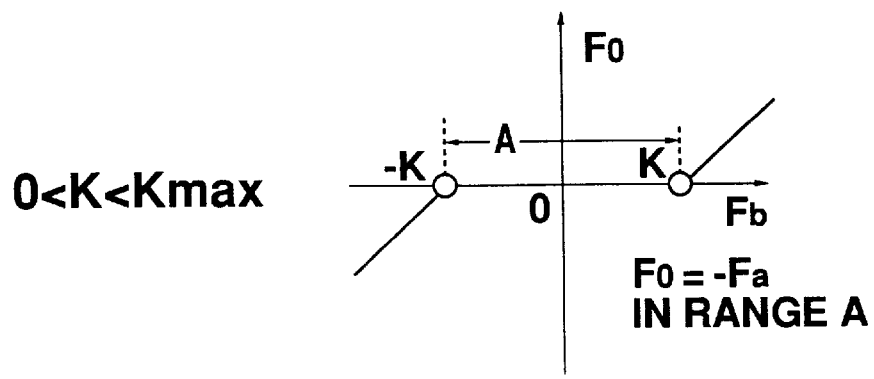
Figure 14C:
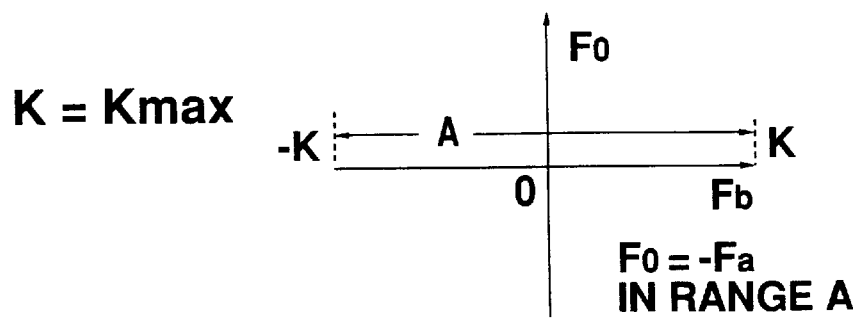

FIGS. 14a, 14b and 14c show a relationship among the high frequency component Fb, the correction data Fo and the discrimination threshold value K in the embodiment 1-8. That is, FIGS. 14a, 14b and 14c show the relationship between Fb and Fo when K=0, when 0<K<Kmax (Kmax is the possible maximum value of K), and when K=Kmax, respectively. When K=0, Fo=Fb in all high frequency components Fb, and only the outline emphasizing is performed. At this time, the outline emphasizing does not emphasize the dot disturbance due to the characteristics of the second differential filter 20. When 0<K<Kmax, the noise removal and the outline emphasizing are carried out depending on the relationship between K and Fb in the same manner as the embodiment 1-4. When K=Kmax, Fo=−Fa in all range of Fb, and only the smoothing is performed. In this embodiment, as described above, by continuously setting any discrimination threshold value depending on the image by a user, an original image can be freely corrected to a preferable image from a soft image to a hard image. Further, when 0<K<Kmax, as compared with embodiment 1-7, the difference of the processing at the border between the smoothing and the outline emphasizing can be reduced, and thus a more natural image can be obtained.

Figure 15:
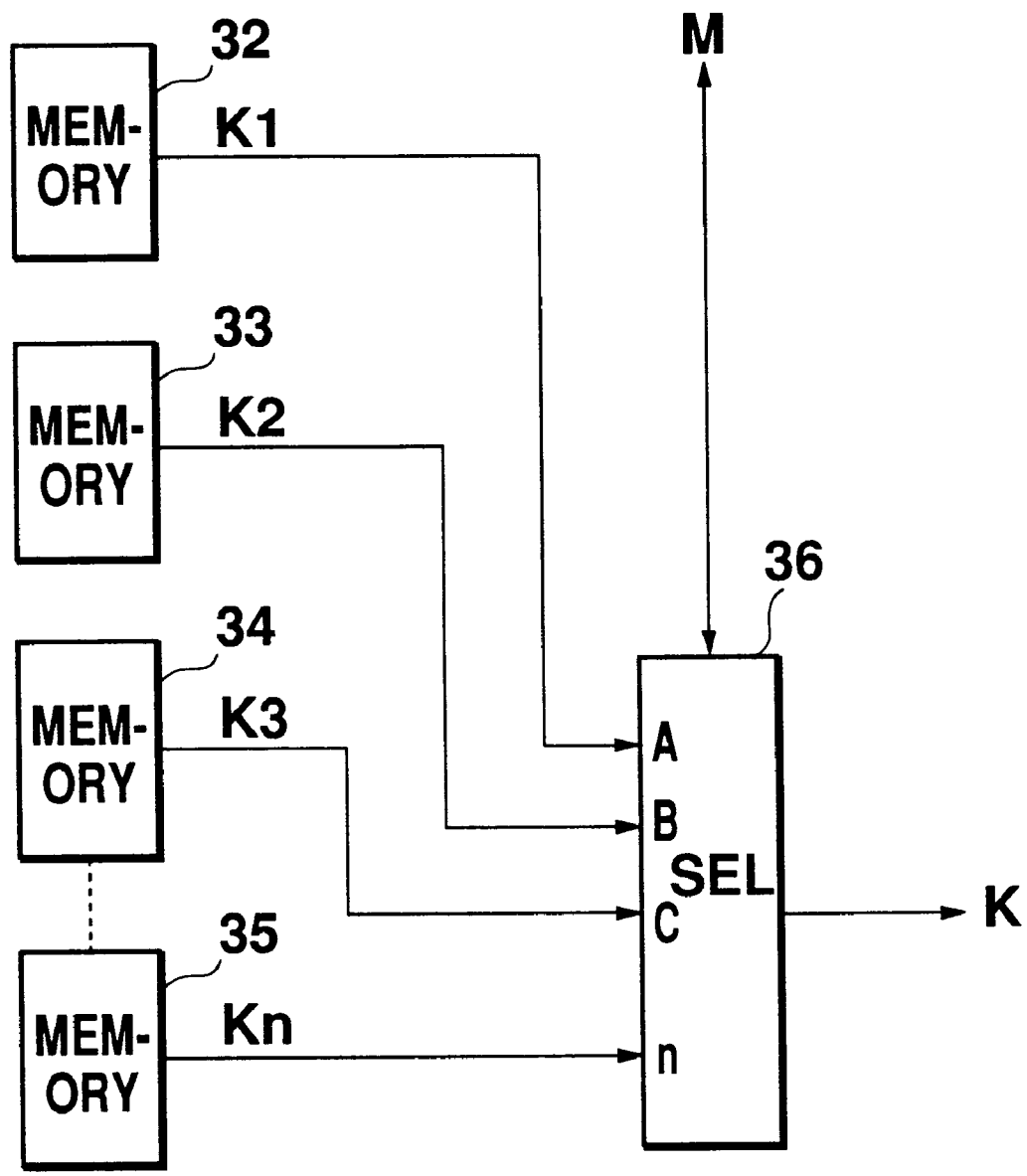
FIG. 15 is a block diagram of one embodiment of a discrimination threshold value memory means and a discrimination threshold value selecting means used in an outline correction circuit according to the present invention.

The embodiment 1-9 of an outline correction circuit according to the present invention will now be described. FIG. 15 shows one embodiment of a device for storing a plurality of discrimination threshold values and the above-described device for selecting one of the discrimination threshold values. In FIG. 15, a plurality of memories 32, 33, 34 and 35 store data K1, K2, K3 and Kn for representing respective discrimination threshold values, and these data K1, K2, K3 and Kn read out of the memories 32, 33, 34 and 35 are sent to a selector 36 for selecting one of the discrimination threshold values by a selection signal M input to the selector 36.

Next, the operation of the outline correction circuit will now be described. In FIG. 15, the user gives the selection signal M depending on the purpose. For example, when the memory 32 is selected, the data K1 are output from the selector 36 as the discrimination threshold value K. The discrimination threshold value K is input to the comparator 5 shown in FIG. 1. The other part of the operation is the same as the embodiment 1-1 and thus can be omitted for the sake of brevity.

In this embodiment, for example, when three memories 32, 33 and 34 for storing the discrimination threshold values are provided, the setting of the memories is carried out such as K1=0, 0<K2<Kmax, and K3=Kmax. In this case, when the memory 32 is selected by the selection signal M, the operation of FIG. 11a is performed, and only the outline emphasizing is carried out to obtain a hard image. When the memory 33 is selected, in the operation of FIG. 11b, the noise removal and the outline emphasizing are performed. Also, when the memory 34 is selected, in the operation of FIG. 11c, only the smoothing is carried out to obtain a soft image. Further, by the output control signal E, the image that the outline correction processing is not applied to can be output. In this embodiment, as described above, by selecting one of a plurality of modes previously prepared by the user, the desired processing can be performed in a simple manner.

The embodiment 1-10 of an outline correction circuit according to the present invention will now be described. The discrimination threshold value K generated by the means shown in FIG. 15 is input to the multiplier 10, the selector 11 and the comparator 5 shown in FIG. 4. The other part of the operation is the same as the embodiment 1-2 and thus can be omitted for the sake of brevity.

In this embodiment, for example, when three memories 32, 33 and 34 for storing the discrimination threshold values are provided, the setting of the memories is carried out such as K1=0, 0<K2<Kmax, and K3=Kmax. In this case, when the memory 32 is selected by the selection signal M, the operation of FIG. 12a is performed, and only the outline emphasizing is carried out to obtain a hard image. When the memory 33 is selected, in the operation of FIG. 13b, the noise removal and the outline emphasizing are performed. Also, when the memory 34 is selected, in the operation of FIG. 13c, only the smoothing is carried out to obtain a soft image. Further, by the output control signal E, the image that the outline correction processing is not applied to can be output. In this embodiment, as described above, by selecting one of a plurality of modes previously prepared by the user, the desired processing can be applied in a simple manner.

The embodiment 1-11 of an outline correction circuit according to the present invention will now be described. The discrimination threshold value K generated by the means shown in FIG. 15 is input to the comparator 5 shown in FIG. 6. The other part of the operation is the same as the embodiment 1-3 and thus can be omitted for the sake of brevity.

In this embodiment, for example, when three memories 32, 33 and 34 for storing the discrimination threshold values are provided, the setting of the memories is carried out such as K1=0, 0<K2<Kmax, and K3=Kmax. In this case, when the memory 32 is selected by the selection signal M, the operation of FIG. 12a is performed, and only the outline emphasizing is carried out to obtain a hard image. When the memory 33 is selected, the operation of FIG. 12b is carried out, that is, the noise removal by the first differential filter 2 and the outline emphasizing by the second differential filter 20 are performed. Also, when the memory 34 is selected, in the operation of FIG. 13c, only the smoothing is carried out to obtain a soft image. At this time, the outline emphasizing does not emphasize the dot disturbance due to the characteristics of the second differential filter 20. Further, by the output control signal E, the image that the outline correction processing is not applied to can be output. In this embodiment, as described above, by selecting one of a plurality of modes previously prepared by the user, the desired processing can be applied in a simple manner.

The embodiment 1-12 of an outline correction circuit according to the present invention will now be described. The discrimination threshold value K generated by the means shown in FIG. 15 is input to the multiplier 10, the selector 11 and the comparator 5 shown in FIG. 8. The other part of the operation is the same as the embodiment 1-4 and thus can be omitted for the sake of brevity.

In this embodiment, for example, when three memories 32, 33 and 34 for storing the discrimination threshold values are provided, the setting of the memories is carried out such as K1=0, 0<K2<Kmax, and K3=Kmax. In this case, when the memory 32 is selected by the selection signal M, the operation of FIG. 13a is performed, and only the outline emphasizing is carried out to obtain a hard image. When the memory 33 is selected, the operation of FIG. 13b is carried out, that is, the noise removal by the first differential filter 2 and the outline emphasizing by the second differential filter 20 are performed. Also, when the memory 34 is selected, in the operation of FIG. 13c, only the smoothing is carried out to obtain a soft image. Also, in this embodiment, in the operation of FIG. 13b, the difference of the processing at the border between the noise removal and the outline emphasizing can be reduced compared with the embodiment 1-11, and thus a more natural image can be obtained. Further, by the output control signal E, the image that the outline correction processing is not applied to can be output. In this embodiment, as described above, by selecting one of a plurality of modes previously prepared by the user, the desired processing can be applied in a simple manner.

In the above-described embodiments, as the means for inputting the discrimination threshold value K, the case using the key input, the case using the variable resistor and the A/D converter and the case using the memories and the selector have been described and illustrated. However, the present invention is not restricted to these embodiments, and any device for man/machine interface can be used. Further, as to the differential filter for extracting the high frequency component, any filter having any construction and factor can be used.

As described above, in the first group of preferred embodiments, as the outline correction of the image, the outline emphasizing and the noise removal can be performed at the same time, and by the discrimination threshold value K to be freely set, the rate of the outline emphasizing and the noise removal can be freely variable or selected. As a result, the original image can be controlled to the desired or preferable image of the user.

Next, the second group of the preferred embodiments of the present invention will be described.

Figure 16:
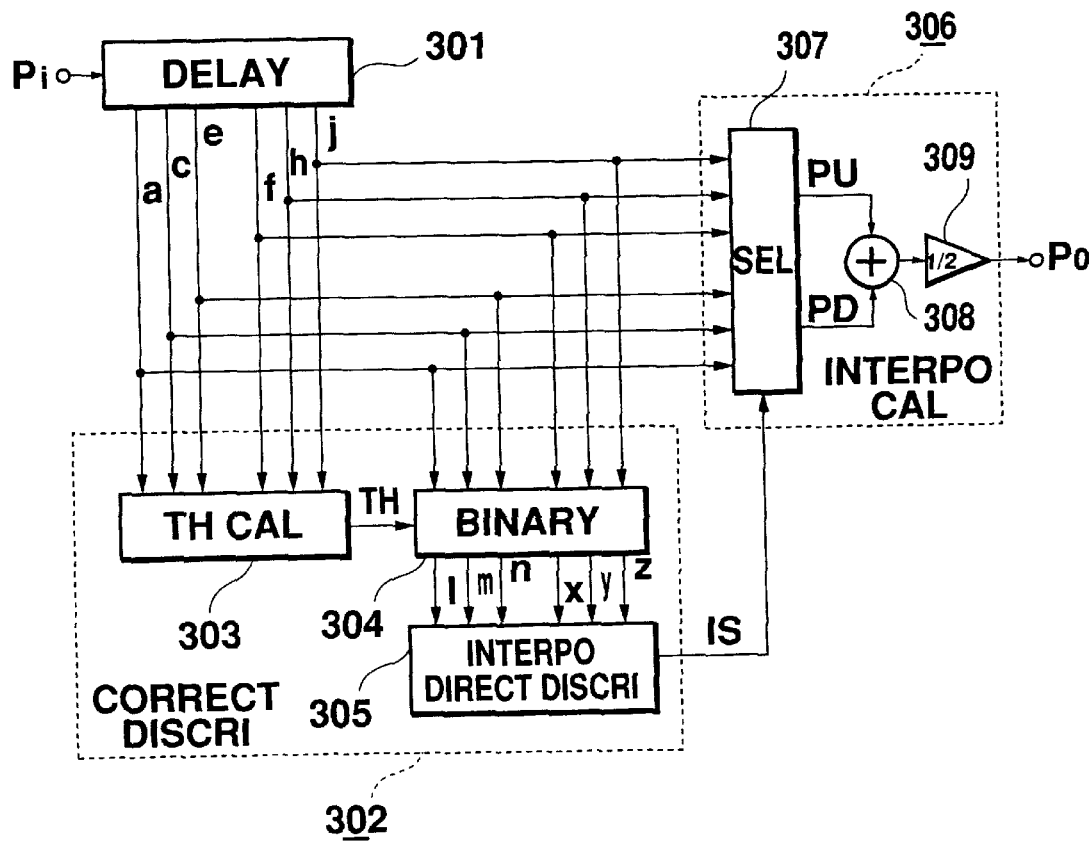
FIG. 16 is a block diagram of an embodiment 2-1 of a pixel interpolation circuit according to the present invention.

In FIG. 16, there is shown the embodiment 2-1 of a pixel interpolation circuit according to the present invention. As shown in FIG. 16, the pixel interpolation circuit is comprised of a delay circuit 301 for delaying the input image data Pi a predetermined time, a correlative discriminator 302 for discriminating correlativity of the images, and an interpolation calculator 306. The correlative discriminator 302 includes a threshold value calculation circuit 303, a binary coding circuit 304 and an interpolation direction discrimination circuit 305. An interpolation calculator 306 includes a selector circuit 307, an adder 308 and a multiplier 309. In FIG. 16, there are shown reference pixel data a, c, e, f, h and j which are picked up by the delay circuit 301 and are required for the interpolation, a threshold value TH, binary codes l, m, n, x, y and z of the picked pixels, interpolation direction selection data IS, data PU and PD selected for the interpolation by the selector circuit 307, and an interpolation result Po output by the multiplier 309.

Figure 17:
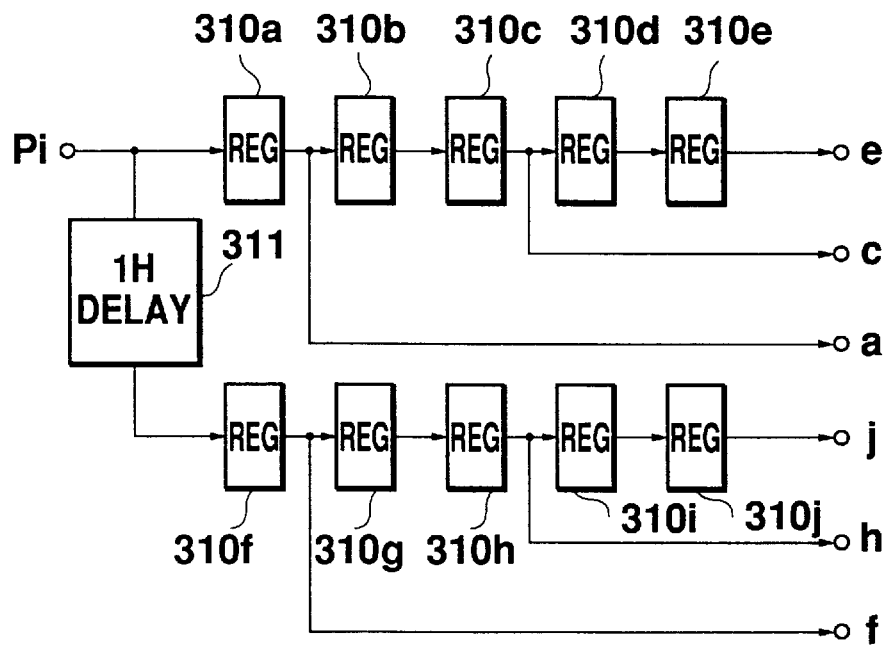
FIG. 17 is a block diagram of one embodiment of a delay circuit used in a pixel interpolation circuit according to the present invention.

FIG. 17 shows one embodiment of the delay circuit 301 used in a pixel interpolation circuit according to the present invention, including registers 310a to 310j composed of delay elements of one pixel, and a one line delay circuit 311.

Figure 18:
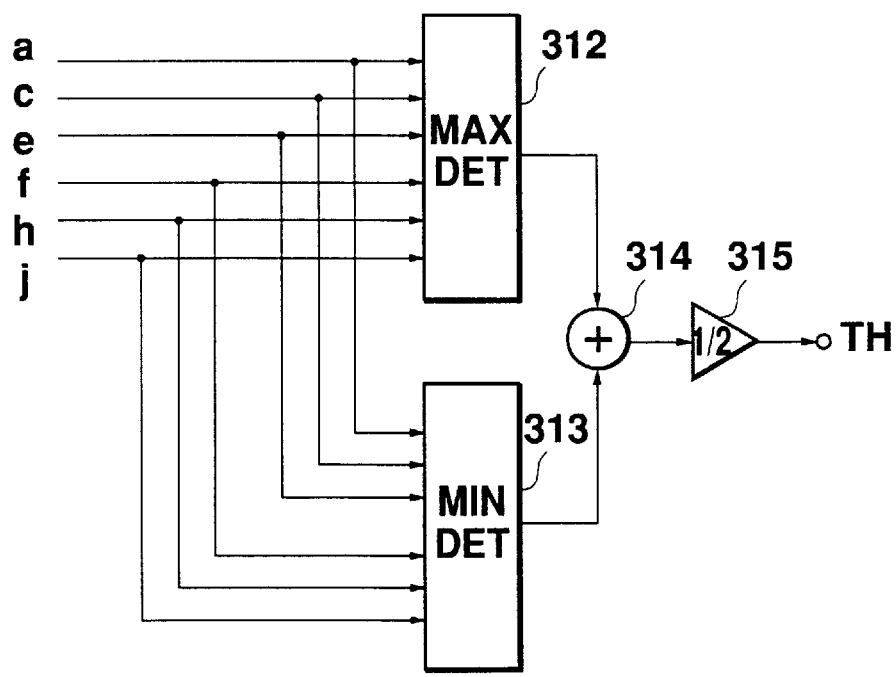
FIG. 18 is a block diagram of one embodiment of a threshold calculation circuit used in a pixel interpolation circuit according to the present invention.

FIG. 18 shows one embodiment of the threshold calculation circuit 303 used in a pixel interpolation circuit according to the present invention, including a maximum value detecting circuit 312, a minimum value detecting circuit 313, an adder 314 and a half (½) multiplier 315.

Figure 19:
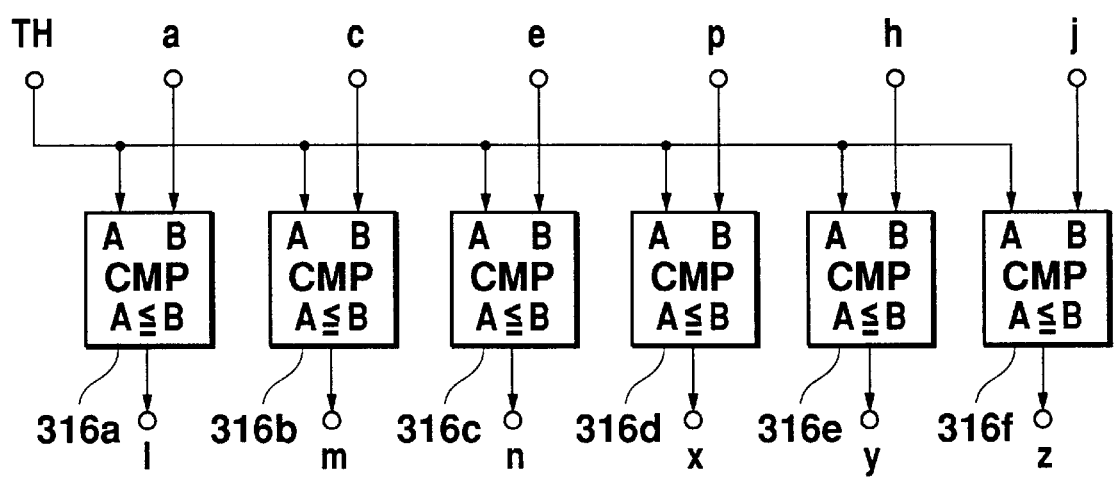
FIG. 19 is a block diagram of one embodiment of a binary coding circuit used in a pixel interpolation circuit according to the present invention.

FIG. 19 illustrates one embodiment of the binary coding circuit 304 used in a pixel interpolation circuit according to the present invention, including a plurality of comparators 316a to 316f connected in parallel.

Figure 20:
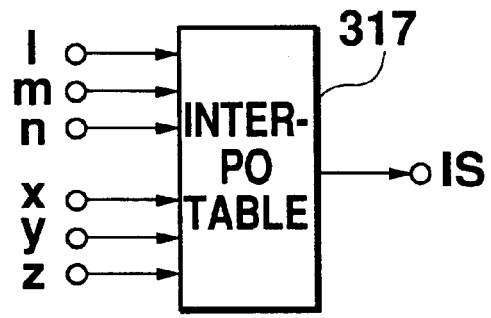
FIG. 20 is a block diagram of one embodiment of an interpolation direction discrimination circuit used in a pixel interpolation circuit according to the present invention.
Figure 21:
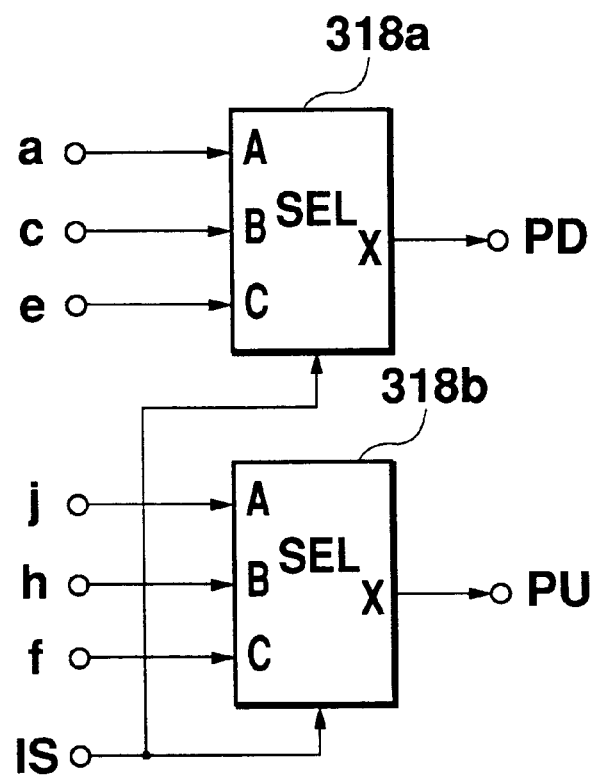
FIG. 21 is a block diagram of one embodiment of a selecting circuit used in a pixel interpolation circuit according to the present invention.

FIG. 20 shows one embodiment of the interpolation direction discrimination circuit 305 used in a pixel interpolation circuit according to the present invention, including an interpolation table 317. FIG. 21 shows one embodiment of the selector circuit 307 used in a pixel interpolation circuit according to the present invention, including two selectors 318a and 318b.

Figure 22:
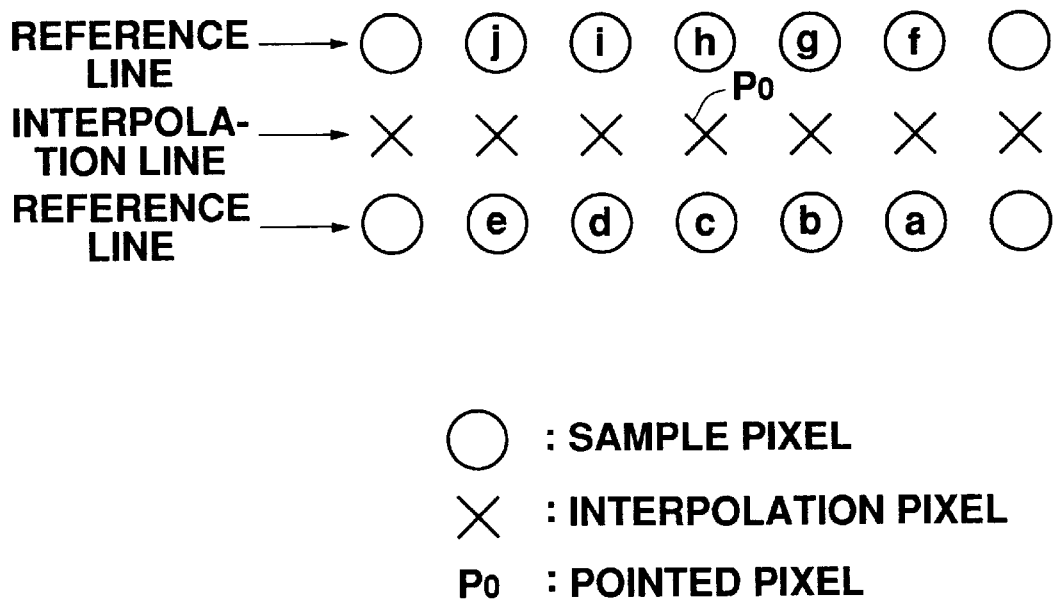
FIG. 22 is a schematic view showing a part of quantized two-dimensional image data shown in a pixel interpolation circuit according to the present invention.

Next, the operation of the pixel interpolation circuit described above will now be described. The two-dimensional image data quantized by a predetermined sampling frequency are input to the delay circuit 301. As shown in FIG. 17, the image data Pi are delayed the predetermined time by the registers 310a to 310j and the one line delay circuit 311, and the reference pixel data a, c, e, f, h and j are extracted. FIG. 22 shows a relationship between a pointed pixel $P_o$ and reference pixels, wherein o represents a sample pixel and x represents an interpolation pixel. The reference pixel data a, c, e, f, h and j extracted by the delay circuit 301 are input to the threshold value calculation circuit 303, the binary coding circuit 304 and the selector circuit 307. As shown in FIG. 18, in the threshold value calculation circuit 303, the maximum value of the reference pixel data a, c, e, f, h and j is detected by the maximum value detecting circuit 312 and the minimum value of the reference pixel data a, c, e, f, h and j is detected by the minimum value detecting circuit 313. The detected maximum and minimum values are added by the adder 314, and the addition result is multiplied by ½ in the half multiplier 315 to obtain the threshold value TH. The threshold value TH is input to the binary coding circuit 304. In the binary coding circuit 304, as shown in FIG. 19, the threshold value TH is compared with the reference pixel data a, c, e, f, h and j in respective comparators 316a to 316f. When a, c, e, f, h or j≧TH, each of the comparators 316a to 316f outputs "1", and when a, c, e, f, h or j<TH, each of the comparators 316a to 316f outputs "0". The comparators 316a to 316f output the comparison results, that is, the binary codes l, m, n, x, y and z as the addresses of the interpolation table 317 in the interpolation direction discrimination circuit 305, as shown in FIG. 20, and the interpolation direction selection data IS are output to the selector circuit 307 from the interpolation table 317.

Figure 23:
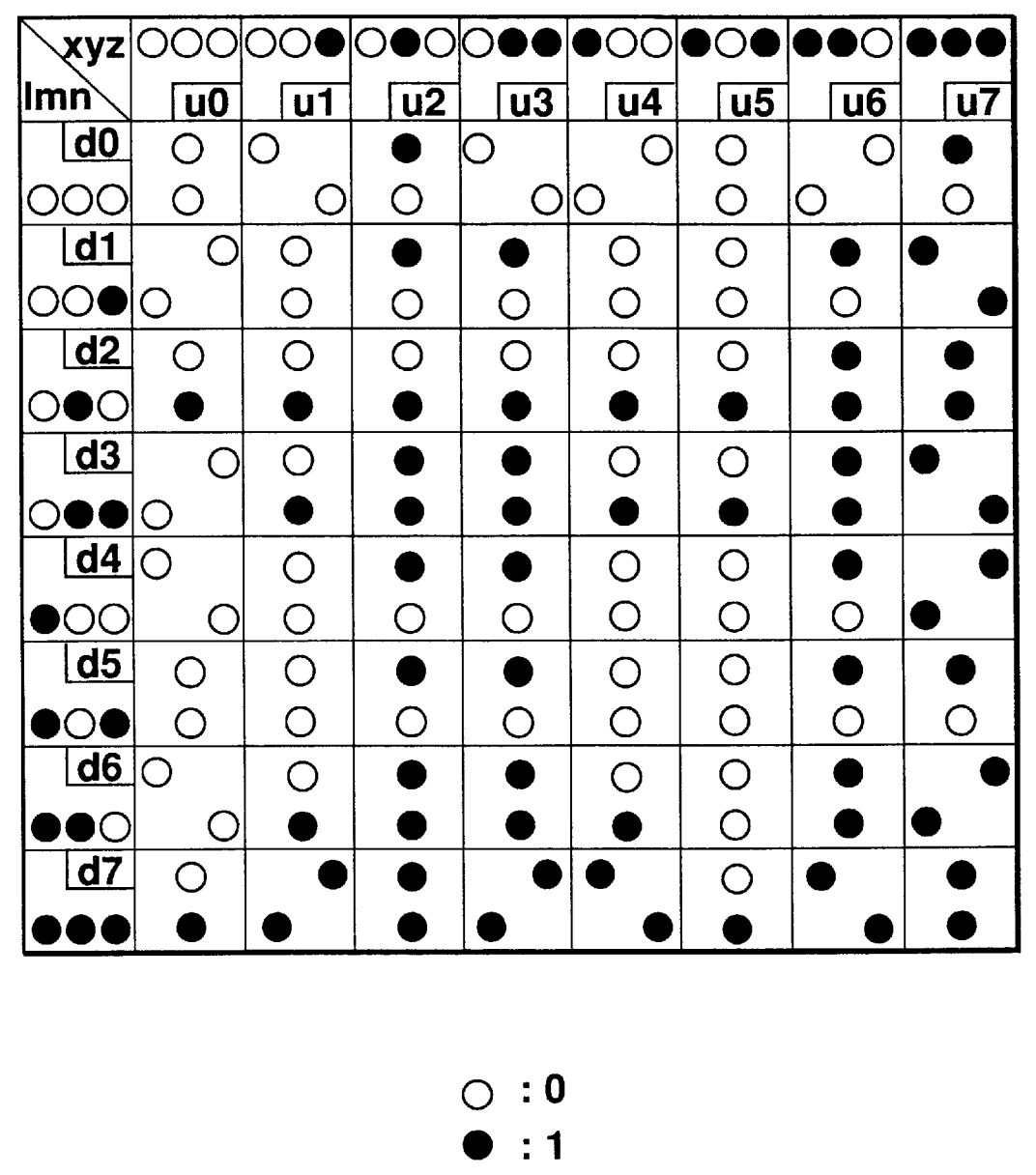

In the selector circuit 307, as shown in FIG. 21, by the interpolation direction selection data IS, the selectors 318a and 318b select any of a vertical interpolation, a right slant interpolation and a left slant interpolation. In the vertical interpolation, the selectors 318a and 318b selects the reference pixels c and h input to the terminals B and outputs the selected reference pixels c and h as the data PD and PU. Then, the adder 308 adds the reference pixels c and h, and the addition result is multiplied by ½ in the multiplier 309 to output the interpolation result Po. In the right slant interpolation, the selectors 318a and 318b selects the reference pixels e and f input to the terminals C, and in the left slant interpolation, the selectors 318a and 318b selects the reference pixels a and j input to the terminals A. Then, the operation is performed in the same manner as described above to output the interpolation result Po. FIG. 23 illustrates one embodiment of the interpolation table showing the relationship between the interpolation directions and the binary codes l, m, n, x, y and z at this time, wherein a white circle o represents "0" of the binary code and a black circle o represents "1" of the binary code. In the interpolation table shown in FIG. 23, combinations of x, y and z are shown in the top from the left such as u0, u1, u2, u3, u4, u5, u6 and u7, and combinations of l, m and n are shown in the left hand side from the top such as d0, d1, d2, d3, d4, d5, d6 and d7. For instance, as shown in FIG. 23, when xyz is u0 and lmn is d0, the vertical interpolation is selected, and when selecting a combination of u7–d6 or u1–d7, the right slant interpolation or the left slant interpolation is selected.

Figure 24:
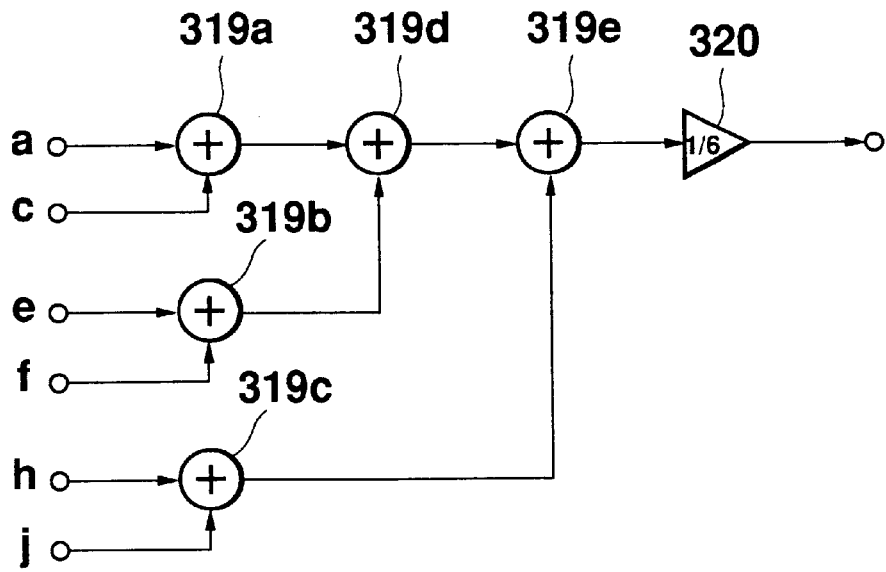
FIG. 24 is a block diagram of another embodiment of a threshold calculation circuit used in a pixel interpolation circuit according to the present invention.

FIG. 24 shows another embodiment of the threshold calculation circuit 303 used in a pixel interpolation circuit according to the present invention, including adders 319a to 319e and a ⅙ multiplier 320.

The operation of this threshold value calculation circuit 303 will now be described. As shown in FIG. 24, the reference pixel data a, c, e, f, h and j extracted by the delay circuit 301 are successively added by the adders 319a to 319e, and the addition result is multiplied by ⅙ in the multiplier 320 to output the threshold value TH as follows.

$$TH=(a+c+e+f+h+j)/6$$

The other part of the operation is the same as the above-described embodiment and thus can be omitted for brevity.

Figure 25:
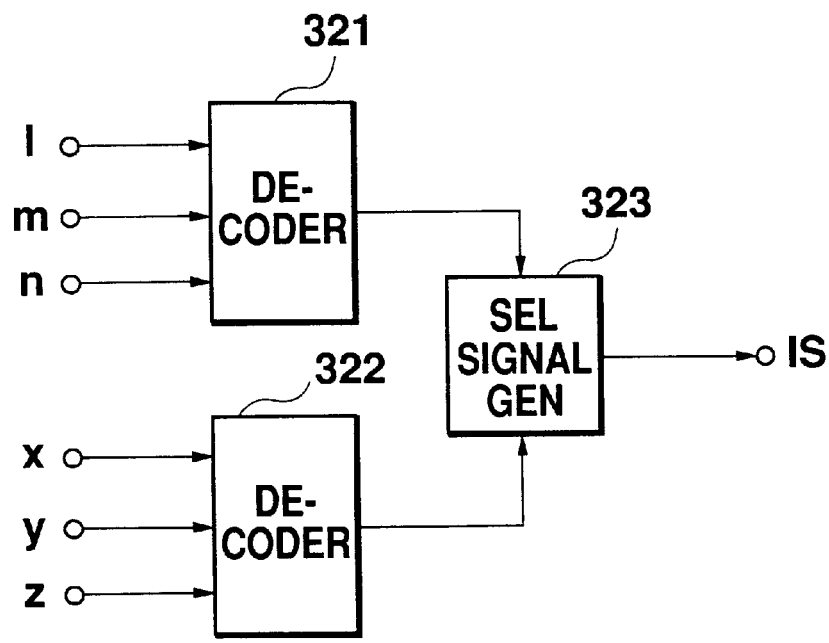
FIG. 25 is a block diagram of another embodiment of an interpolation direction discrimination circuit used in a pixel interpolation circuit according to the present invention.

FIG. 25 shows another embodiment of the interpolation direction discrimination circuit 305 used in a pixel interpolation circuit according to the present invention, including two decoders 321 and 322 and a selection signal generating circuit 323.

The operation of this interpolation direction discrimination circuit 305 will now be described. As shown in FIG. 25, the binary codes lmn and xyz output from the binary coding circuit 304 are input to the decoders 321 and 322, respectively, and are decoded therein to output respective decoded results to the selection signal generating circuit 323. Depending on the combinations of the decoded results, the selection signal generating circuit 323 generates the interpolation direction selection data IS on the basis of the interpolation table shown in FIG. 23, and outputs the interpolation direction selection data IS to the selector circuit 307. The other part of the operation is the same as the embodiment described above and thus can be omitted for the sake of brevity.

Figure 26:
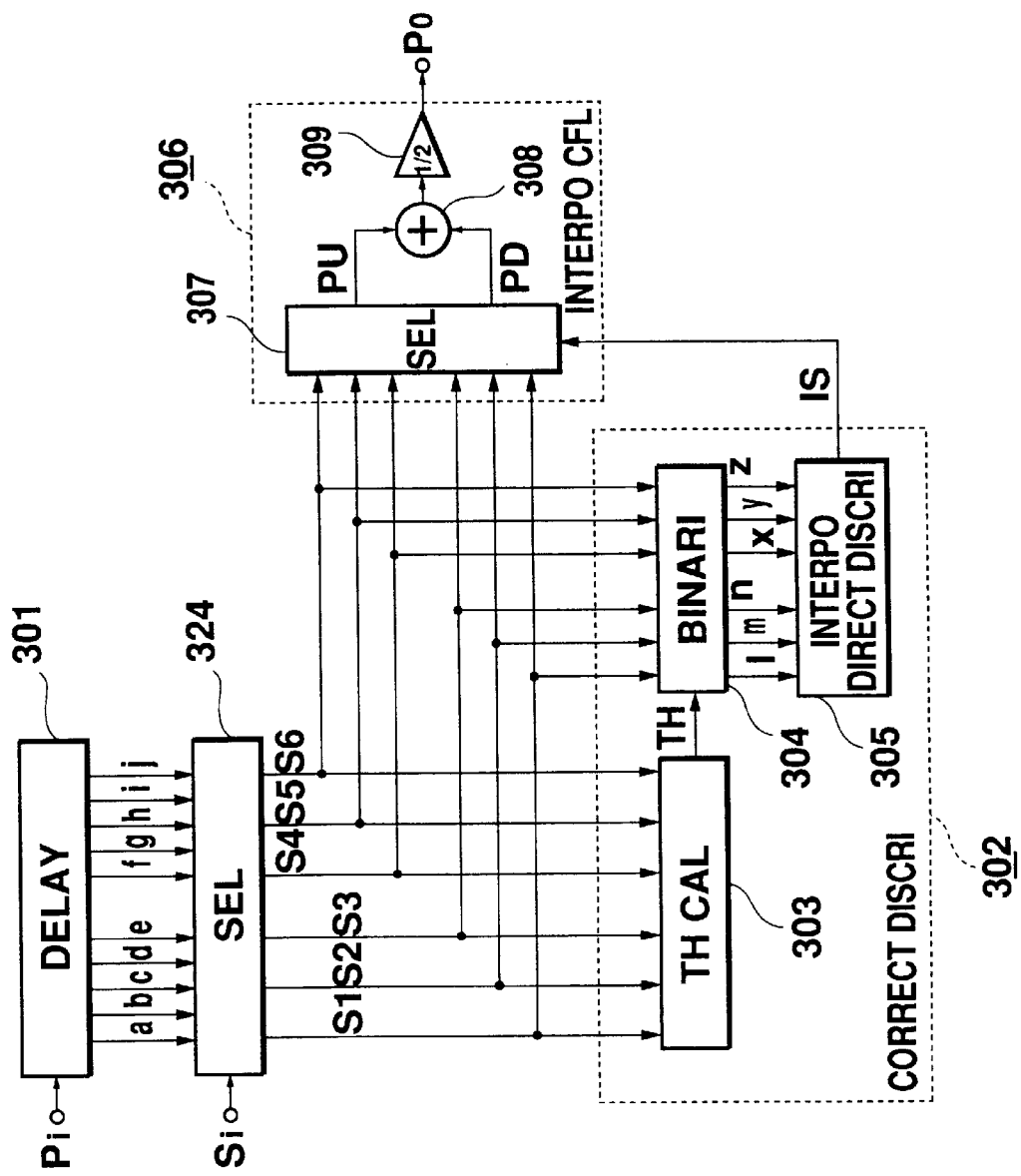
FIG. 26 is a block diagram of an embodiment 2-2 pixel interpolation circuit according to the present invention.

In FIG. 26, there is shown the embodiment 2-2 of an pixel interpolation circuit according to the present invention, having the same construction as the embodiment 2-1 shown in FIG. 15, except that a selector circuit 324 is further provided. A selection signal Si is input to the selector circuit 324.

Figure 27:
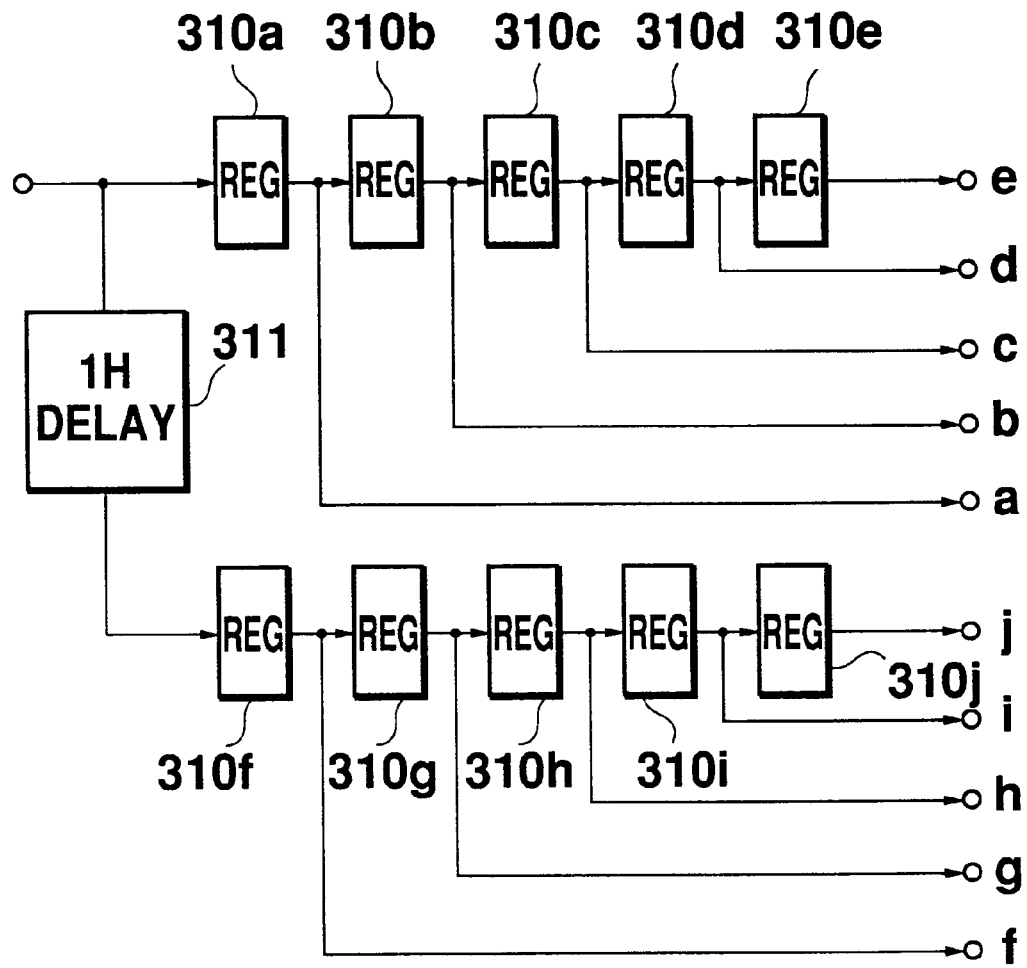
FIG. 27 is a block diagram of one embodiment of a delay circuit shown in FIG. 26.

FIG. 27 shows one embodiment of the delay circuit 301 of the embodiment 2-2 shown in FIG. 26, including a plurality of registers 310a to 310j to output respective extracted pixel data a, b, c, d, e, f, g, h, i and j and the one line delay circuit 311.

Next, the operation of the pixel interpolation circuit described above will now be described. The two-dimensional image data quantized by a predetermined sampling frequency are input to the delay circuit 301. As shown in FIG. 27, the image data Pi are delayed the predetermined time by the registers 310a to 310j and the one line delay circuit 311 to extract the pixel data a, b, c, d, e, f, g, h, i and j. As described above, FIG. 22 shows the relationship between the pointed pixel $P_o$ and the extracted pixels, wherein o represents the sample pixel and x represents then interpolation pixel. The pixel data a, b, c, d, e, f, g, h, i and j extracted by the delay circuit 301 are input to the selector circuit 324. In the selector circuit 324, when the band of the input image data Pi is low, the pixel data a, c, e, f, h and j are selected in the same manner as the embodiment 2-1 and are output as reference pixel data s1, s2, s3, s4, s5 and s6 to the threshold value calculation circuit 303, the binary coding circuit 304 and the selector circuit 307. When the band of the input image data Pi is high, the selector circuit 324 selects the pixel data b, c, d, g, h and i and outputs these pixel data as the reference pixel data s1, s2, s3, s4, s5 and s6. The other part of the operation is the same as the embodiment 2-1 described above and thus can be omitted for the sake of brevity.

With regard to the examples of the low band case and the high band case, a television broadcasting image (low) and scanner color separation images (high) can be given. Further, in the television broadcasting image, a person close-up image (low) and a landscape image (high) can be given.

Figure 28:
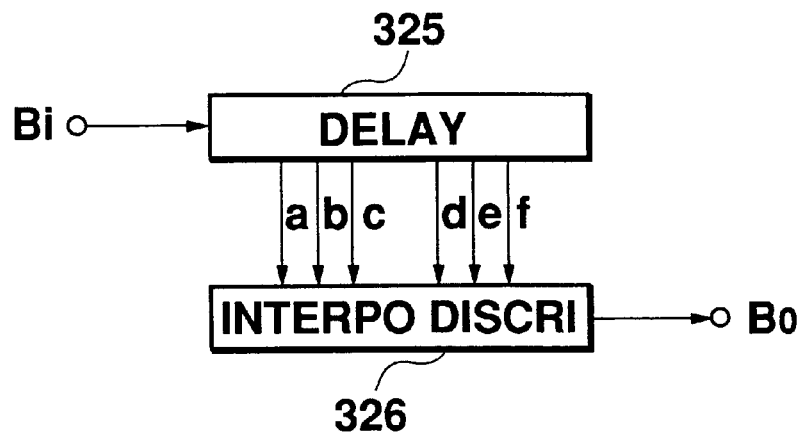
FIG. 28 is a block diagram of an embodiment 2-3 pixel interpolation circuit according to the present invention.
Figure 29:
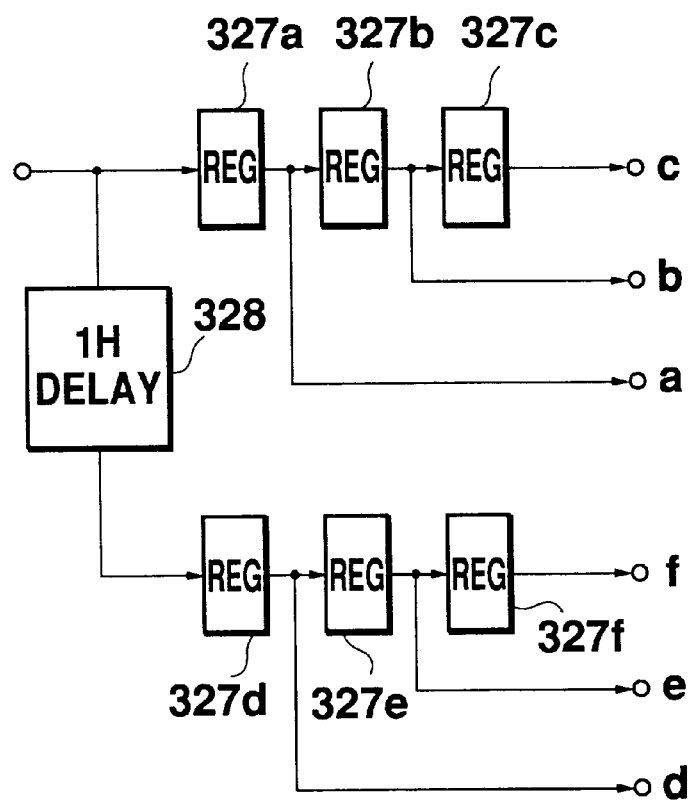
FIG. 29 is a block diagram of one embodiment of a delay circuit shown in FIG. 28.
Figure 30:
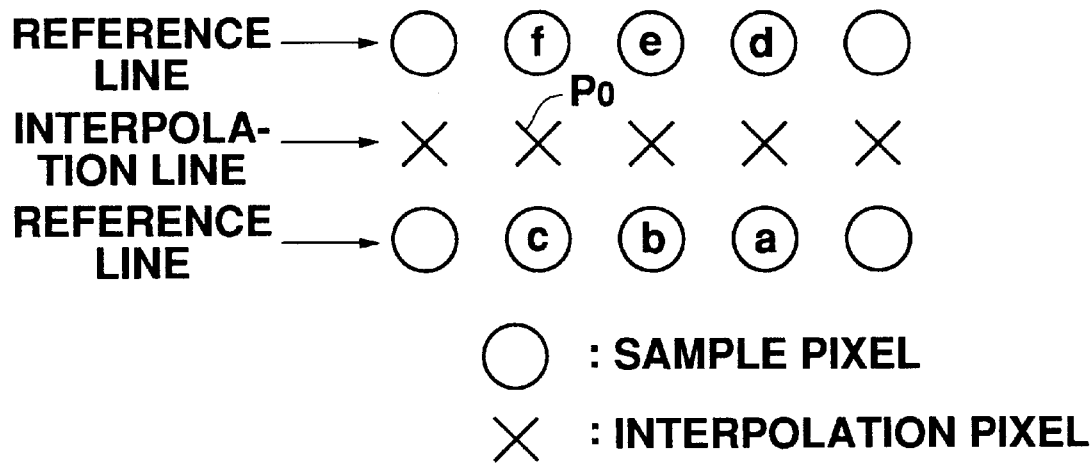
FIG. 30 is a schematic view showing a part of quantized two-dimensional image data shown in FIGS. 28 and 29.

In FIG. 28, there is shown the embodiment 2-3 of a pixel interpolation circuit according to the present invention, including a delay circuit 325 for delaying input binary image data Bi a predetermined time, and an interpolation discrimination circuit 326 to output interpolated pixel data Bo. FIG. 29 shows one embodiment of the delay circuit 325 shown in FIG. 28, including a plurality of registers 327a to 327f to output extracted reference pixel data a, b, c, d, e and f and a one line delay circuit 328. FIG. 30 shows a relationship between the interpolated pixel data Bo and the reference pixel data a, b, c, d, e and f shown in FIGS. 28 and 29.

Next, the operation of the pixel interpolation circuit described above will now be described. The input binary image data Bi are input to the delay circuit 325 and are delayed the predetermined time by the registers 327a to 327f and the one line delay circuit 328 to extract the reference pixel data a, b, c, d, e and f, as shown in FIG. 29. The extracted reference pixel data a, b, c, d, e and f are input to the interpolation discrimination circuit 326. FIG. 31 shows another interpolation table used in a pixel interpolation circuit according to the present invention, which is comprised of combinations of the reference pixel data abc and def in a similar manner to the interpolation table shown in FIG. 23. In the interpolation discrimination circuit 326, by using the reference pixel data a, b, c, d, e and f as the addresses, the interpolated pixel data Bo are output on the basis of the interpolation table shown in FIG. 31. In this case, the interpolation discrimination circuit 326 can be constructed in the same manner as shown in FIG. 25.

Figure 32:
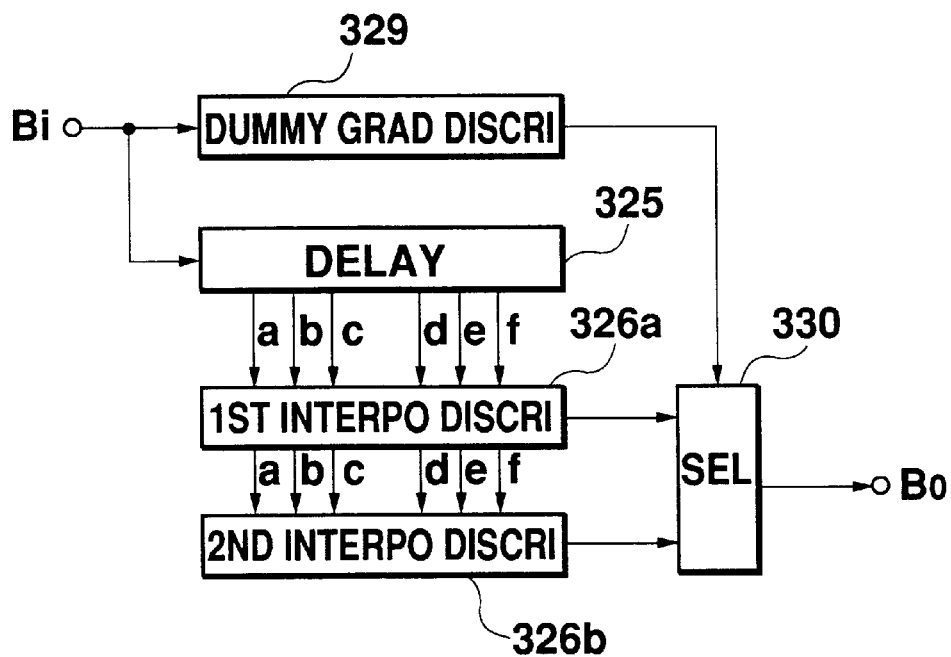
FIG. 32 is a block diagram of an embodiment 2-4 pixel interpolation circuit according to the present invention.

In FIG. 32, there is shown the embodiment 2-4 of a pixel interpolation circuit according to the present invention, including a delay circuit 325, a first interpolation discrimination circuit 326a, a second interpolation discrimination circuit 326b, a dummy gradation discrimination circuit 329 and a selector circuit 330.

Next, the operation of the pixel interpolation circuit described above will now be described. Input binary image data Bi are input to the delay circuit 325 and the dummy gradation discrimination circuit 329. The delay circuit 325 delays the binary image data Bi the predetermined time to extract reference pixel data a, b, c, d, e and f for interpolation pixel data Bo. The extracted reference pixel data are input to the first interpolation discrimination circuit 326a for a character part and the second interpolation discrimination circuit 326b for a dummy gradation part. The first and second interpolation discrimination circuits 326a and 326b output the interpolation results according to the input reference pixel data.

On the other hand, the dummy gradation discrimination circuit 329 discriminates which the binary image data Bi are the dummy gradation part or the character part and controls the selector circuit 330 on the basis of the discrimination result. The selector circuit 330 selects the output of the first interpolation discrimination circuit 326a when the binary image data Bi are the dummy gradation part or the output of the second interpolation discrimination circuit 326b when the binary image data Bi are the character part. The selector circuit 330 outputs the selected output as the interpolated pixel data Bo. The other part of the operation is the same as the embodiment 2-3 described above and thus can be omitted for the sake of brevity.

Figure 33:
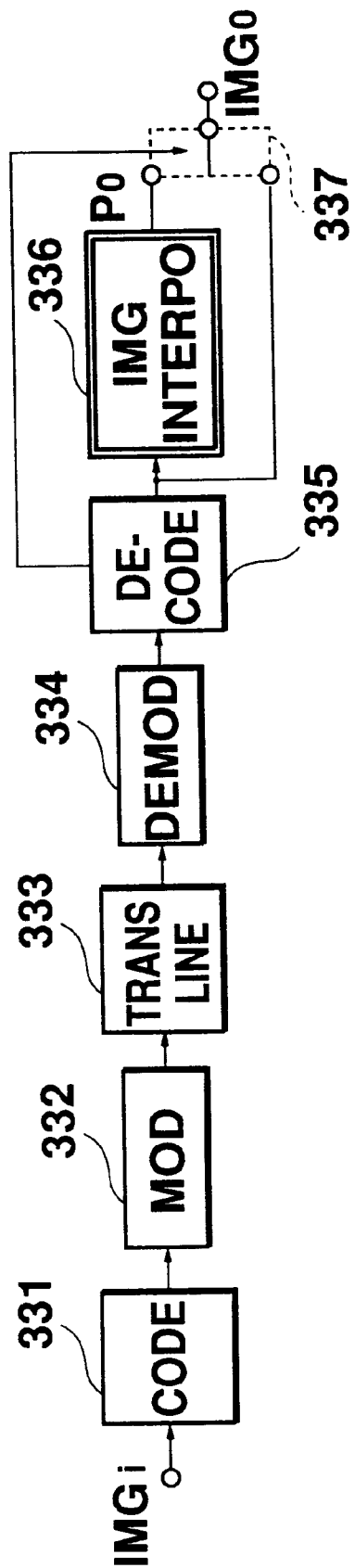
FIG. 33 is a block diagram of an embodiment 2-5 n image transmission device according to the present invention.

In FIG. 33, there is shown the embodiment 2-5 of an image transmission device including the pixel interpolation circuit described above according to the present invention. As shown in FIG. 33, the image transmission device comprises a coder 331 for coding sending image data IMGi, a modulator 332 for modulating the coded data, a transmission line 333 for transmitting the modulated data, a demodulator 334 for demodulating the transmitted data, a decoder 335 for decoding the demodulated data, a pixel interpolation circuit 336 described above in the embodiment 2-1 or 2-2, and a selector circuit 337 for selecting either the interpolated data Po of the pixel interpolation circuit 336 or the output of the decoder 335 to output received image data IMGo.

Figure 34:
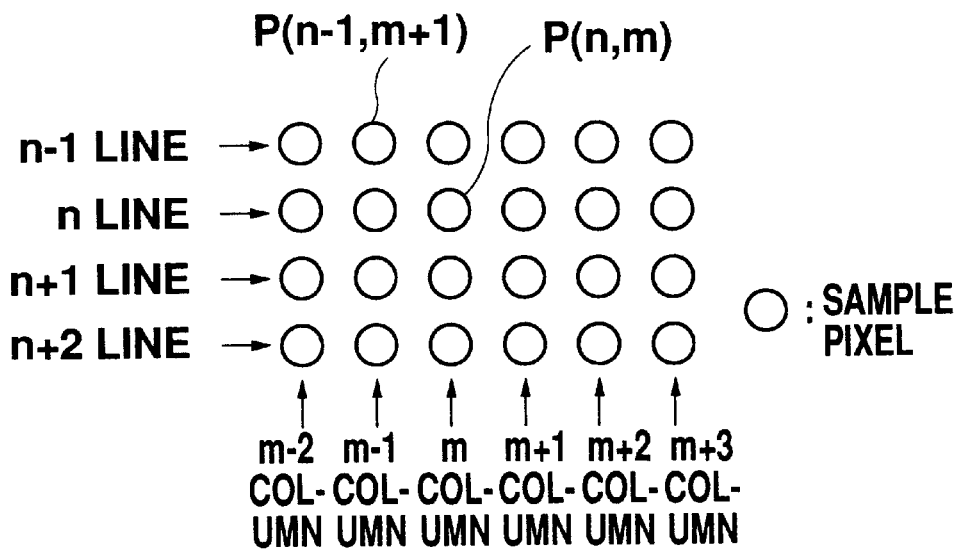
FIG. 34 is a schematic view showing a part of quantized two-dimensional image data shown FIG. 33.
Figure 35:
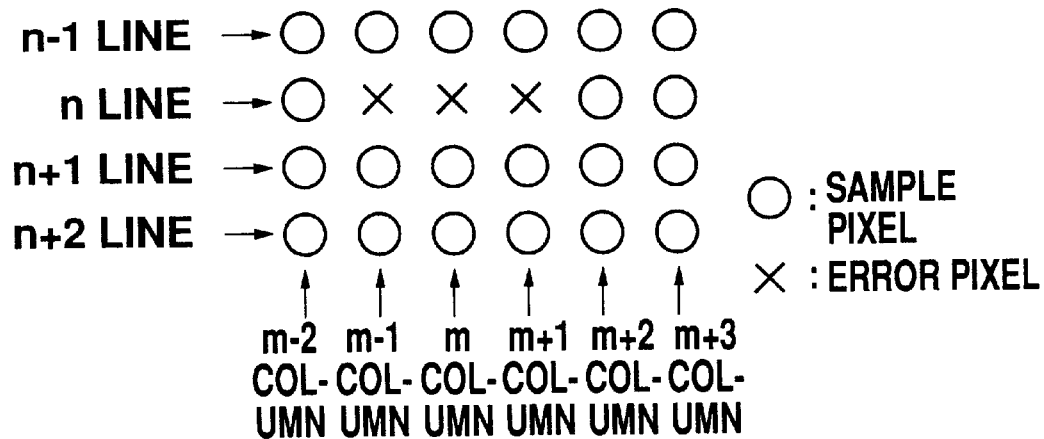
FIG. 35 is a schematic view showing a part of quantized two-dimensional image data including error pixels shown FIG. 33.

Next, the operation of the image transmission device described above will now be described. The sending image data IMGi are coded in the coder 331 and are then modulated in the modulator 332. The coded and modulated data are sent to the demodulator 334 via the transmission line 333, and the demodulator 334 demodulates the input data to output the demodulated data to the decoder 335. In the decoder 335, the input data are decoded and a detection and a correction of error in the data are performed at the same time to obtain decoded image data Pi. The image data Pi are input to the pixel interpolation circuit 336 to output the interpolation result Po in the same manner as described above. The image data Pi and the interpolated result Po are input to the selector circuit 337, and the selector circuit 337 is controlled by a control signal output from the decoder 335 so that the uncorrected error data in the detected and received data may be replaced by the interpolated data Po. As a result, the output signals of the selector circuit 337 become the received image data IMGo. FIGS. 34 and 35 show the part of the received image data IMGo. In FIGS. 34 and 35, o represents the sample pixel and x represents the uncorrected error pixel. FIG. 34 shows a state of the image data with no error pixel data which is impossible to be corrected, and in FIG. 35, there are shown the error pixels impossible to be corrected in the line n and the columns m−1, m and m+1. By replacing the error pixel data in FIG. 35 with the interpolated data Po, the received image data IMGo can be obtained.

Figure 36:
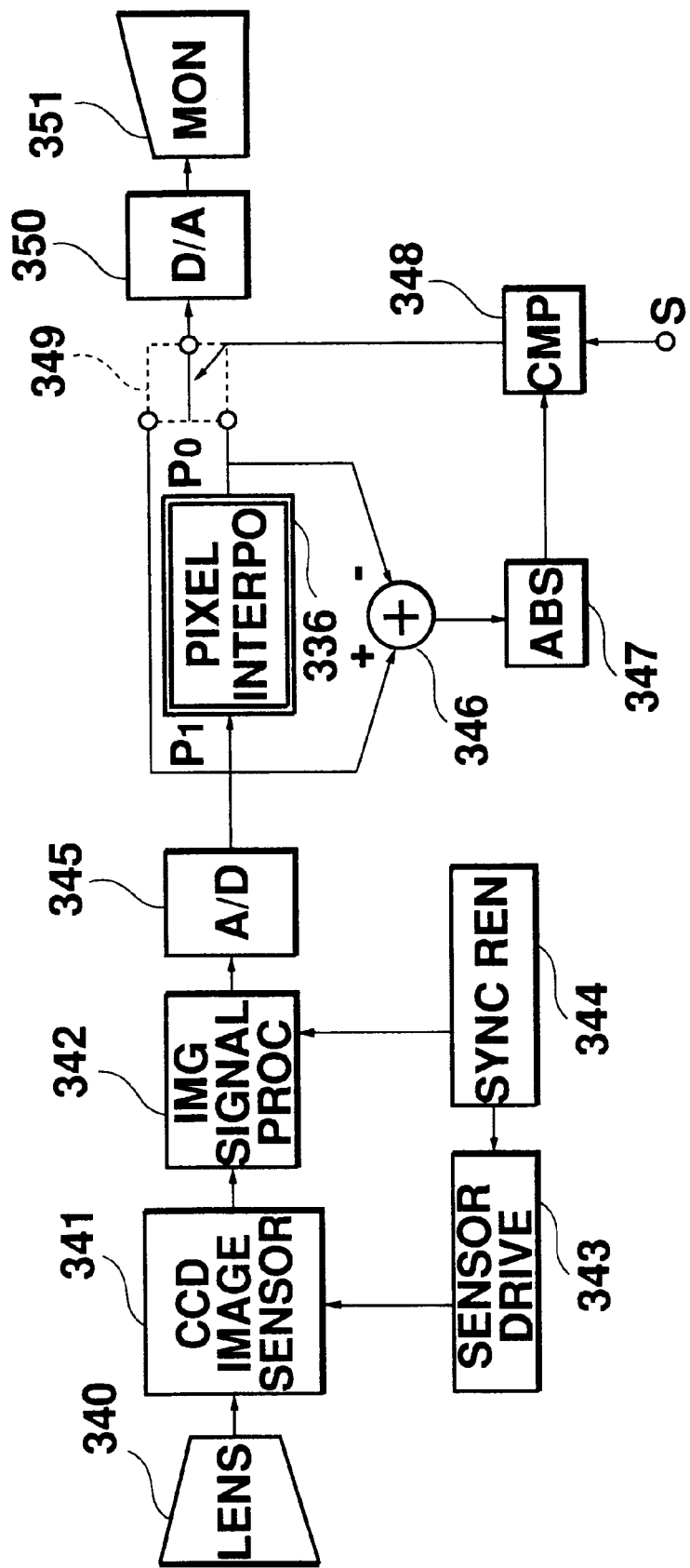
FIG. 36 is a block diagram of an embodiment 2-6 pixel correction device according to the present invention.

In FIG. 36, there is shown the embodiment 2-6 of a pixel correction device according to the present invention. As shown in FIG. 36, the pixel correction device comprises a lens 340 of a camera, a CCD image sensor 341, an image signal processor 342 for performing a noise removal, a synchronous signal addition and the like of the output of the CCD image sensor 341, a sensor driving circuit 343 for the CCD image sensor 341, a synchronism generating circuit 344, an A/D converter 345 for quantizing the image signals, a pixel interpolation circuit 336 described above in the 2-1 or embodiment 2-2, a subtracter 346, an absolute value circuit 347, a comparator 348, a selector circuit 349, a D/A converter 350 and a monitor 351.

Next, the operation of the pixel correction device described above will now be described. An image focused on the lens 340 is photoelectrically converted by the CCD image sensor 341 and is output in a predetermined order by the sensor driving circuit 343. The output of the CCD image sensor 341 is successively processed by the image signal processor 342 and the A/D converter 345 to obtain the quantized image data Pi. The image data Pi are input to the pixel interpolation circuit 336 to output the interpolation result Po in the same manner as described above. The image data Pi and the interpolated data Po are input to the subtracter 346, and the subtraction result is input to the absolute value circuit 347. The absolute value circuit 347 outputs the obtained differential absolute value to the comparator 348, and a threshold value S is also input to the comparator 348 from the outside. The comparator 348 compares the differential absolute value with the threshold value S. When the differential absolute value is larger than the threshold value S, it is discriminated to be error of the pixel of the CCD image sensor 341, and the data Pi of the error pixel are replaced with the interpolated data Po by the selector circuit 349. As described above, FIGS. 34 and 35 show the part of the received image data IMGo. In FIGS. 34 and 35, o represents the sample pixel and x represents the error pixel of the error pixel data of the CCD image sensor 341. FIG. 34 shows the state of the image data with no error pixel data, and in FIG. 35, there are shown the error pixels of the error pixel data in the line n and the columns m−1, m and m+1. By replacing the error pixel data in FIG. 35 with the interpolated image data Po, the corrected image data can be obtained. The corrected image data are converted to the analog signals in the D/A converter 350 and the analog signals are sent to the monitor 351 to display a corrected image.

Figure 37:
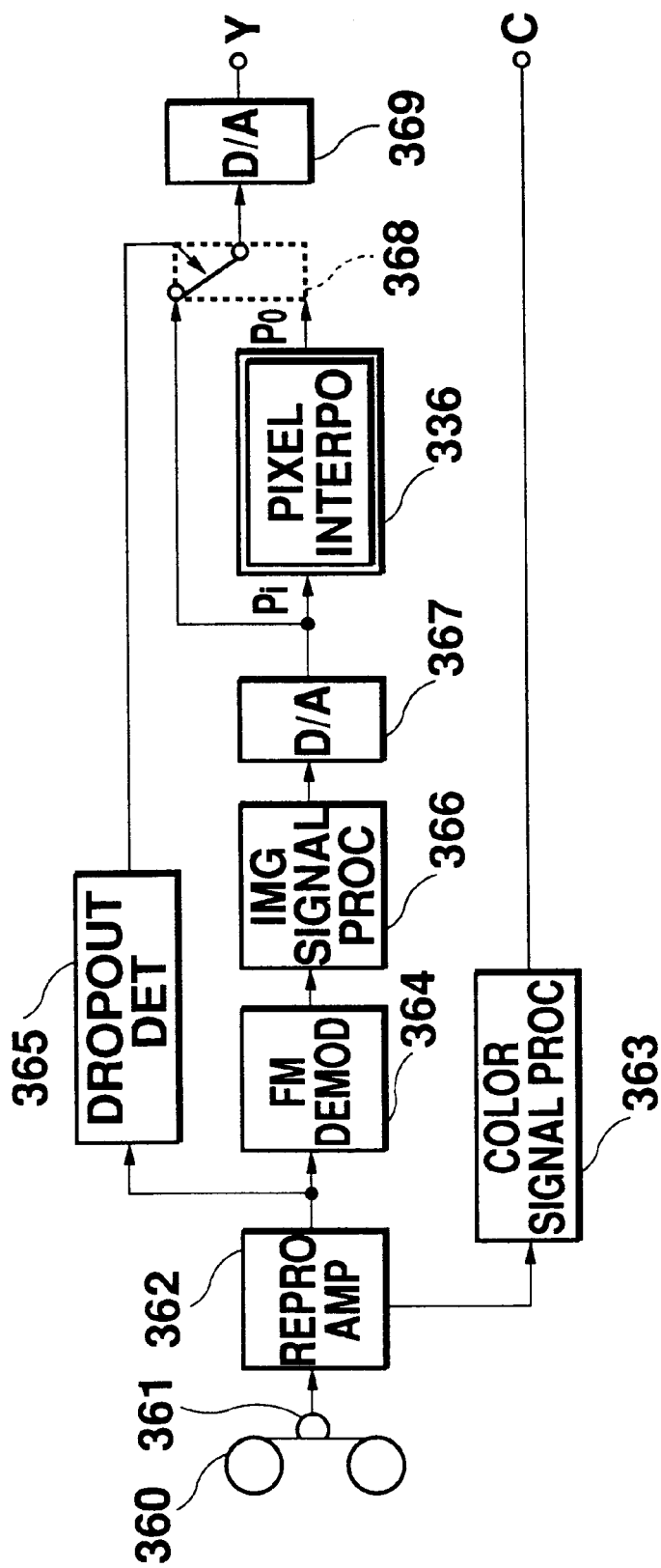
FIG. 37 is a block diagram of an embodiment 2-7 of a dropout correction device according to the present invention.

In FIG. 37, there is shown the embodiment 2-7 of a dropout correction device according to the present invention. As shown in FIG. 37, the dropout correction device is comprised of a video tape 360, a head 361, a reproducing amplifier 362, a color signal processing circuit 363 to output a color signal C, an FM demodulator 364, a dropout detector 365, an image signal processing circuit 366, an A/D converter 367, an pixel interpolation circuit 336 described above in the embodiment 2-1 or 2-2, a selector circuit 368 and a D/A converter 369 to output a luminance signal Y.

Figure 38:
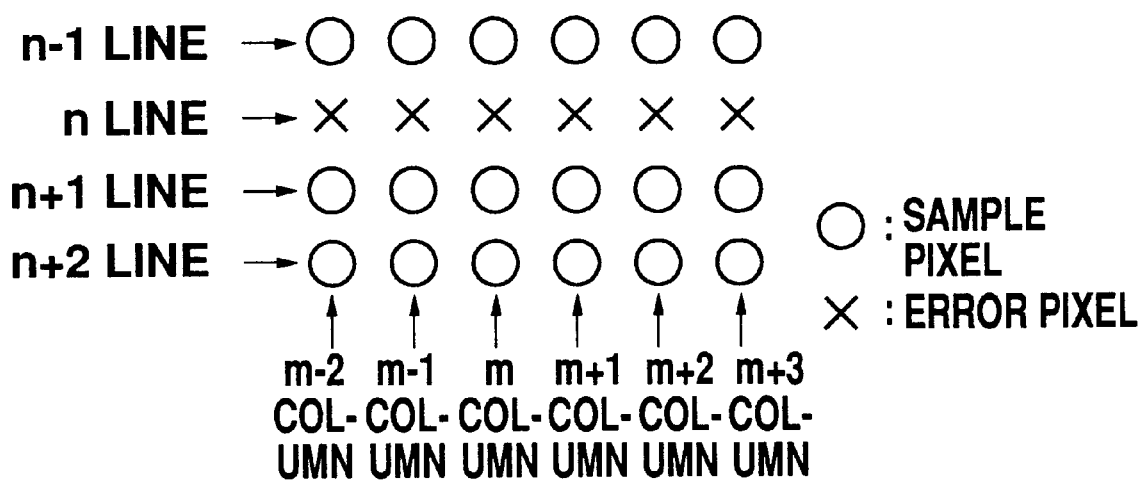
FIG. 38 is a schematic view showing a part of quantized two-dimensional image data including error pixels shown FIG. 37.

Next, the operation of the dropout correction device described above will now be described. An FM modulated video signal recorded on the video tape 360 is picked up by the head 361 and is amplified by the reproducing amplifier 362. The amplified signal is separately processed in a color signal process system and a luminance signal process system. That is, in the color signal process, the amplified signal is fed to the color signal processing circuit 363 and the color signal processing circuit 363 processes the signal to output the color signal C. On the other hand, in the luminance signal process, the amplified signal is input to the FM demodulator 364 and the dropout detector 365. The FM demodulator 364 demodulates the amplified signal and outputs the demodulated signal to the image signal processing circuit 366, and the image signal processing circuit 366 carries out a signal processing such as a band restriction, an de-emphasis and so forth of the input signal and outputs the processed signal to the A/D converter 367. The A/D converter 367 converts the analog signal to the digital signal to obtain the quantized image data Pi. The image data Pi are processed in the pixel interpolation circuit 336 to output the interpolated data Po in the same manner as described above. The image data Pi and the interpolated data Po are input to the selector circuit 368, and by a control signal output from the dropout detector 365, the selector circuit 368 replaces data on a line the dropout occurs with the interpolation data Po and outputs the corrected image data to the D/A converter 369. FIGS. 34 and 38 show the part of the reproduced image data Pi. In FIGS. 34 and 38, o represents the sample pixel and x represents the error pixel of the error pixel data by the dropout. FIG. 34 shows the state of the image data wherein no dropout occurs, and FIG. 38 shows the state wherein the dropout is caused in the line n. The selector circuit 368 replaces the pixel data on the line n with the interpolated image data Po to output the corrected image data to the D/A converter 369. The D/A converter 369 converts the dropout-corrected image data to the analog signal and outputs the luminance signal Y without dropout.

As described above, according to the present invention, the interpolation reference pixels are selected every other pixel to properly perform the interpolation, and hence the good interpolation results against the low frequency image data can be obtained.

Further, according to the present invention, for the binary image, the interpolation is suitably performed by using the interpolation table, and thus the good interpolation results can be obtained for the binary image as well.

Further, according to the present invention, the error pixels occurring in the image data are corrected by the proper pixel interpolation, and hence the good correction results can be obtained at the outline parts as well.

Next, the third group of the preferred embodiments of the present invention will be described.

Figure 39:
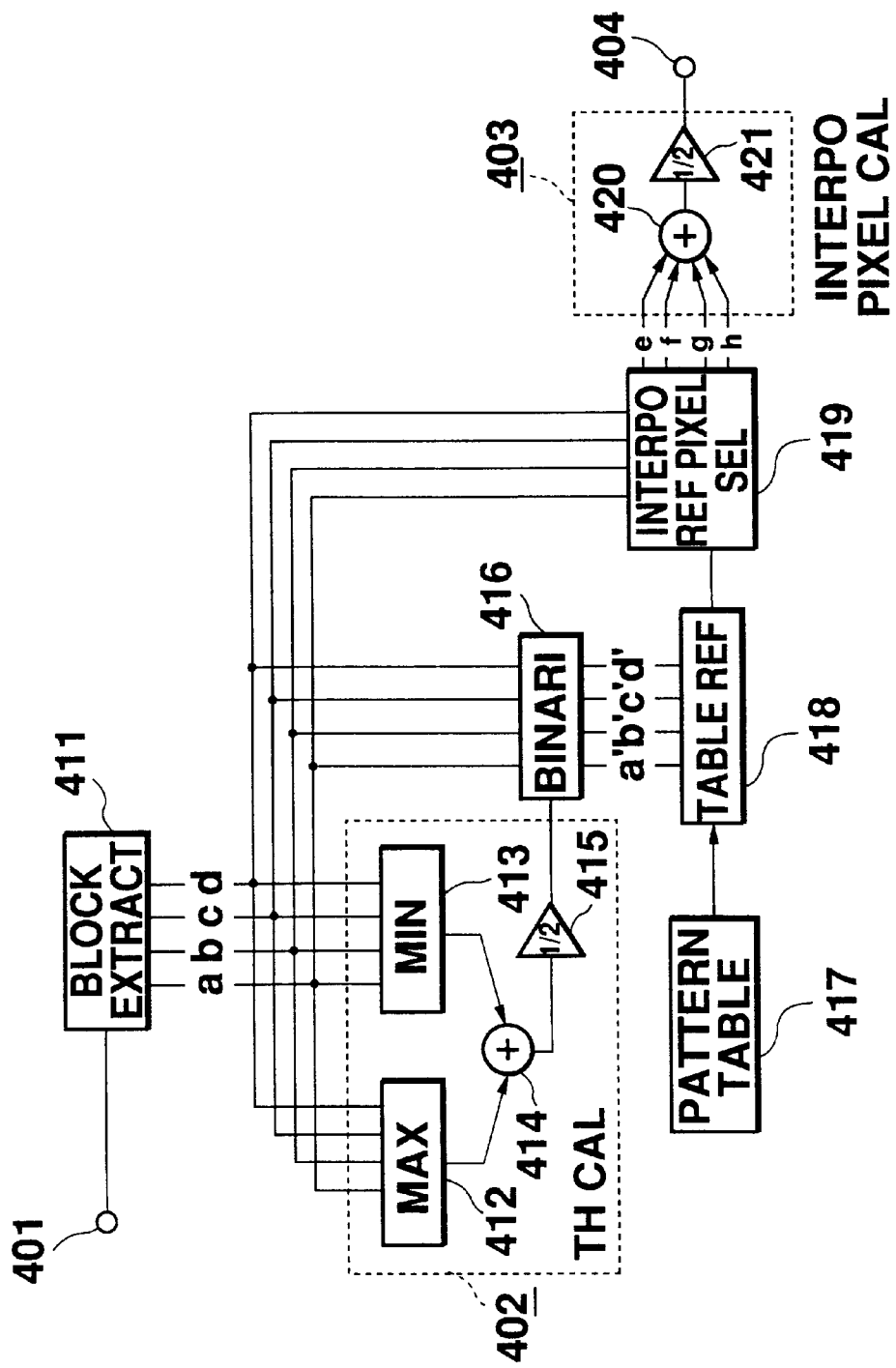
FIG. 39 is a block diagram of an embodiment 3-1 of a pixel interpolation device according to the present invention.

In FIG. 39, there is shown the embodiment 3-1 of a pixel interpolation device according to the present invention. As shown in FIG. 39, the pixel interpolation device is comprised of a block extracting circuit 411 for extracting a block around an omitted pixel of partly omitted digital video signals input from an input terminal 401, a threshold value calculation circuit 402 for calculating a threshold value from extracted block data, a binary coding circuit 416 for coding the block data to form binary codes on the basis of the threshold value calculated by the threshold value calculation circuit 402, a pattern table 417 for setting all combination patterns of previously prepared binary code data and interpolation directions thereof, a pattern table reference circuit 418 for determining the interpolation direction by referring the pattern table 417 and the binary code data, an interpolation reference pixel selecting circuit 419 for selecting necessary pixel data for calculating an interpolation pixel value depending on the output of the pattern table reference circuit 418, and an interpolation pixel value calculation circuit 403 for calculating the interpolation pixel value from the data selected by the interpolation reference pixel selecting circuit 419. The threshold value calculation circuit 402 includes a maximum value calculation circuit 412 for calculating the maximum value from the extracted block data, a minimum value calculation circuit 413 for calculating the minimum value of the extracted block data, an adder 414 for adding the outputs of the maximum value calculation circuit 412 and the minimum value calculation circuit 413, and a ½ factor circuit 415 for multiplying ½ to the output of the adder 414. The interpolation pixel value calculation circuit 403 includes an adder 420 for adding the output data (e, f, g and h) of the interpolation reference pixel selecting circuit 419, and a ¼ factor circuit 421 for multiplying ¼ to the output of the adder 420 to output a result to an output terminal 404.

Figure 40:
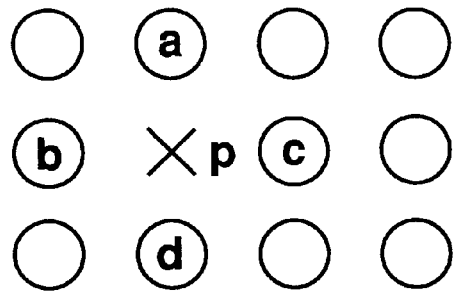
FIG. 40 is a schematic view showing a pixel arrangement used in the device shown in FIG. 39.

Next, the operation of the pixel interpolation device described above will now be described. In this embodiment, for example, a case for interpolating an omitted pixel P shown in FIG. 40 will be described. First, the block extracting circuit 411 extracts 4 peripheral pixels a, b, c and d adjacent to the four sides of the omitted or interpolation pixel P. Now, assuming that the luminance of the 4 pixels are a=70, b=80, c=90 and d=200, the maximum value of the 4 pixels is 200, and the minimum value of the 4 pixels is 70. Hence, the threshold value TH is calculated as follows.

$$TH = (\text{maximum value} + \text{minimum value})/2 = 135$$

On the basis of this threshold value TH, the binary code data a', b', c' and d' are obtained under the following conditions by the binary coding circuit 416 as follows.

X'="0" (X≦TH)
="1" (X>TH) (X: any of a, b, c and d)

Figure 41:
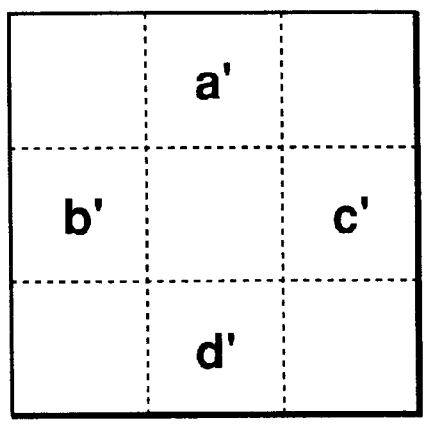
FIG. 41 is schematic view showing a binary coding pattern used in the device shown in FIG. 39.
Figure 41:
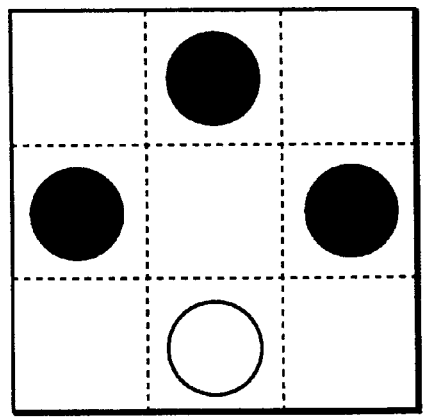

By this calculation, a', b', c' and d' are obtained as shown in FIG. 41, that is, a'="0", b'="0", c'="0", and d'="1".

Figure 42:
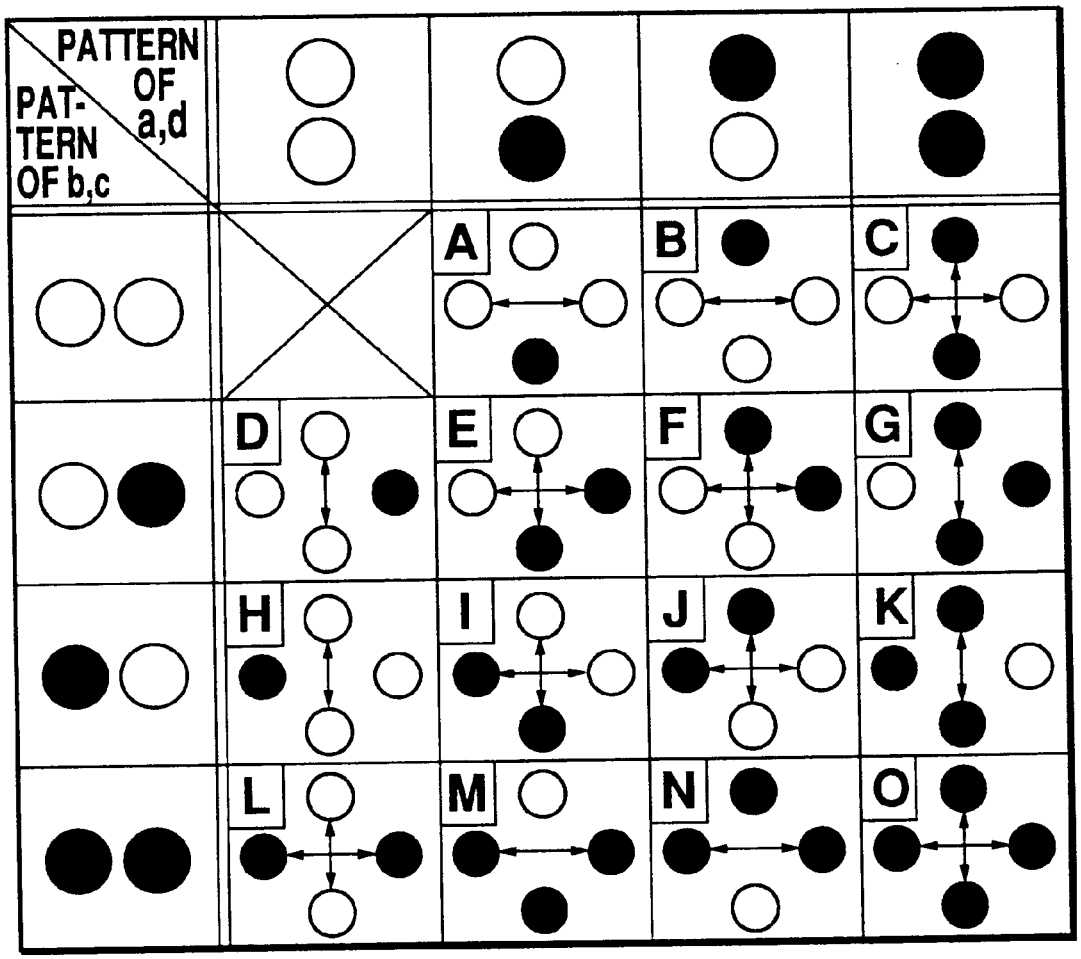
FIG. 42 is a schematic diagram showing a pattern table for setting directions of interpolation reference pixels for a binary coding pattern used in the device shown in FIG. 39.

On the other hand, in the pattern table 417, as shown in FIG. 42, all combination patterns to be obtained by the binary coding and the directions of the interpolation reference pixels corresponding to the combination patterns are stored. The directions of the interpolation reference pixels are determined by considering the directions of the edges of the image by the binary code patterns. In the pattern table reference circuit 418, the binary code data a', b', c' and d' and the pattern table 417 are referred to determine the direction or directions of the interpolation reference pixels. For example, the pattern shown in FIG. 41 is coincident with a pattern N shown in FIG. 42. Hence, the interpolation reference pixel direction is the horizontal direction, and the interpolation pixel value p is calculated as follows.

$$p = (b+c+b+c)/4$$

That is, as shown in FIG. 42, regarding the pattern N, the interpolation reference pixels are b and c, and their average value becomes the above-described interpolation pixel value p.

Figure 43:
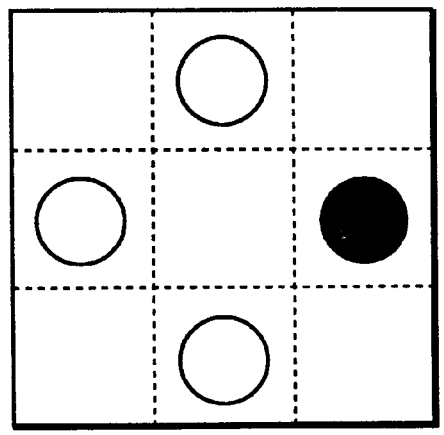
FIGS. 43 and 44 are schematic views showing binary coding patterns used in the device shown in FIG. 39.

Also, in the case of a pattern shown in FIG. 43, it is coincided with a pattern D shown in FIG. 42. Thus, the interpolation reference pixel direction is the vertical direction, and the interpolation pixel value p is obtained as follows.

$$p = (a+d+a+d)/4$$

Figure 44:
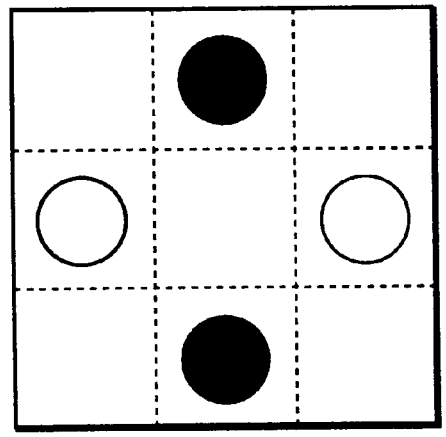

Further, in case of a pattern shown in FIG. 44, it is coincident with a pattern C in FIG. 42. Accordingly, the interpolation reference pixel directions are the horizontal and vertical directions, and the interpolation pixel value p is calculated as follows.

$$p = (a+b+c+d)/4$$

That is, in the interpolation reference pixel selecting circuit 419, depending on the output signal of the pattern table reference circuit 418, the output data of e, f, g and h are output as follows. That is, when the output of the pattern table reference circuit 418 is the horizontal direction, b, b, c and c are output, and when the vertical direction is output from the pattern table reference circuit 418, a, a, d and d are output. Also, when the horizontal and vertical directions are output from the pattern table reference circuit 418, a, b, c and d are output. These output data are calculated in the interpolation pixel value calculation circuit 403 as follows.

$$p=(e+f+g+h)/4$$

Figure 45:
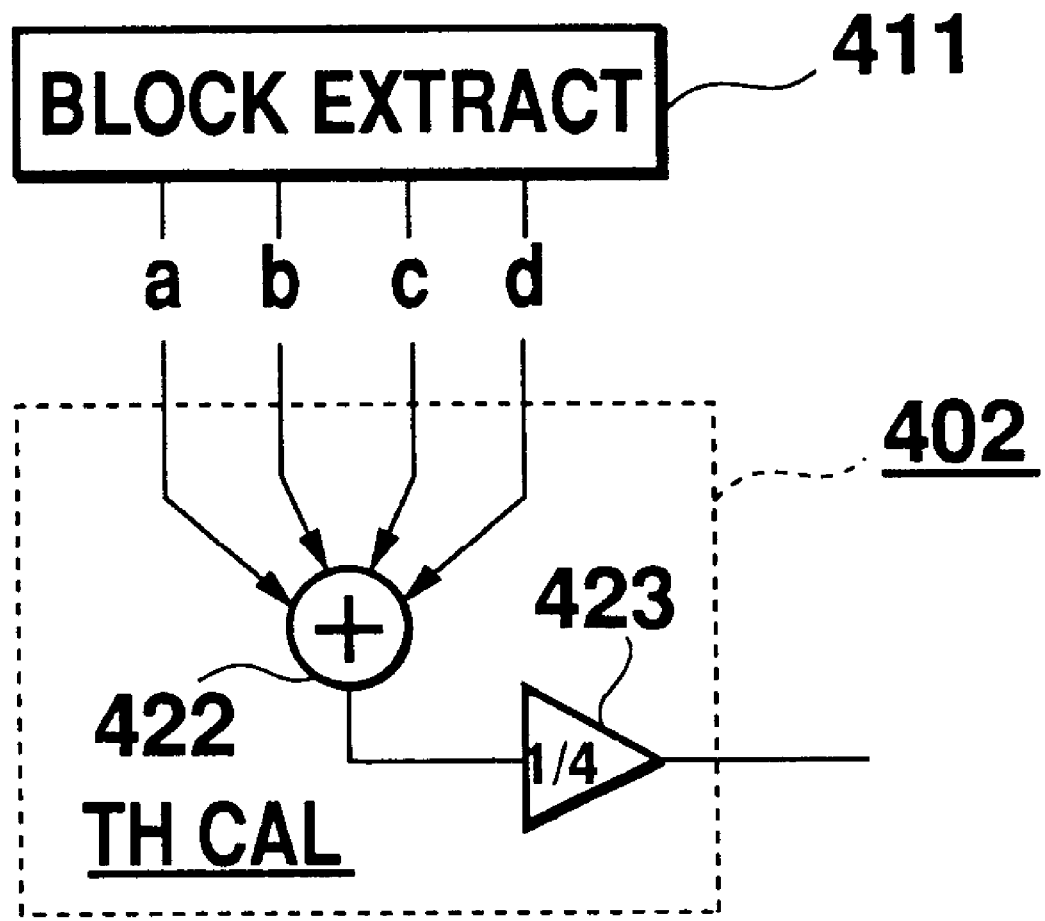
FIG. 45 is a block diagram of a threshold value calculation circuit of an embodiment 3-2 of a pixel interpolation device according to the present invention.

In FIG. 45, there is shown another embodiment of the threshold value calculation circuit of the embodiment 3-2 of a pixel interpolation device according to the present invention. In this embodiment, that is, the other part of the structure is the same as the embodiment 3-1 shown in FIG. 39. The threshold value calculation circuit 402 includes an adder 422 for adding the 4 pixels a, b, c and d, and a ¼ factor circuit 423 for multiplying ¼ to the output of the adder 422. Hence, the threshold value TH is obtained from the 4 pixels a, b, c and d extracted by the block extracting circuit 411 in the threshold value calculation circuit 402 as follows.

$$p=(a+b+c+d)/4$$

In this embodiment, the circuit structure of the threshold value calculation circuit 402 can be simplified, and almost the same operation can be expected.

Figure 46:
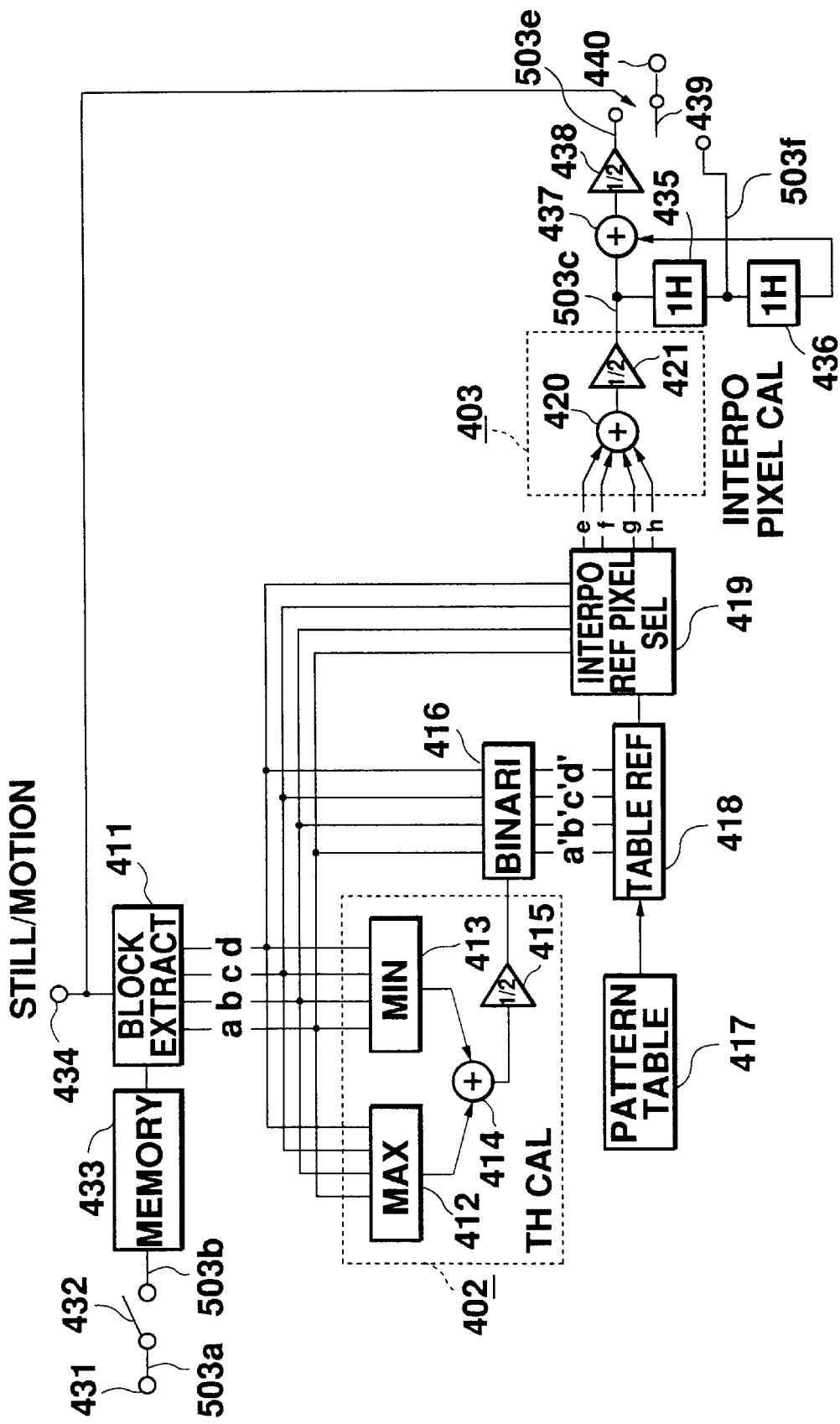

In FIG. 46, there is shown the embodiment 3-3 of a signal processing device with an image memory such as a video printer or the like according to the present invention, to which the embodiment 3-1 of the pixel interpolation device is applied. As shown in FIG. 46, in addition to the parts shown in FIG. 39, the signal processing device further comprises a sampling switch 432 for thinning the digital video data input from an input terminal 431 every pixel, an image memory 433 for storing the output of the sampling switch 432, an input terminal 434 for inputting a still image/motion image switching signal, two one-line memories 435 and 436, an adder 437 for adding the output of the one-line memory 436 and the output of the pixel interpolation device, a ½ factor circuit 438 for multiplying ½ to the output of the adder 437, and a selector 439 connected to an output terminal 440.

Figure 47:
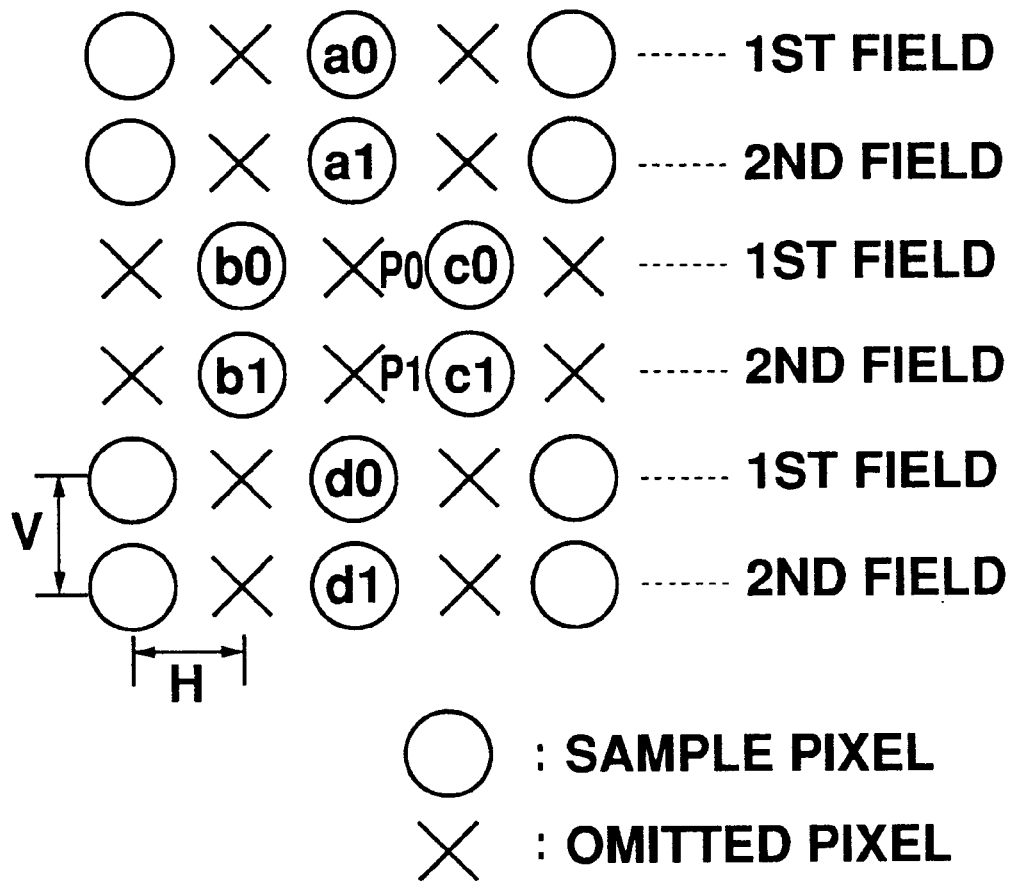
FIG. 47 is a schematic view of a pixel arrangement for explaining a block extraction in the device shown in FIG. 46.

Next, the operation of the signal processing device described above will now be described. Input signals 503a obtained by sampling certain video signals are input to the input terminal 431. In this case, the video signals constitute one field of image by 1/60 sec and two fields of image by 1/30 sec, and two fields constitute one frame or one picture. The input signals 503 are thinned by the sampling switch 432 to obtain thinned signals 503b. FIG. 47 shows a part of a pixel arrangement of the thinned signals 503b in frame unit, and, as shown in FIG. 47, by the sampling switch 432, the phase is inverted every other line within the field and the data are thinned every other pixel. In FIG. 47, H represents one pixel interval in the horizontal direction (hereinafter referred to as "one pixel interval") and V represents one line interval in the frame. One frame of the signals 503b are once stored in the image memory 433, and then the missed or omitted pixels shown in FIG. 47 are interpolated.

Now, for example, the interpolation of the pixels $P_o$ and $P_1$ shown in FIG. 47 will be described. First, in response to the still image/motion image switching signal input to the input terminal 434, peripheral 4 pixels a, b, c and d are extracted in the block extracting circuit 411. In FIG. 47, at the interpolation of the pixel $P_o$, in case of the still image, with respect to a, b, c and d, a1, b0, c0 and d0 are extracted and in case of the motion image, a0, b0, c0 and d0 are extracted. Also, at the interpolation of the pixel $P_1$, in case of the still image, a1, b1, c1 and d0 are extracted and in case of the motion image, a1, b1, c1 and d1 are extracted. That is, at the interpolation of the still image, the pixels nearest the omitted pixel to be interpolated within the frame are extracted and, in turn, at the interpolation of the motion image, since there is a time difference between the first and second fields and one picture is formed by one field, the pixels nearest the omitted pixel within the same field are extracted. Next, by using the extracted 4 pixels, the interpolation pixel value 503c is calculated in the pixel interpolation device according to the process of the embodiment 3-1 described above.

In case of the motion image, as described above, one picture is formed by using only the first or second field. In this case, the one-line memories 435 and 436, the adder 437 and the ½ factor circuit 438 shown in FIG. 46 are provided for forming the omitted line of the data, and the interpolation pixel data 503c and the data 503d of two lines earlier than the data 503 (the data of one preceding line within the field) are added in the adder 437, and the addition result is multiplied by ½ in the ½ factor circuit 438 to obtain an average value 503e. The average value 503e and one line delayed data 503f of the interpolation pixel data 503 are input to the selector 439, and in the selector 439, one of the data 503e and 503f is selected in response to the still image/motion image switching signal input to the input terminal 434. That is, at the still image interpolation, the data 503f are selected, and at the motion image interpolation, the data 503e and 503f are alternately switched every line.

By such an operation, the edges in the inclined directions of the image can be smoothed, and the image quality can be improved.

Figure 48:
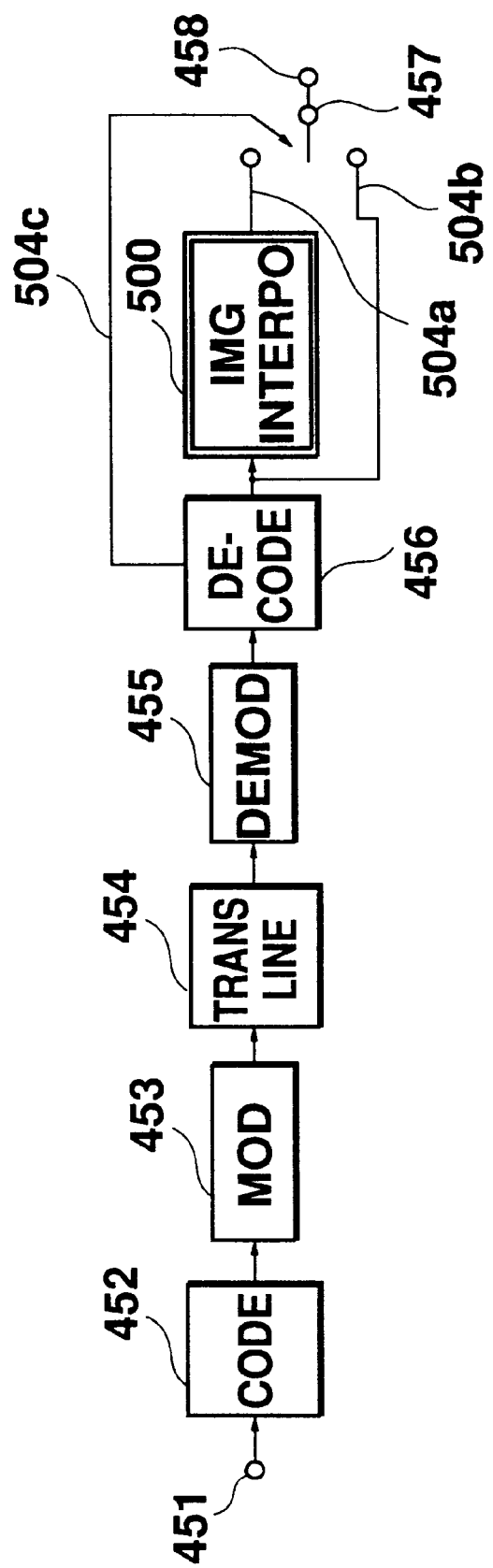
FIG. 48 is a block diagram of embodiment 3-4 of a digital coding transfer device of image signals, including a pixel interpolation device according to the present invention.

In FIG. 48, there is shown the embodiment 3-4 of a digital image data transmission device including the pixel interpolation device described above, according to the present invention. As shown in FIG. 48, the digital image data transmission device comprises a coder 452 for coding video signal input from an input terminal 451, a modulator 453 for modulating the output of the coder 452, a transmission line 454 for transmitting the data modulated by modulator 453, a demodulator 455 for demodulating the transmitted data, a decoder 456 for decoding the data demodulated by the demodulator 455, a pixel interpolation device 500 described above in the embodiment 3-1 or 3-2, and a selector 457 for selecting either the output 504a of the pixel interpolation device 500 or the output 504b of the decoder 456 on the basis of error detection data output from the decoder 456 to output the selected one to an output terminal 458.

Next, the operation of the digital image data transmission device described above will now be described. The video signals input from the input terminal 451 are coded in the coder 452 and the coded data are then modulated in the modulator 453. The modulated data are transmitted to the demodulator 455 via the transmission line 454, and the transmitted data are demodulated in the demodulator 455, and the demodulated data are then decoded in the decoder 456 while errors are detected at the same time. The obtained image data are Pi are input to the pixel interpolation device 500. In the pixel interpolation device 500, the interpolation data 504a of each pixel are calculated and are input to the selector 457. The coded data 504b are also input to the selector 457 from the decoder 456. In the selector 457, the error pixel data of the coded data 504b output from the decoder 456 are replaced with the interpolation data 504a output from the pixel interpolation device 500 on the basis of the error detection data output from the decoder 456 to output the corrected image data from the output terminal 458.

In this embodiment, the uncorrected data caused by the image data transmission are interpolated by using the correct image data to improve the quality of the received image.

Figure 49:
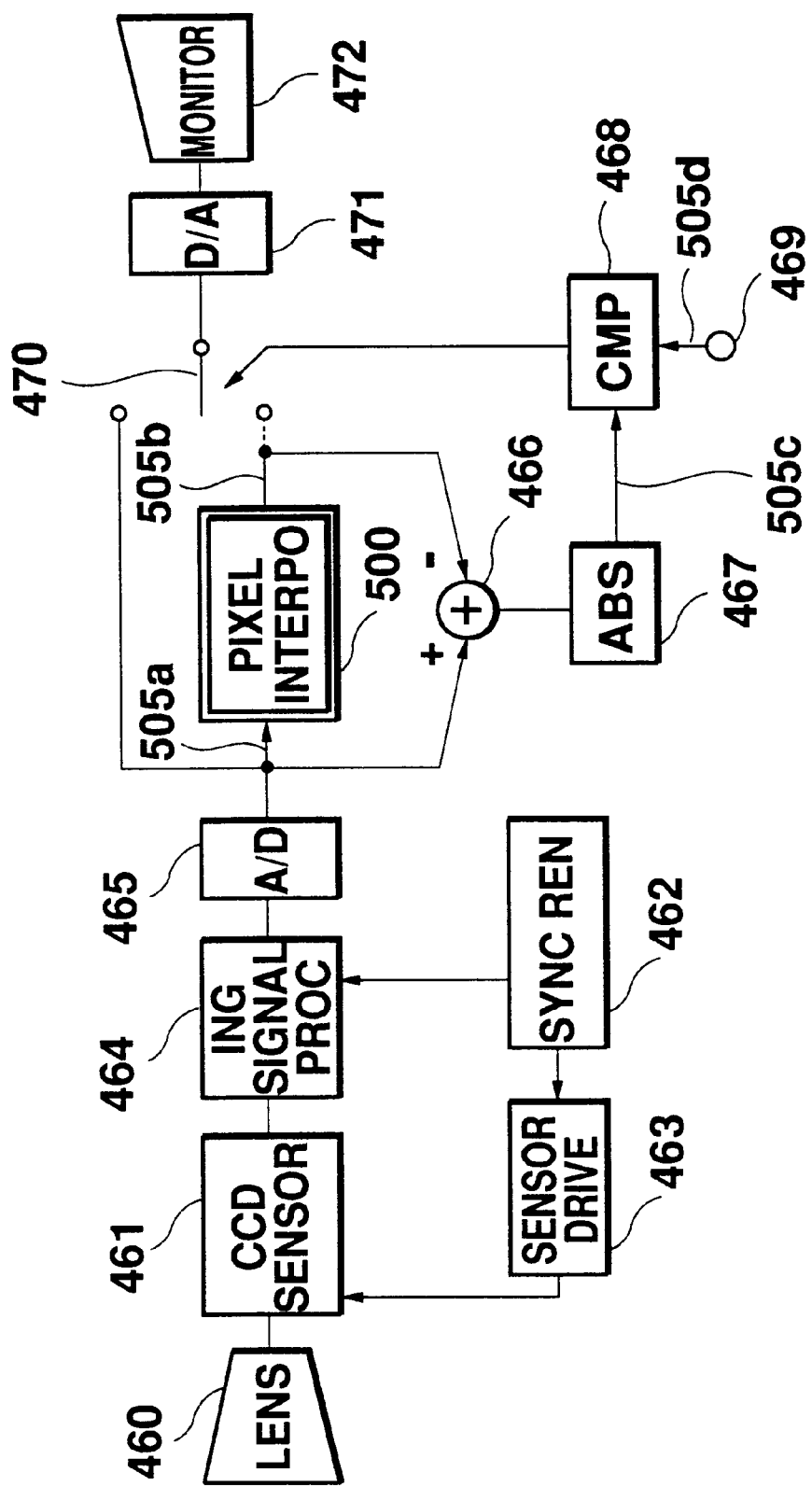
FIG. 49 is a block diagram of embodiment 3-5 of a pixel data correction device including a pixel interpolation device according to the present invention.

In FIG. 49, there is shown the embodiment 3-5 of a pixel data correction device including the interpolation device described above, for correcting error pixel data caused by a pixel omission of a CCD sensor in a CCD camera according to the present invention. As shown in FIG. 49, the pixel data correction device comprises a lens 460 of a camera, a CCD image sensor 461 for photoelectrically converting an image picked up by the lens 460 to obtain image signals, a synchronism generating circuit 462 for generating a synchronous signal for forming the image signals, a sensor driving circuit 463 for generating a clock for driving the CCD image sensor 461 by the synchronous signal generated by the synchronism generating circuit 462, an image signal processing circuit 464 for performing a noise removal, a synchronous signal addition and the like of the output of the CCD image sensor 461, an A/D converter 465 for performing an A/D conversion of the output of the image signal processing circuit 464, a pixel interpolation device 500 described above in the embodiment 3-1 or 3-2, a subtracter 466 for subtracting the output 505b of the pixel interpolation device 500 from the output 505a of the A/D converter 465, an absolute value circuit 467 for calculating an absolute value of the output of the subtracter 466, a comparator 468 for comparing the output 505c of the absolute value circuit 467 with threshold data 505d input from a threshold input terminal 469, a selector 470 for selecting either the output 505a of the A/D converter 465 or the output 505b of the pixel interpolation device 500 on the basis of the output of the comparator 468, a D/A converter 471 for carrying out a D/A conversion of the output of the selector 470 and a monitor 472 for displaying the output of the D/A converter 471.

Next, the operation of the pixel data correction device described above will now be described. In FIG. 49, an image focused on the lens 460 is photoelectrically converted by the two-dimensional CCD image sensor 461 and is successively output in a predetermined order in synchronism with the clock signal output from the sensor driving circuit 463. The output of the CCD image sensor 461 is successively processed in the image signal processor 464 and the A/D converter 465 to obtain the image data 505a. The image data 505a are input to the pixel interpolation circuit 500 to output the interpolated data 505b in the same manner as described above. The image data 505a and the interpolated data 505b are input to the subtracter 466, and the subtraction result is input to the absolute value circuit 467. The absolute value circuit 467 outputs the obtained differential absolute value to the comparator 468, and the threshold value 505d is also input to the comparator 468 from the outside. The comparator 468 compares the differential absolute value 505c with the threshold value 505d in order to discriminate whether or not the image data 505a are error. As a result, When it is discriminated to be error of the pixel of the CCD image sensor 461, the data 505a of the error pixel are replaced with the interpolated data 505b by the selector circuit 470. That is, when 505c>505d, it is discriminated to be error and thus the data 505a are replaced with the data 505b in the selector 470. On the other hand, when 505c≦505d, it is discriminated to be correct and the data 505a are not replaced and are output as is. The corrected image data are output from the selector 470 to the D/A converter 471 and are converted to the analog signals in the D/A converter 471 and the obtained analog signals are sent to the monitor 472 to display a corrected image.

In this embodiment, the correction of the helpless pixel omission within the CCD image sensor 461 can be possible, and the yield in the product fabrication can be improved.

As described above, in the pixel interpolation device according to the present invention, by binary-coding the pixel data of the peripheral pixel block around the omitted pixel, the direction of the local change in the image is assumed, and depending on this result, the interpolation data are formed. Hence, the deterioration of the image quality is small, particularly, the smoothed border lines in the inclined directions can be obtained in the image.

Further, by adding the pixel interpolation device to the CCD sensor, the yield of the CCD sensor can be improved.

Next, the fourth group of the preferred embodiments of the present invention will be described.

Figure 50:
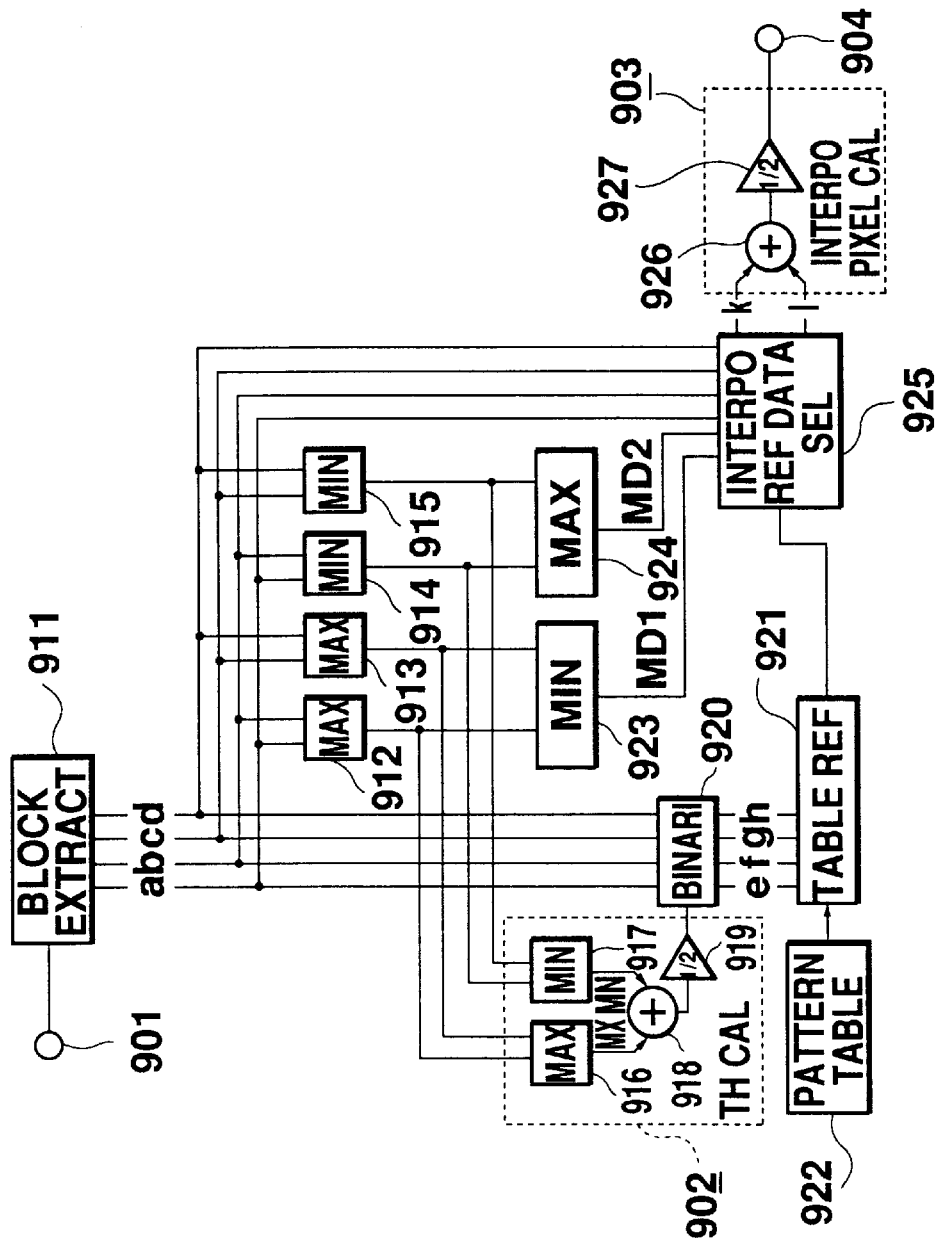
FIG. 50 is a block diagram of an embodiment 4-1 of a pixel interpolation device according to the present invention.

In FIG. 50, there is shown the embodiment 4-1 of a pixel interpolation device according to the present invention. As shown in FIG. 50, the pixel interpolation device comprises a block extracting circuit 911 for extracting a block surrounding an omitted pixel of partly omitted digital video signals input from an input terminal 901 to output block data a, b, c and d of extracted 4 pixels, a maximum value output circuit 912 for outputting the maximum value of the data a and b, a maximum value output circuit 913 for outputting the maximum value of the data c and d, a minimum value output circuit 914 for outputting the minimum value of the data a and b, a minimum value output circuit 915 for outputting the minimum value of the data c and d, a threshold value calculation circuit 902 for calculating a threshold value from the output data of the maximum value output circuits 912 and 913 and the minimum value output circuits 914 and 915, a binary coding circuit 920 for coding the block data to form binary codes on the basis of the threshold value output from the threshold value calculation circuit 902, a pattern table 922 for setting all combination patterns of previously prepared binary code data and interpolation directions thereof, a pattern table reference circuit 921 for determining the interpolation directions by referring the pattern table 922 and the binary code data, a minimum value output circuit 923 for calculating the minimum value MD1 of the output data of the maximum value output circuits 912 and 913, a maximum value output circuit 924 for calculating the maximum value MD2 of the output data of the minimum value output circuits 914 and 915, an interpolation reference data selecting circuit 925 for selecting necessary pixel data for calculating an interpolation pixel value depending on the output of the pattern table reference circuit 921, and an interpolation pixel value calculation circuit 903 for calculating the interpolation pixel value from the data selected by the interpolation reference data selecting circuit 925. The threshold value calculation circuit 902 includes a maximum value calculation circuit 916 for calculating the maximum value of the output data of the maximum value output circuits 912 and 913, that is the maximum value MX of the block data extracted by the block extracting circuit 911, a minimum value calculation circuit 917 for calculating the minimum value of the output data of the minimum value output circuits 914 and 915, that is, the minimum value MN of the block data extracted by the block extracting circuit 911, an adder 918 for adding the outputs of the maximum value calculation circuit 916 and the minimum value calculation circuit 917, and a ½ factor circuit 919 for multiplying ½ to the output of the adder 918. The interpolation pixel value calculation circuit 903 includes an adder 926 for adding the output data k and l of the interpolation reference data selecting circuit 925, and a ½ factor circuit 927 for multiplying a factor of ½ to the output of the adder 926 to output a result to an output terminal 904.

Next, the operation of the pixel interpolation device described above will now be described. In this embodiment, for example, a case for interpolating an omitted pixel P shown in FIG. 40 will be described. First, the block extracting circuit 911 extracts peripheral 4 pixels a, b, c and d adjacent to the four sides of the omitted or interpolation pixel P. In the maximum value output circuits 912 and 913 and the minimum value output circuits 914 and 915, from the data of a, b, c and d, the maximum and minimum values such as MAX (a, b), MAX (c, d), MIN (a, b) and MIN (c, d) are calculated, and then in the maximum value calculation circuit 916 and the minimum value calculation circuit 917 of the threshold value calculation circuit 902. From the calculation data, the maximum value MX=MAX {MAX (a, b), MAX (c, d)} and the minimum value MN=MIN {MIN (a, b), MIN (c, d)} are calculated. Now, assuming that the luminance of the 4 pixels are a =70, b=80, c=90 and d=200, the maximum value MX is 200, and the minimum value MN is 70. Hence, the threshold value TH is calculated as follows.

$$TH=(MX+MN)/2=135$$

On the basis of this threshold value TH, the data a, b, c and d are converted to binary code data e, f, g and h under the following conditions in the binary coding circuit 920 as follows.

X'="0" (X≦TH)
="1" (X>TH)
{(X, X'): any of (a, e), (b, f), (c, g) and (d, h)}

Figure 51:
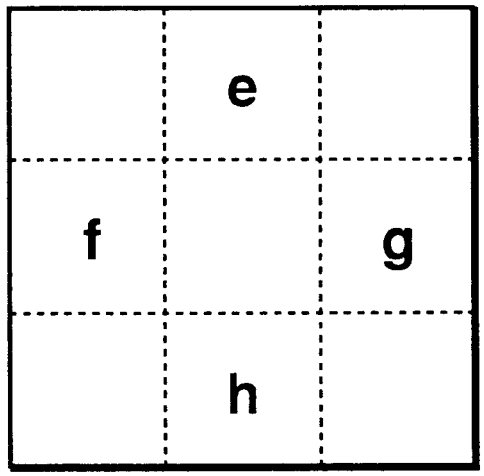
FIG. 51 is a schematic view of a binary coding pattern for explaining a binary coding process in the device shown in FIG. 50.
Figure 51:
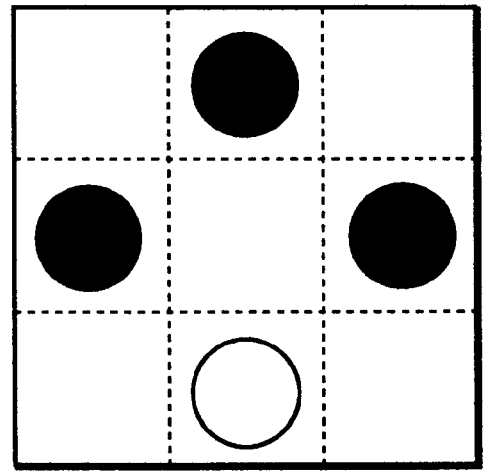

By this calculation, e, f, g and h are obtained as shown in FIG. 51, that is, e=0, f=0, g=0 and h=1.

Figure 52A:
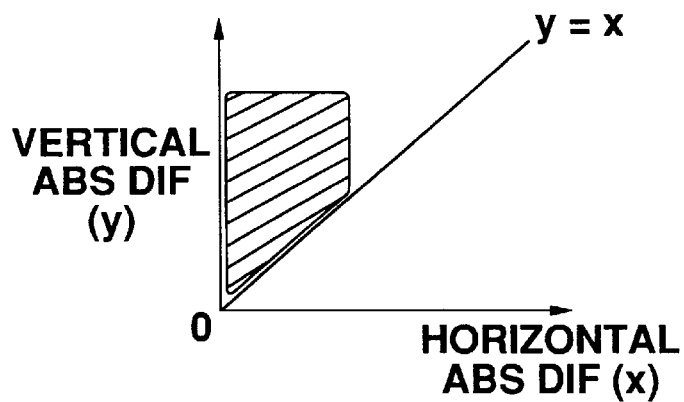
FIGS. 52a, 52b and 52c are schematic diagrams showing correlativity of data of pixel blocks used in the device shown in FIG. 50.
Figure 52B:
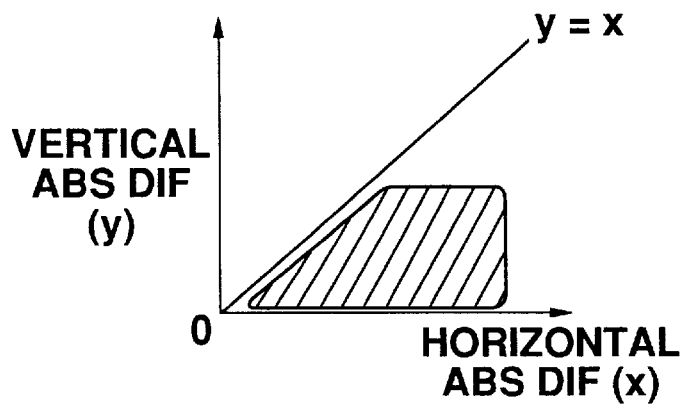
Figure 52C:
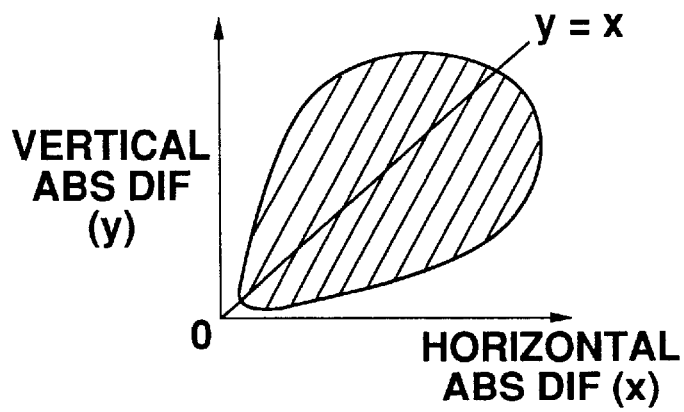

On the other hand, in the pattern table 922, as shown in FIG. 42, all combination patterns to be obtained by the binary coding and the directions of the interpolation reference pixels corresponding to the combination patterns are stored. The directions (central arrows in the horizontal and/or vertical directions in each pattern) of the interpolation reference pixels are determined by considering the directions of the edges of the image by the binary code patterns. Then, adequacy of the directions of the interpolation reference pixels will now be described in connection with FIGS. 52*a*, 52*b* and 52*c*. Every pixel block of some images, the differential absolute value in the horizontal direction (the absolute value of the difference between the data of the pixels b and c in FIG. 40) and the differential absolute value in the vertical direction (the absolute value of the difference between the data of the pixels a and d in FIG. 40) are calculated and the obtained values are graphically drawn in the directions of the interpolation reference pixels to obtain FIGS. 52*a*, 52*b* and 52*c*. That is, FIG. 52*a* is a graph of a pixel block in which the correlative direction of the interpolation reference pixels is the horizontal direction, and it is readily understood that in all data, the differential absolute value in the horizontal direction is smaller than the differential absolute value in the vertical direction, and all data is correlated with the same horizontal direction as the interpolation reference pixels. FIG. 52*b* is a graph of a pixel block in which the correlative direction of the interpolation reference pixels is the vertical direction, and it is readily understood that in all data, the differential absolute value in the vertical direction is smaller than the differential absolute value in the horizontal direction, and all data is correlated with the same vertical direction as the interpolation reference pixels. FIG. 52*c* is a graph of a pixel block in which the correlative direction of the interpolation reference pixels is not specific, and it is readily understood that the data are present near positions of y=x where the differential absolute value in the horizontal direction is equal to the differential absolute value in the vertical direction, and all data is not correlated with the horizontal nor vertical direction. As described above, the directions of the interpolation reference pixels, determined in the pattern table, are coincident with the correlative directions of the data of the pixel blocks, and the adequacy can be proved.

In the pattern table reference circuit 921, the pattern table 922 and the binary code data e, f, g and h are referred to determine the direction or directions of the interpolation reference pixels. For example, the pattern shown in FIG. 51 is coincident with a pattern N shown in FIG. 42. Hence, the interpolation reference pixel direction is the horizontal direction, and the interpolation pixel value p is calculated as follows.

$$p=(b+c)/2$$

Figure 53:
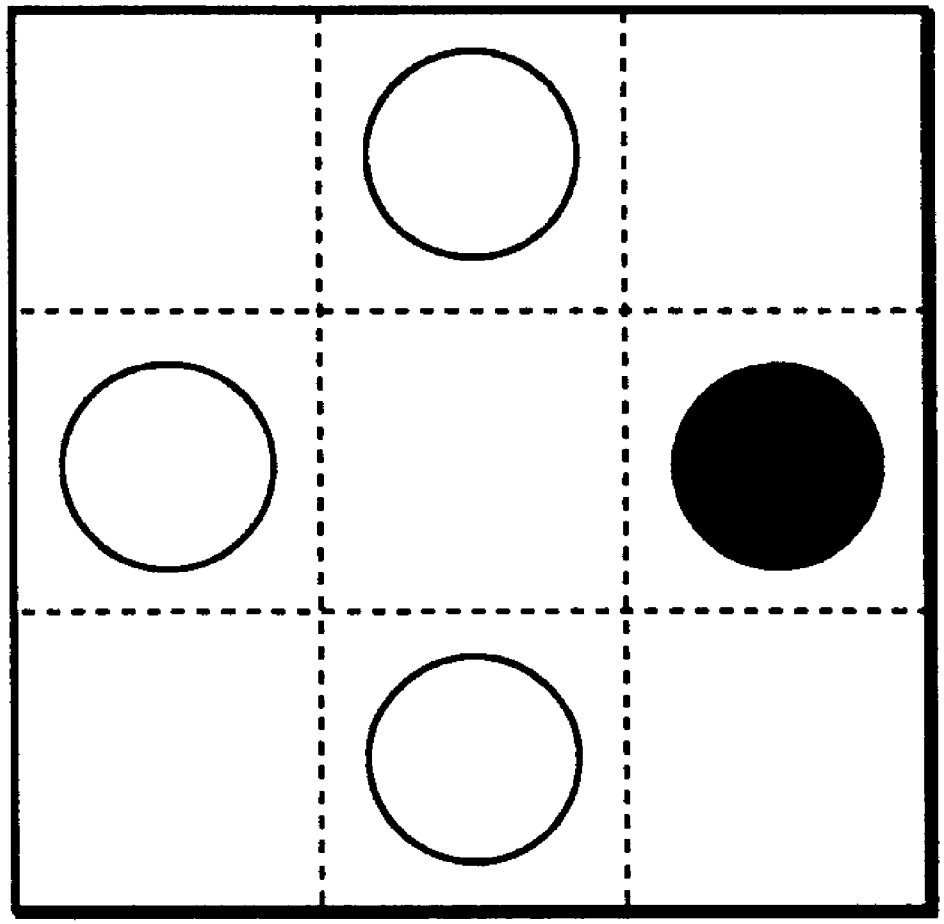
FIGS. 53 and 54 are schematic views showing binary coding patterns used in the device shown in FIG. 50.

Also, in case of a pattern shown in FIG. 53, it is coincided with a pattern D shown in FIG. 42. Thus, the interpolation reference pixel direction is the vertical direction, and the interpolation pixel value p is obtained as follows.

$$p=(a+d)/2$$

Figure 54:
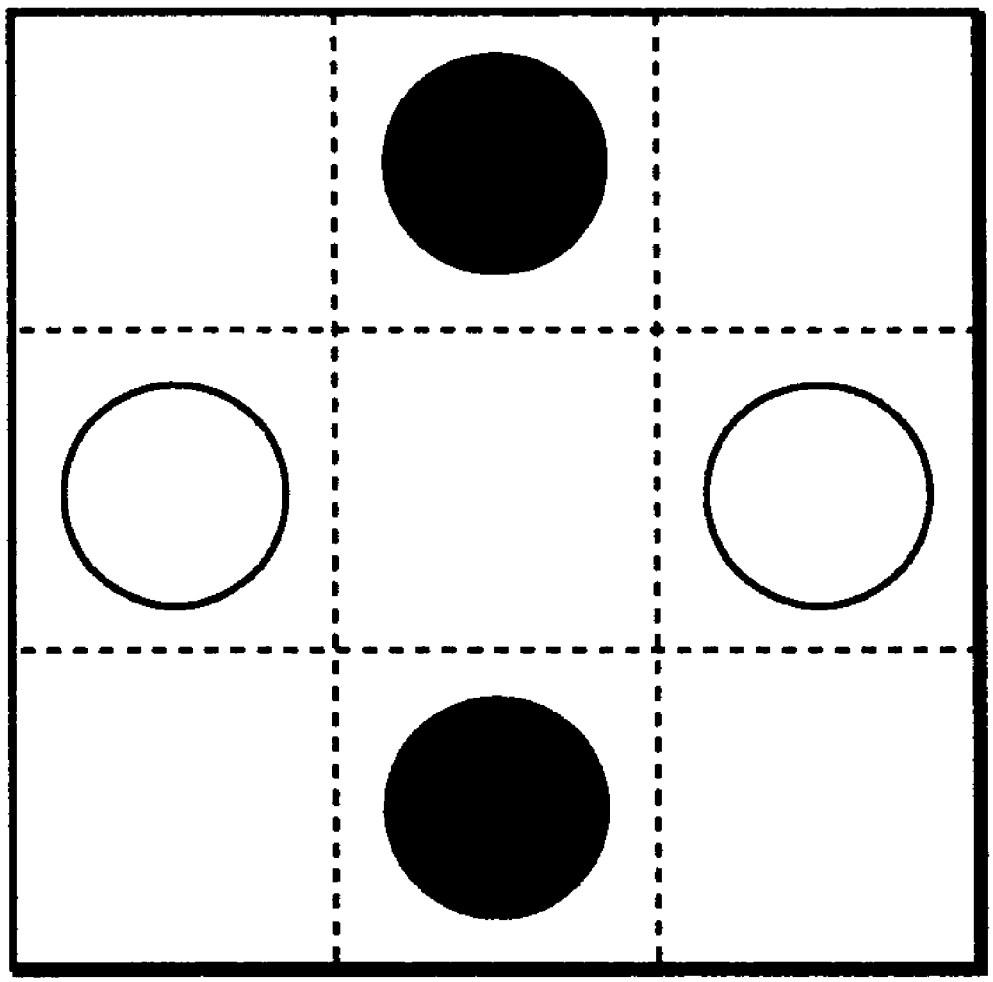

Further, in case of a pattern shown in FIG. 54, in which the interpolation reference pixel direction is not specified, that is, a pattern C in FIG. 42 (there are arrows in both the horizontal and vertical directions in the center of the pattern). In this case, the interpolation pixel value p is calculated as follows.

$$p=(MD1+MD2)/2$$

Now, MD1 and MD2 are the data which are selected from the block data a, b, c and d and satisfy the respective conditions such as MX≧MD1 and MD2≧MN. Also, in this case, MD1 and MD2 are obtained from the output data of the maximum value output circuits 912 and 913 and the minimum value output circuits 914 and 915 in the minimum value output circuit 923 and the maximum value output circuit 924, respectively. Hence, in the interpolation reference data selecting circuit 925, as the data of k and 1, the data b and c are output when the output of the pattern table reference circuit 921 is the horizontal direction, and the data a and d are output when the vertical direction is output from the pattern table reference circuit 921. Also, when the direction can not be specified in the pattern table reference circuit 921, both MD1 and MD2 are output. Thus the output data of k and l are calculated in the interpolation pixel value calculation circuit 903 as follows.

$$(k+l)/2$$

Figure 55:
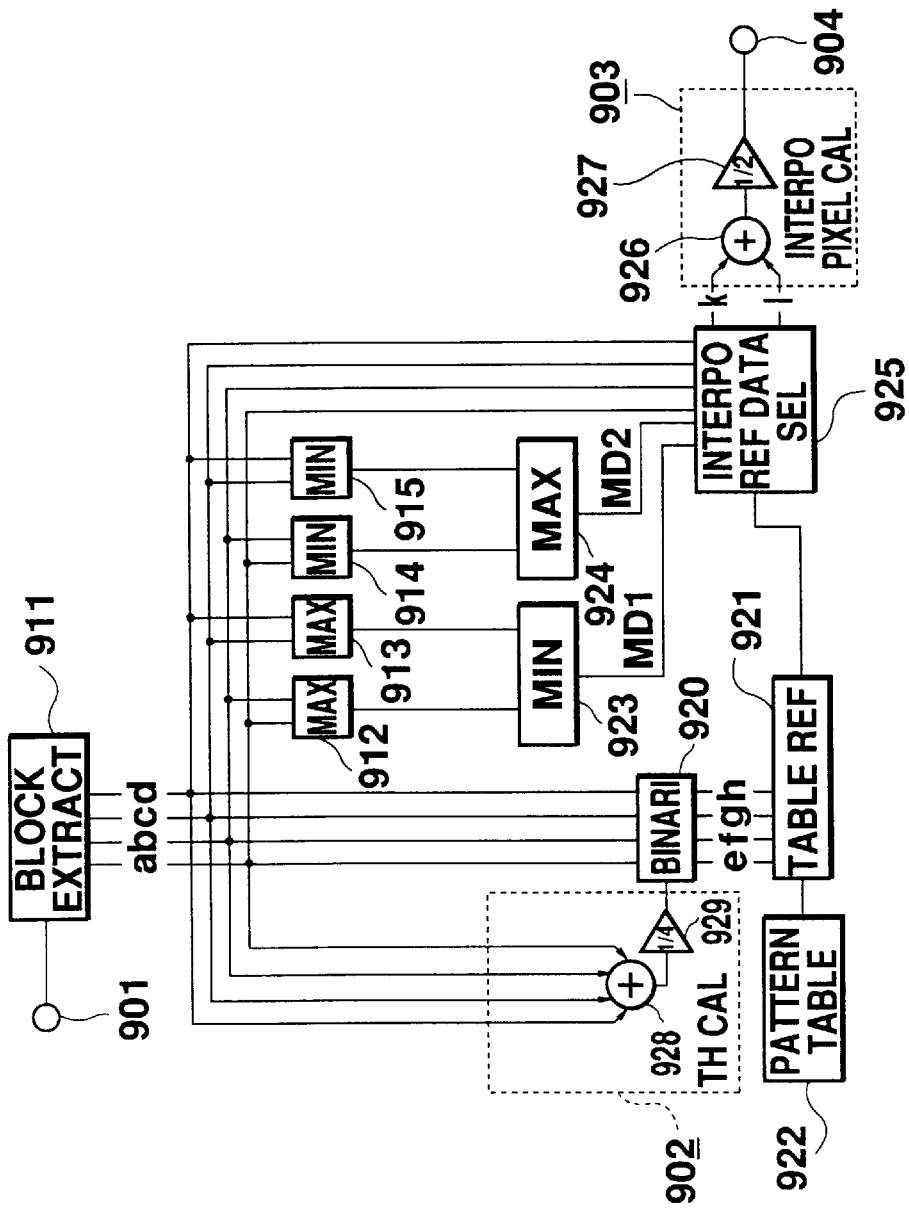
FIG. 55 is a block diagram of an embodiment 4-2 of a pixel interpolation device according to the present invention.

In FIG. 55, there is shown the embodiment 4-2 of a pixel interpolation device according to the present invention, having the same construction as the embodiment 4-1 shown in FIG. 50, except that the threshold value calculation circuit 902 includes an adder 928 for adding the block data a, b, c and d and a ¼ factor circuit 929 for multiplying ¼ to the addition result of the adder 928 to obtain the threshold value TH=(a+b+c+d)/4. In this embodiment, the circuit structure of the threshold value calculation circuit 902 can be simplified, and almost the same operation can be expected.

Figure 56:
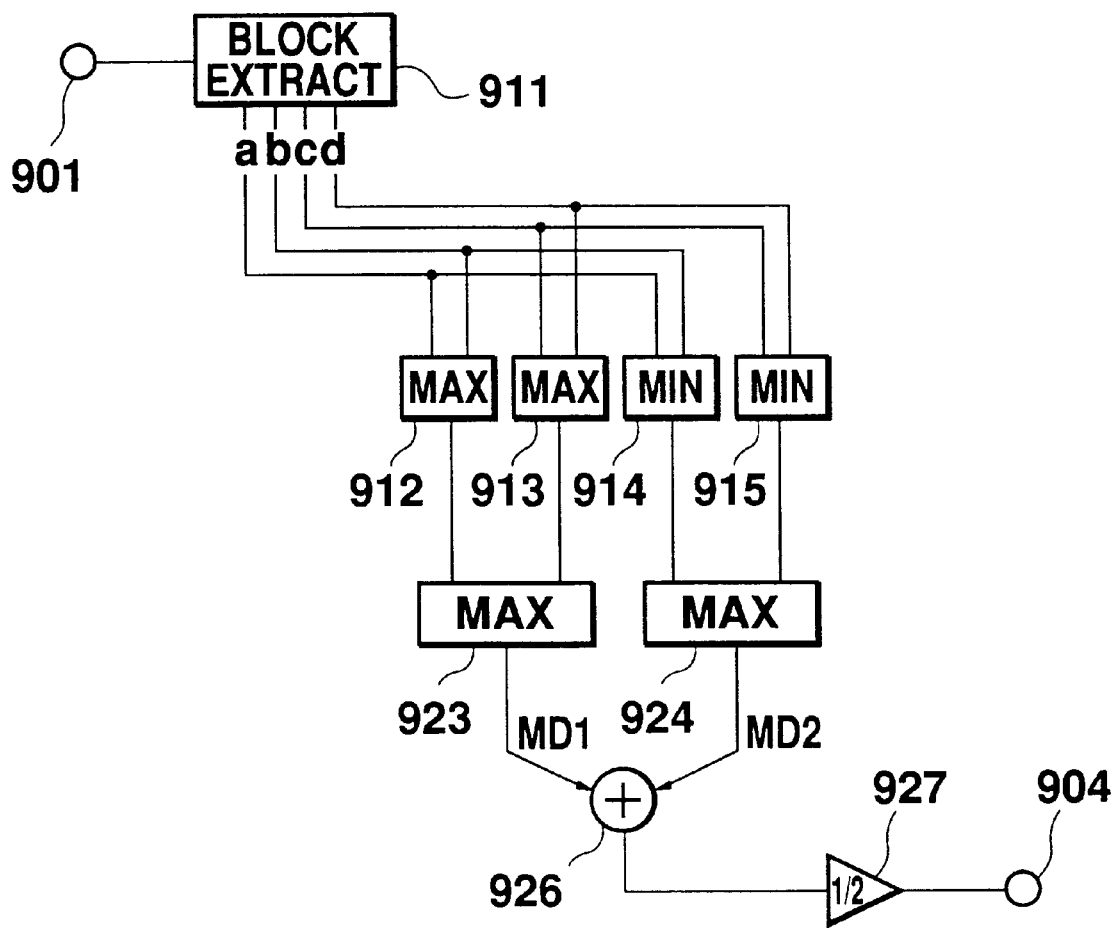
FIG. 56 is a block diagram of an embodiment 4-3 of a pixel interpolation device according to the present invention.

In FIG. 56, there is shown an essential part of the embodiment 4-3 of a pixel interpolation device according to the present invention. As to the other part not shown in FIG. 56, the corresponding parts shown in FIG. 50 or FIG. 55 can be used if necessary.

In the embodiments 4-1 and 4-2 shown in FIGS. 50 and 55, as described above, the interpolation pixel value is obtained according to the pattern table shown in FIG. 42. The patterns shown in FIG. 42 can be classified into four groups. The first group includes patterns having one white circle and three black circles, as typically shown in FIG. 51. The second group includes patterns having three white circles and one black circle, as shown in FIG. 53. The third group includes patterns having two white circles and two black circles, as shown in FIG. 54. The fourth group includes a pattern having four black circles. The 4 pixel data constituting each pattern have four values such as the maximum value MX, the minimum value MN and two intermediate values MD1 and MD2, as described above. As shown in FIG. 42, relating to the first group of the patterns, an average value of two data of two pixel within three pixels excluding the white circle pixel having the maximum value MX, that is, two data of the three data MD1, MD2 and MN, is the interpolation pixel value. As to the second group of the pattern, on the contrary, an average value of two data of two pixel within three pixels excluding the black circle pixel having the minimum Value MN, that is, two data of the three data MX, MD1 and MD2, is the interpolation pixel value. With regard to the third and fourth groups of the patterns, the average value of MD1 and MD2 is the interpolation pixel value. That is, as described above, the probability for obtaining the interpolation pixel value of the patterns by using MD1 and MD2 except MX nor MN is quite high. Hence, in this embodiment, in order to reduce the circuit scale of the pixel interpolation device, the average value of MD1 and MD2 is used as the interpolation pixel value irrespective of the aforementioned patterns.

As shown in FIG. 56, the pixel interpolation device is comprised of the block extracting circuit 911 for extracting the pixel block data a, b, c and d from the input image data input from the input terminal 901, the maximum value output circuits 912 and 913, the minimum value output circuits 914 and 915, the minimum value output circuit 923 to output MD1, the maximum value output circuit 924 to output MD2, the adder 926 for adding MD1 and MD2, and the ½ factor circuit 927 for multiplying ½ to the addition result MD1+MD2 of the adder 926 to output the average value (MD1+MD2)/2 to the output terminal 904. The structures and functions of the above-described parts are the same as those of the embodiment 4-1 or 4-2 described above and thus the detailed description thereof can be omitted for the sake of brevity.

Figure 57:
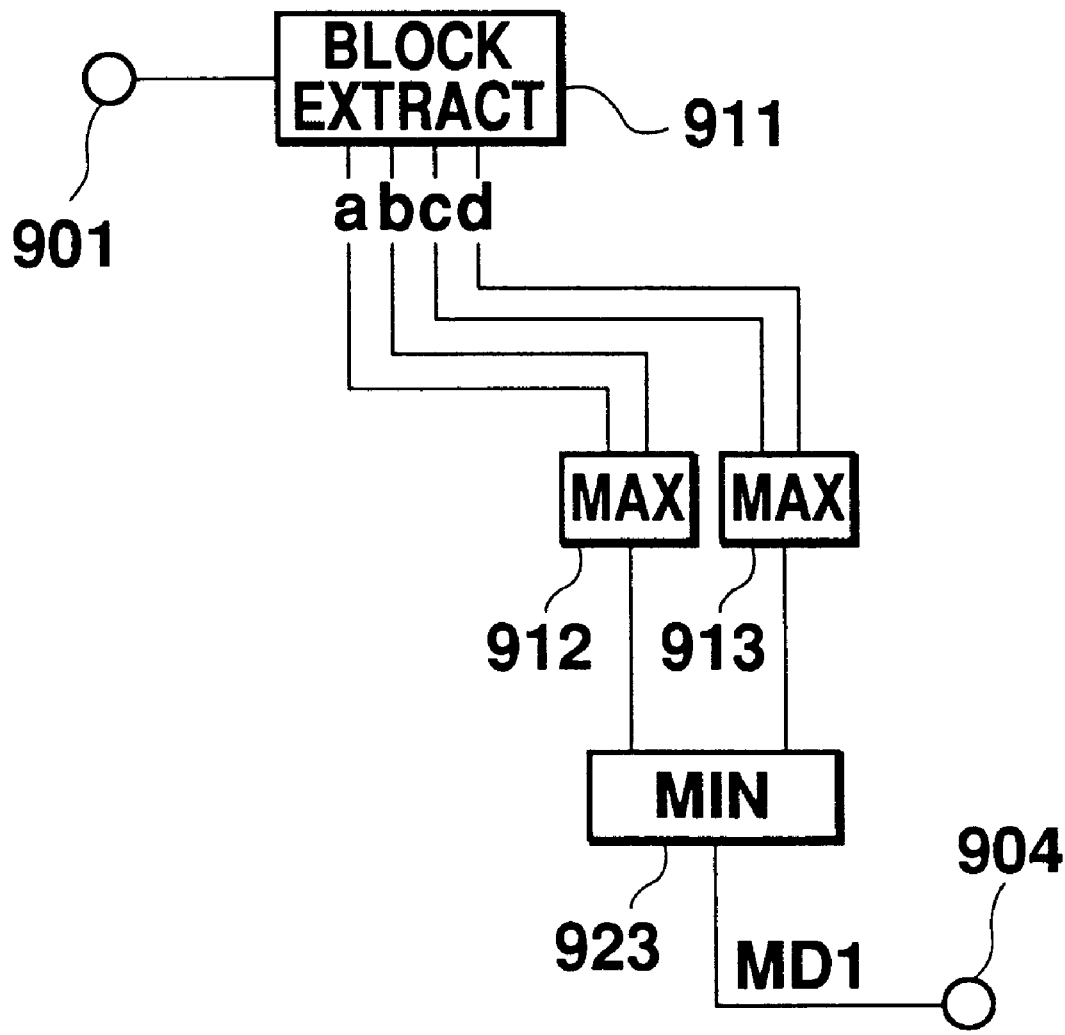
FIG. 57 is a block diagram of an embodiment 4-4 of a pixel interpolation device according to the present invention.

In FIG. 57, there is shown the embodiment 4-4 of a pixel interpolation device according to the present invention. In this embodiment, the construction of the pixel interpolation device is further simplified as compared with the embodiment 4-3 shown in FIG. 56. As shown in FIG. 57, the pixel interpolation device comprises the block extracting circuit 911 coupled with the input terminal 901, the maximum value output circuits 912 and 913 and the minimum value output circuit 923 to output MD1 from the output terminal 904. In this embodiment, MD1 is output as the interpolation pixel value. In this embodiment, as shown in FIG. 57, although the maximum value output circuits 912 and 913 and the minimum value output circuit 923 are used for outputting MD1, on the contrary, in place of these parts, by using the minimum value output circuits 914 and 915 and the maximum value output circuit 924, MD2 can be used as the interpolation pixel value. In this embodiment, by not using the average value of MD1 and MD2 as the interpolation pixel value but using either MD1 or MD2, the circuit scale can be further reduced, and the processing speed can be raised. Hence, this pixel interpolation device can also be used for receiving processing in a so-called high vision TV receiver or the like.

As described above, in the pixel interpolation device according to the present invention, by binary-coding the peripheral pixel block around the omitted pixel, the local change direction of the image is assumed, and depending on this result, the interpolation data are formed. The drop of the image quality is small, in particular, the image having the smoothed inclined border lines can be obtained.

Further, in the pixel interpolation device according to the present invention, regardless of the changing direction of the image, the interpolation pixel value is obtained by using the data of the peripheral pixel block around the omitted pixel except the maximum and minimum values. Hence, nevertheless a little image quality drop, almost the same effects as the aforementioned pixel interpolation device can be obtained, and the pixel interpolation device with a small circuit scale and high processing speed can be obtained.

Next, the fifth group of the preferred embodiments of the present invention will be described.

Figure 58:
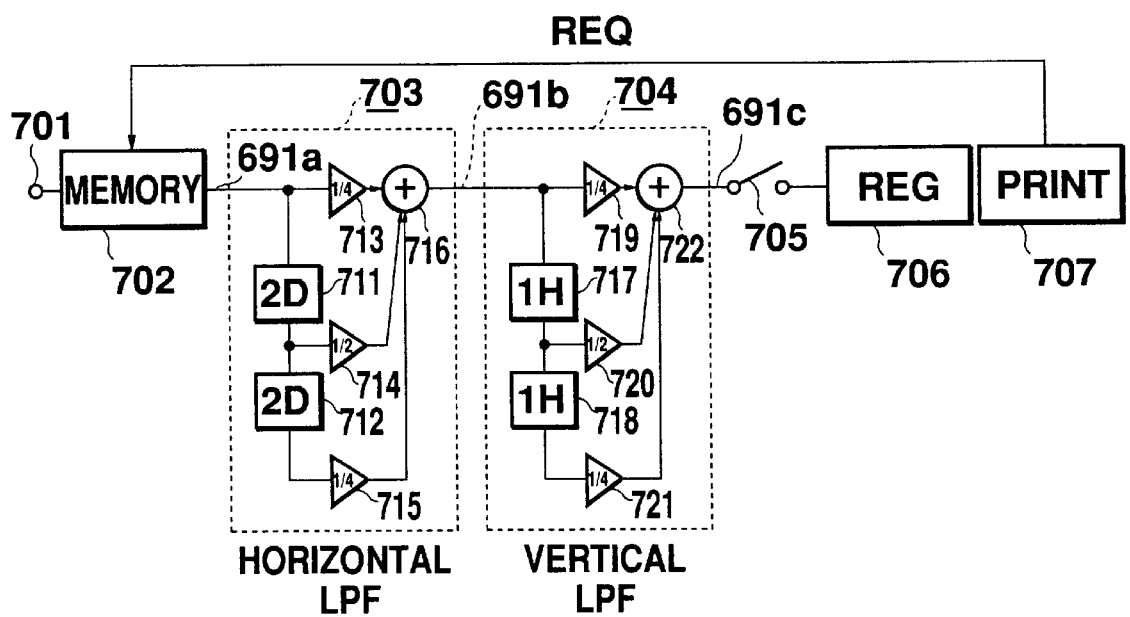
FIG. 58 is a block diagram of an embodiment 5-1 of a multipicture formation device for use in a video printer according to the present invention.

In FIG. 58, there is shown the embodiment 5-1 of a same 16 multipicture formation device for use in a video printer or the like according to the present invention. As shown in FIG. 58, the multipicture formation device comprises an image memory 702 for storing one field of image data or digital video signals input from an input terminal 701, a horizontal direction LPF (low pass filter) 703, a vertical direction LPF 704, a thinning switch 705 for thinning the output of the vertical direction LPF 704, a register 706 for storing one line of image data output from the thinning switch 705 and a printer 707. The horizontal direction LPF 703 includes two 2D delays 711 and 712 for delaying 2 pixels, two ¼ factor circuits 713 and 715 for multiplying a factor of ¼ to the input, a ½ factor circuit 714 for multiplying ½ to the input and an adder 716 for adding the outputs of the factor circuits 713, 714 and 715. The vertical direction LPF 704 includes two one-line delays 717 and 718 for delaying one line, two a factor of ¼ factor circuits 719 and 721 for multiplying a factor of ¼ to the input, a ½ factor circuit 720 for multiplying a factor of ½ to the input and an adder 722 for adding the outputs of the factor circuits 719, 720 and 721.

Next, the operation of the multipicture formation device described above will now be described. The video signals input to the input terminal 701 are stored for one field in the image memory 702 at a certain timing. The image data stored in the image memory 702 are read line by line therefrom in response to a request signal REQ output from the printer 707, and the readout image data $691a$ are input to the horizontal direction LPF 703. In the horizontal direction LPF 703, the data $691a$ are successively input to the 2D delay 711 and 712 where the data are delayed two pixels in every 2D delay. The data $691a$ are also input to the ¼ factor circuit 713, and the ¼ factor circuit 713 multiplies a factor of ¼ to the data $691a$ to output the result to the adder 716. The outputs of the 2D delays 711 and 712 are input to the ½ factor circuit 714 and the ¼ factor circuit 715, respectively, and the ½ factor circuit 714 and the ¼ factor circuit 715 multiply a factor of ½ and ¼ to the delayed data, respectively, to output the results to the adder 716. The adder 716 adds the outputs of the ¼ factor circuit 713, the ½ factor circuit 714 and the ¼ factor circuit 715 to output the addition result as the data $691b$. In this case, the transfer characteristic $6f$ the horizontal direction LPF 703 from the data $691a$ to the data $691b$ is represented as follows.

$$H(Z)=(1+Z^{-2})^2/4$$

Figure 59:
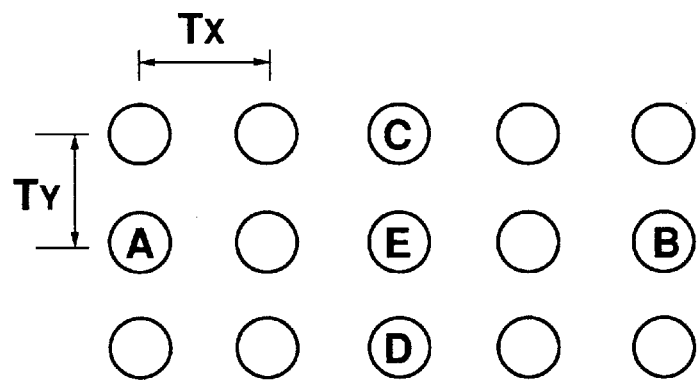
FIG. 59 is a schematic view showing a pixel arrangement used in the device shown in FIG. 58.

($Z^{-2}$: two pixel delay in space)
This transfer characteristic corresponds to the following calculation for obtaining an E point in FIG. 59 as a calculation on a pixel arrangement.

$$E=(A+2\cdot E+B)/4$$

In FIG. 59, Tx represents a period between two pixels in the horizontal direction and Ty represents a period between two lines. Then, the data 691*b* output from the horizontal direction LPF 703 are input to the vertical direction LPF 704. In the vertical direction LPF 704, the data 691*b* are successively input to the one-line delay 717 and 718 where the data are delayed one line in every one-line delay. The data 691*b* are also input to the ¼ factor circuit 719, and the a factor of ¼ factor circuit 719 multiplies ¼ to the data 691*b* to output the result to the adder 722. The outputs of the one-line delays 717 and 718 are input to the ½ factor circuit 720 and the ¼ factor circuit 721, respectively, and the ½ factor circuit 720 and the ¼ factor circuit 721 multiply factors of ½ and ¼ to the delayed data, respectively, to output the results to the adder 722. The adder 722 adds the outputs of the ¼ factor circuit 719, the ½ factor circuit 720 and the ¼ factor circuit 721 to output the addition result as the data 691*c*. In this case, the transfer characteristic of the vertical direction LPF 704 from the data 691*b* to the data 691*c* is represented as follows.

$$H(Z)=(1+Z^{-1})^2/4$$

($Z^{-1}$: one line delay in space)
This transfer characteristic corresponds to the following calculation for obtaining the E point in FIG. 59 as a calculation on the pixel arrangement.

$$E=(C+2\cdot E+D)/4$$

Next, the data 691*c* output from the vertical direction LPF 704 are thinned every other line in the thinning switch 705, and the thinned data are further thinned to ¼ pixels. The thinned data are separately stored into four areas of the four-divided register 706. The data stored in the register 706 are read out for one line of data and are consecutively printed line by line by the printer 707. By repeating the above-described operation, a same 16 image multipicture (a picture composed of the same reduced pictures arranged in 4×4=16 pieces) is printed out.

Figure 60B:
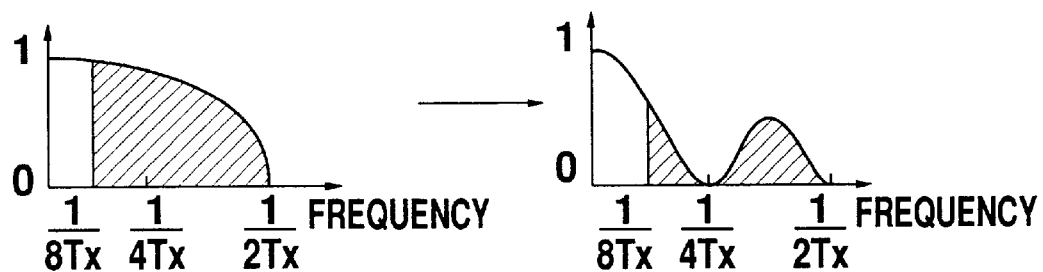
Figure 60B:
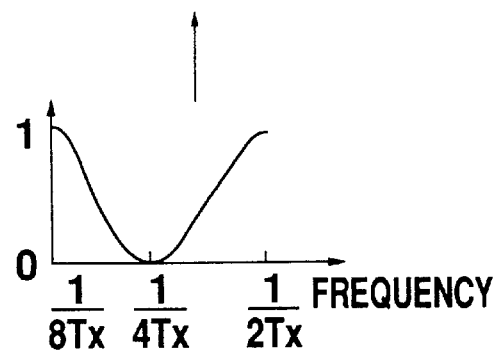
Figure 61A:
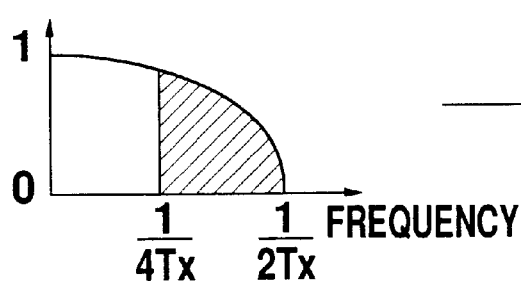
FIGS. 61a, 61b and 61c are schematic diagrams showing frequency characteristics of a vertical direction LPF shown in FIG. 58.
Figure 61C:
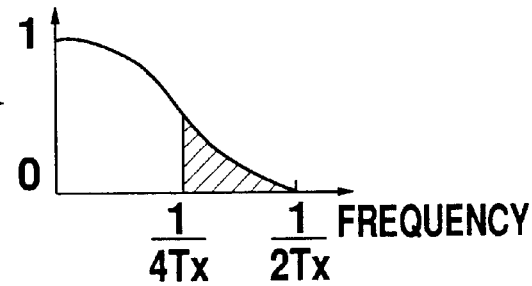
Figure 61B:
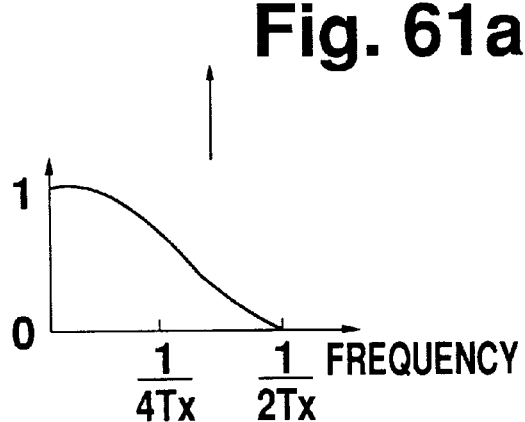

Then, the frequency characteristics of the horizontal direction LPF 703 and the vertical direction LPF 704 will now be described. FIG. 60*b* shows the frequency characteristics of the horizontal direction LPF 703, and FIG. 61*b* shows the frequency characteristics of the vertical direction LPF 704. FIG. 60*a* and FIG. 61*a* show respective frequency bands in the horizontal and vertical directions of an original image. FIG. 60*c* and FIG. 61*c* show respective pass bands of the horizontal and vertical direction LPFs 703 and 704. In FIGS. 60*a* to 60*c* and FIGS. 61*a* to 61*c*, Tx represents a sampling period in the horizontal direction of original image data stored in the image memory 702 and Ty represents a sampling period in the vertical direction. In this embodiment, the data are thinned to ¼ pixels in the horizontal direction and to ½ lines in the vertical direction, and the sampling frequency after the thinning is ¼Tx in the horizontal direction and ½Ty in the vertical direction. Hence, the hatched areas in FIG. 60*c* and FIG. 61*c* become aliasing noise. However, when the above-described LPFs are not used, the hatched areas in FIG. 60*a* and FIG. 61*a* become the aliasing noise. Therefore, by applying the horizontal and vertical direction LPFs, remaining aliasing noise can be considerably reduced. Accordingly, deterioration of sharpness is reduced, and the multipicture with high image quality can be obtained.

Further, in this embodiment, since the above-described thinning filters are applied not to the input data of the image memory but the output data of the image memory, the input data are kept to be stored in the image memory as it is. Hence, in this device, a function or means for outputting the data of the image memory as it is without applying the thinning filter processing and a function or means for forming a same 2 image multipicture (a picture composed of the two same reduced pictures arranged) or a same 4 image multipicture (a picture composed of the same reduced pictures arranged in 2×2 pieces) from the data of the image memory can be added.

Figure 62:
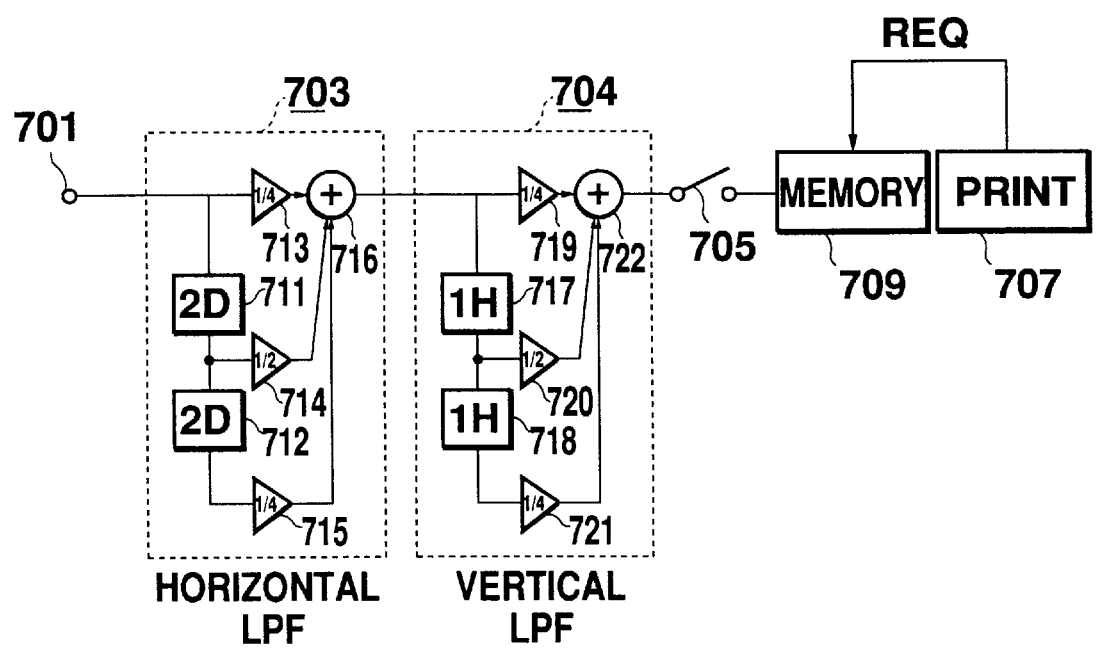
FIG. 62 is a block diagram of an embodiment 5-2 of a multipicture formation device for use in a video printer according to the present invention.
Figure 63:
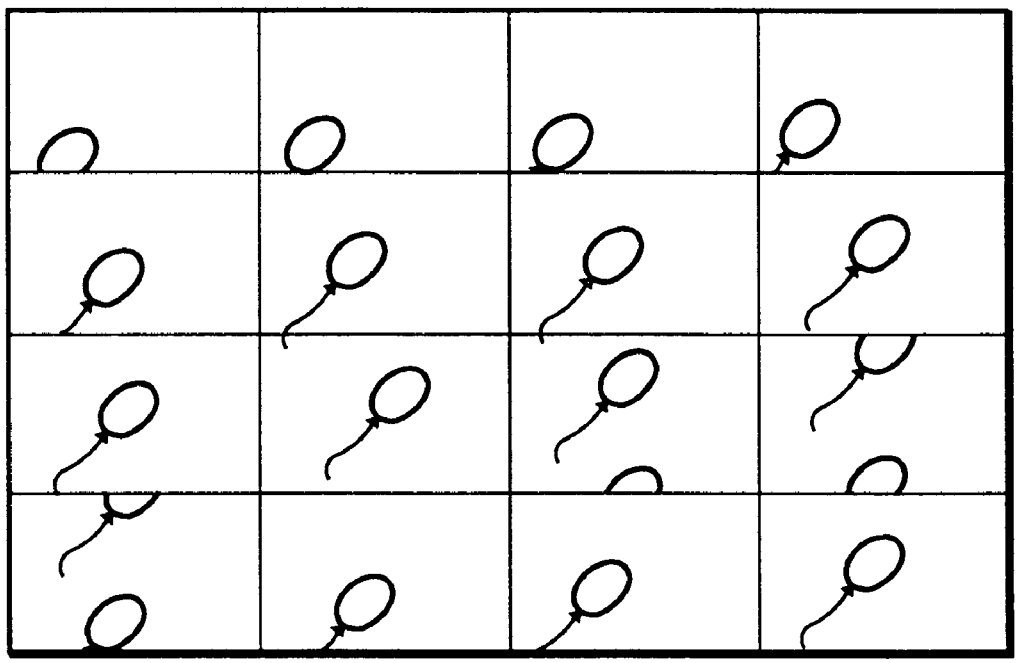
FIG. 63 is a schematic view of one example of a 16 multipicture formed in the device shown in FIG. 62.

In FIG. 62, there is shown the embodiment 5-2 of a different 16 image multipicture formation device for use in a video printer or the like according to the present invention, having the same construction as the embodiment 5-1 shown in FIG. 58, except that in place of the image memory 702 and the register 706 of the embodiment 5-1, an image memory 709 is provided between the thinning switch 705 and the printer 707. Next, the operation of the multipicture formation device described above will now be described. The video signals input to the input terminal 701 are directly input to the horizontal direction LPF 703 and the image data are consecutively processed in the horizontal direction LPF 703, vertical direction LPF 704 and thinning switch 705 in the same manner as the embodiment 5-1 described above. Then, one frame of 16 pieces of any images selected from the thinned data are stored in the image memory 709. There is shown in FIG. 63 one example of the images stored in the image memory 709. In this embodiment, different from the embodiment 5-1, the mutually different 16 pieces of images can be stored in the image memory 709. The image data stored in the image memory 709 are successively output in order in response to the request signal REQ output from the printer 707 and the readout data are printed out by the printer 707. In this embodiment, a different 16 image multipicture (a picture composed of different reduced pictures arranged in 4×4 pieces) can be formed.

Figure 64:
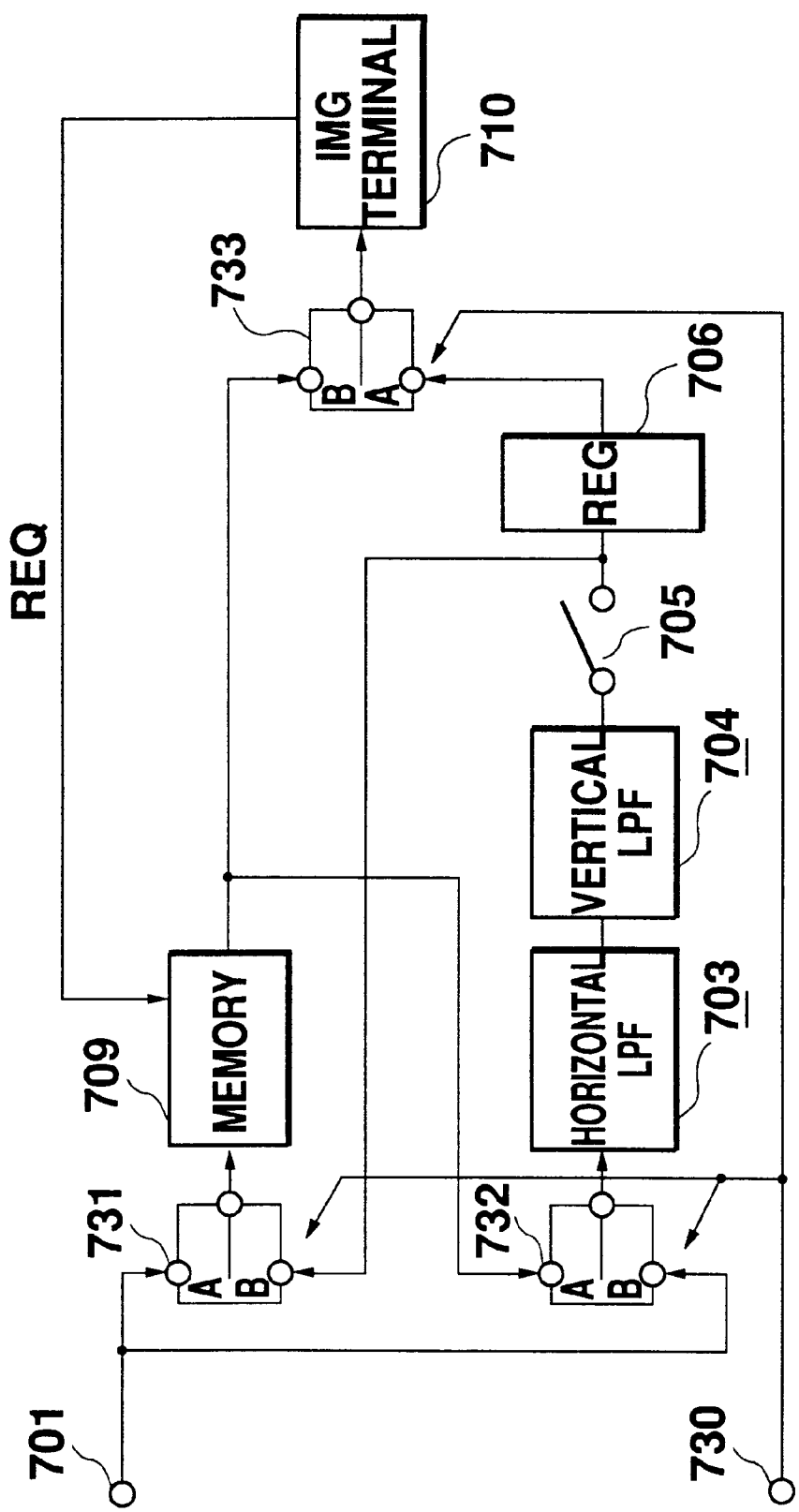
FIG. 64 is a block diagram of an embodiment 5-3 of a multipicture formation device in an image processor according to the present invention.
Figure 65:
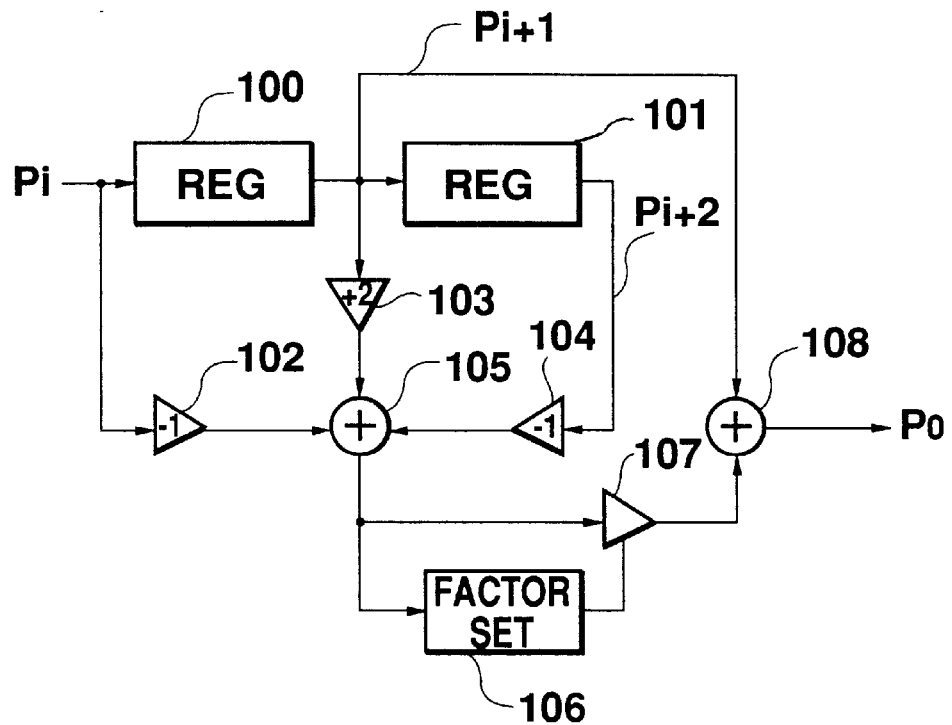
FIG. 65 is a block diagram of a conventional outline correction circuit.
Figure 66:
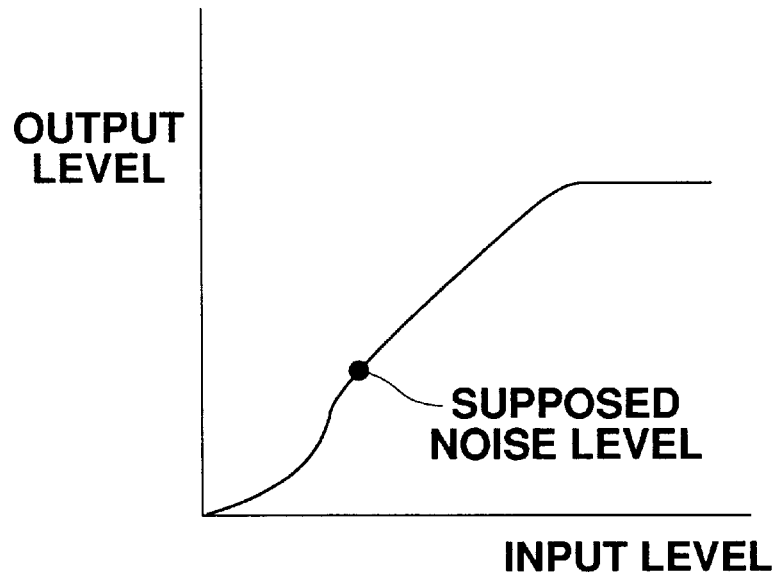
FIG. 66 is a graphical representation showing a relationship between an input level and an output level of a multiplier shown in FIG. 65.
Figure 67:
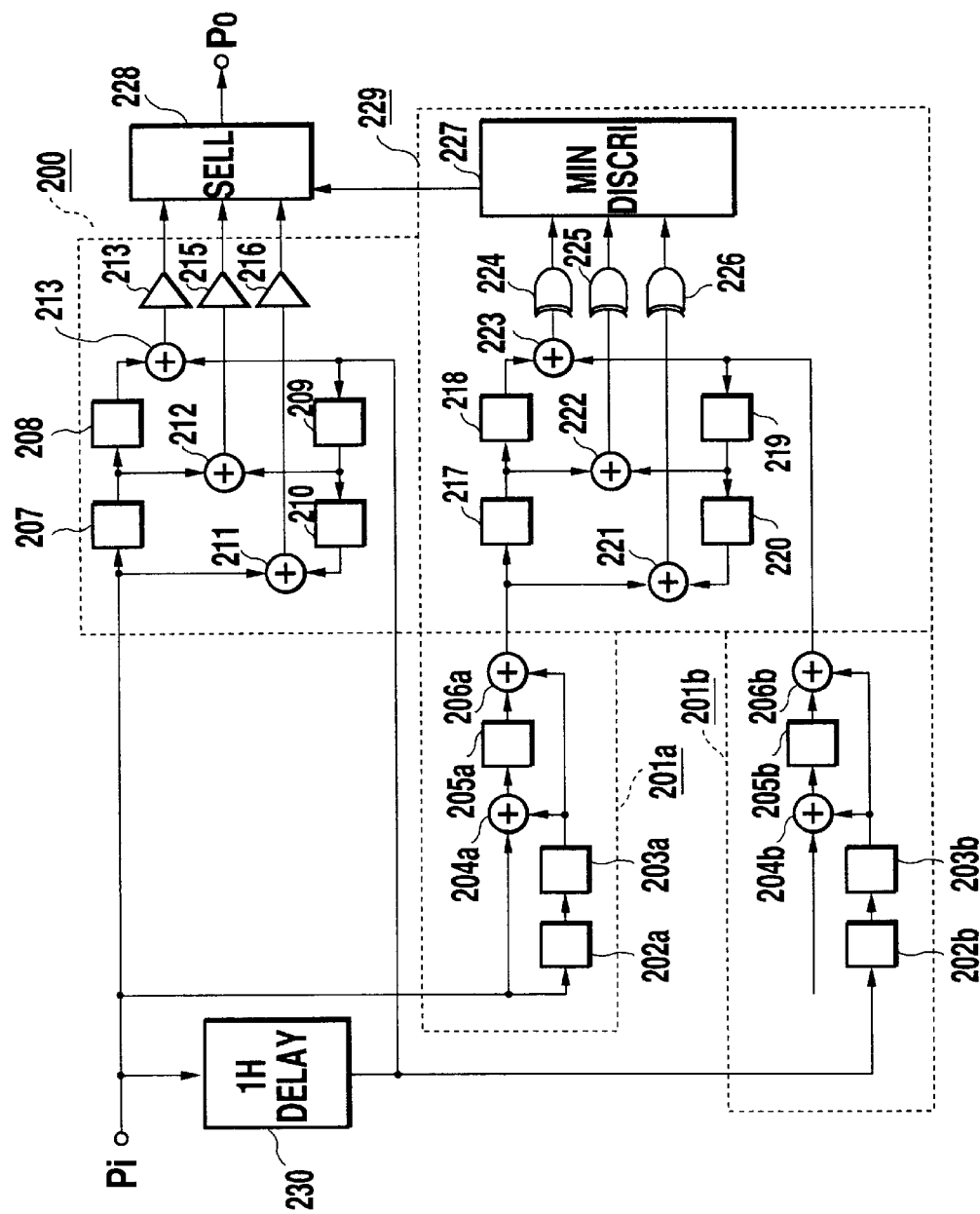
FIG. 67 is a block diagram of a conventional pixel interpolation circuit.
Figure 68:
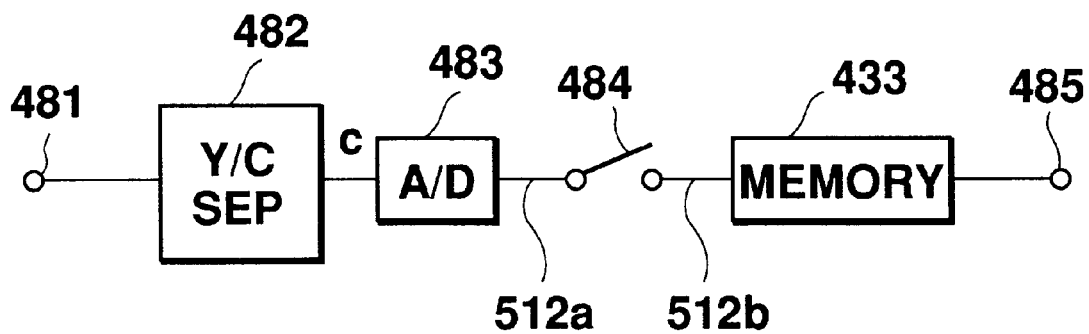
FIG. 68 is a block diagram of a conventional pixel interpolation device.
Figure 69:
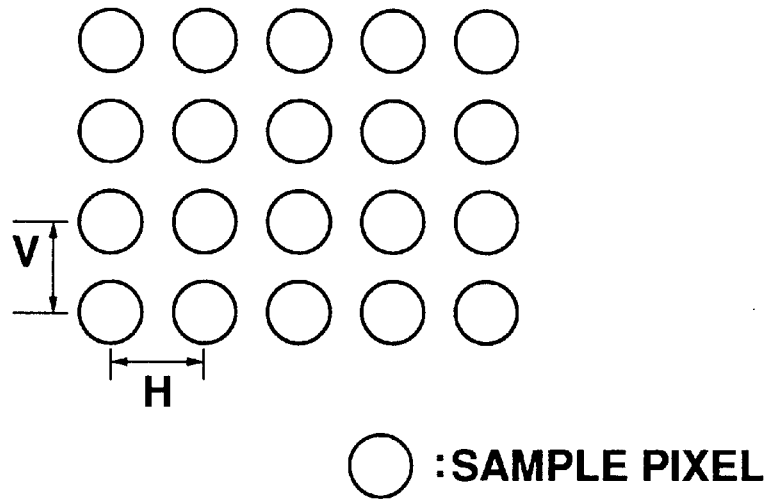
FIG. 69 is a schematic view of a pixel arrangement of signals shown in FIG. 68.
Figure 70:
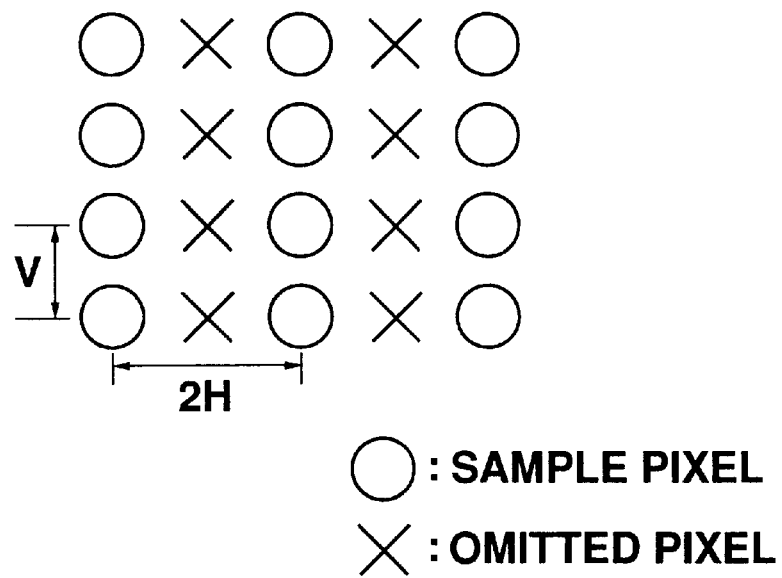
FIG. 70 is a schematic view of a pixel arrangement of thinned signals shown in FIG. 68.
Figure 71:
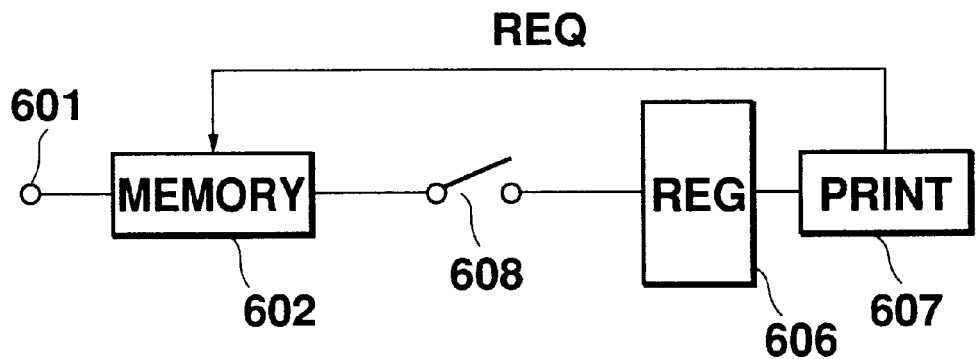
FIG. 71 is a block diagram of a conventional multipicture formation device.
Figure 72:
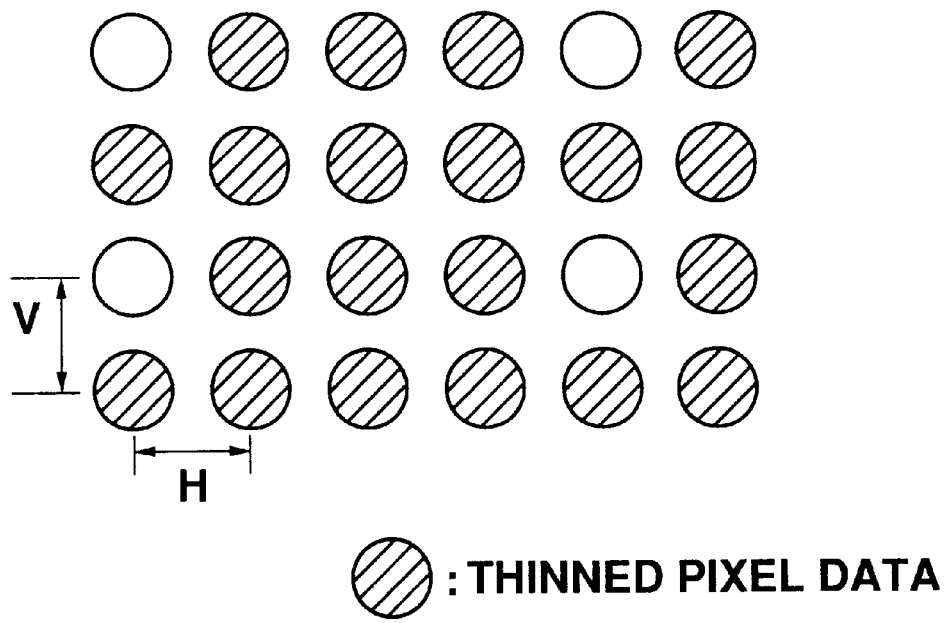
FIG. 72 is a schematic view showing an arrangement of thinned pixels for a 16 multipicture formation in the device shown in FIG. 71.
Figure 73A:
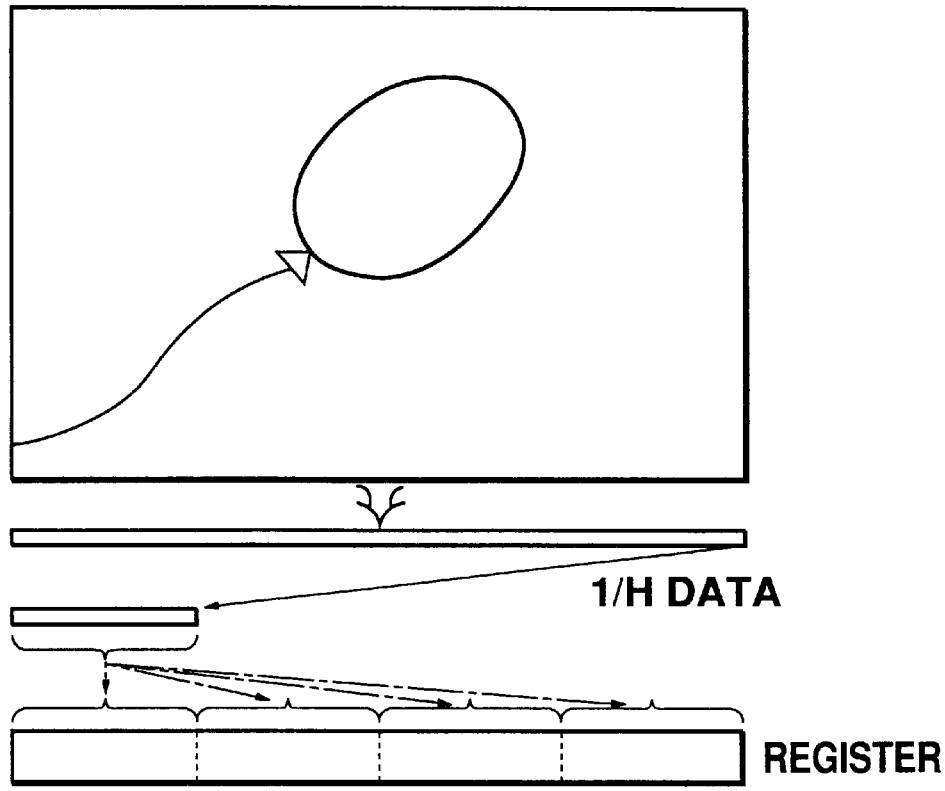
FIGS. 73a and 73b are schematic views for explaining a 16 multipicture formation process in the device shown in FIG. 71.
Figure 73B:
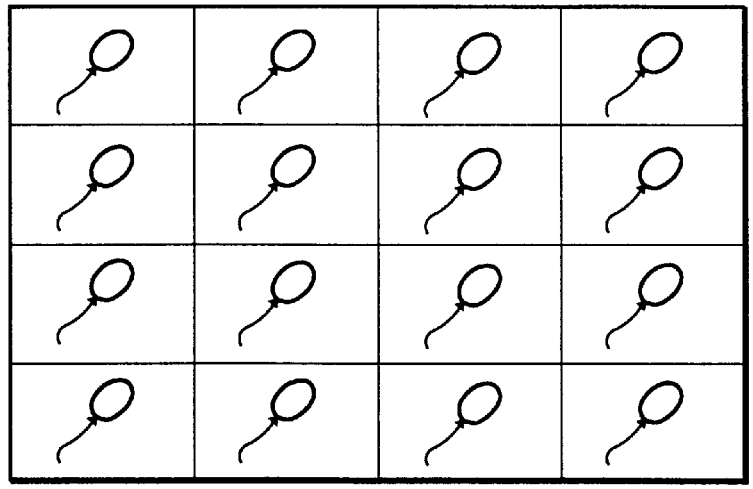

In FIG. 64, there is shown the embodiment 5-3 of a 16 multipicture formation device having a same 16 multipicture formation function of the embodiment 5-1 and a different 16 multipicture formation function of the embodiment 5-2 for use in a video printer or the like according to the present invention. In this embodiment, as shown in FIG. 64, in addition to the horizontal direction LPF 703, the vertical direction LPF 704, the thinning switch 705, the register 706 and the image memory 709 of the embodiment 5-2, multipicture formation device further includes another input terminal 730 for inputting a same multipicture/different multipicture switching signal from the outside, three selectors 731, 732 and 733 and an image terminal device 710 such as a video printer, a monitor or the like. The selector 731 selects either the input data input from the input terminal 701 or the output of the thinning switch 705 to output the selected data to the image memory 709. The selector 732 selects either the output of the image memory 709 or the input data from the input terminal 701 to output the selected data to the horizontal direction LPF 703. The selector 733 selects either the output of the register 706 or the output of the image memory 709 to output the selected data to the image terminal device 710. The selections of the selectors 731, 732 and 733 are switched depending on the same multipicture/different multipicture switching signal.

Next, the operation of the multipicture formation device described above will now be described. When the same multipicture/different multipicture switching signal designates the same 16 multipicture, the selectors 731, 732 and 733 selects the A side terminals, and the same multipicture/different multipicture switching signal designates the different 16 multipicture, the selectors 731, 732 and 733 selects the B side terminals.

First, when the same multipicture/different multipicture switching signal selecting the same 16 image multipicture is input to the input terminal 730, all selectors 731, 732 and 733 select the A side terminals. The video signals input to the input terminal 701 are once stored in the image memory 709, and then the image data read out of the image memory 709 are consecutively input to the horizontal direction LPF 703, the vertical direction LPF 704, the thinning switch 705, the register 706 and the image terminal device 710 and are processed therein, respectively. In this mode, the operation is performed in the same manner as the embodiment 5-1 described above as shown in FIG. 58.

Next, when the same multipicture/different multipicture switching signal selecting the different 16 multipicture is input to the input terminal 730, all selectors 731, 732 and 733 select the B side terminals. The video signals input to the input terminal 701 are directly and consecutively input to the horizontal direction LPF 703, the vertical direction LPF 704 and the thinning switch 705, and are processed therein, respectively. Then, the output data of the thinning switch 705 are input to the image memory 709 and are stored therein, and the data read out of the image memory 709 are input to the image terminal device 710. In this mode, the operation is carried out in the same manner as the embodiment 5-2 described above as shown in FIG. 62.

As described above, in this embodiment, by using the same multipicture/different multipicture switching signal, both the same 16 multipicture and the different 16 image multipicture can be formed.

According to the present invention, as described above, when the image data are thinned to ¼ pixels in the horizontal direction and to ½ lines in the vertical direction, by applying the aforementioned horizontal direction LPF and vertical direction LPF, the aliasing noise can be reduced without dropping the sharpness of the image. As a result, the multiimage having the high image quality can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A pixel interpolation circuit for calculating interpolation pixel data from quantized two-dimensional image data, comprising:

first means for inputting original digital image data, including actual pixel values taken from an originally input image;

second means for extracting some of the actual pixel values taken from the originally input image as pixel data required for interpolation, from the original digital image data, where the pixel data required for interpolation includes every other pixel in two consecutive horizontal reference lines and excludes any interpolated pixels;

third means for calculating a threshold value from the pixel data required for interpolation;

fourth means for binary-coding the pixel data required for interpolation based upon the threshold value to determine a two-dimensional direction of pixel value change;

fifth means for discriminating an interpolation direction based upon the binary coded pixel data required for interpolation and the two-dimensional direction of pixel value change;

sixth means for selecting a plurality of interpolation reference pixels from the original digital image data, in the interpolation direction; and seventh means for calculating the interpolation pixel data from the plurality of interpolation reference pixels.

2. The pixel interpolation circuit of claim 1, wherein the pixel data required for interpolation includes a plurality of pixels proximately located to an input pixel of the digital image data.

3. The pixel interpolation circuit of claim 2, wherein the plurality of pixels include six pixels proximate to the input pixel.

4. The pixel interpolation circuit of claim 1, wherein the second means includes a delay circuit for delaying the input pixel to extract the pixel data required for interpolation.

5. The pixel interpolation circuit of claim 4, wherein the delay circuit generates a plurality of pixels for every other input pixel of the digital image data.

6. The pixel interpolation circuit of claim 4, wherein the seventh means calculates the interpolation pixel data from two proximately located interpolation reference pixels.

7. The pixel interpolation circuit of claim 6, wherein the two proximately located interpolation reference pixels are relatively located in one of three selectable interpolation directions.

8. The pixel interpolation circuit of claim 7, wherein the three selectable interpolation directions include vertical, right slanted and left slanted.

9. The pixel interpolation circuit of claim 1, wherein the fifth means includes a prestored interpolation table from which the interpolation direction is discriminated.

10. The pixel interpolation circuit of claim 9, wherein the binary coded pixel data required for interpolation are used as addresses by the fifth means to access the interpolation direction from the prestored interpolation table.

11. The pixel interpolation circuit of claim 1, wherein the interpolation direction is one of a vertical direction, a right slanted direction and a left slanted direction.

12. The pixel interpolation circuit of claim 1, wherein the third means calculates the threshold value by averaging a maximum value and a minimum value from the digital image data.

13. The pixel interpolation circuit of claim 1, wherein the seventh means calculates the interpolation pixel data by averaging the two proximately located reference pixels.

14. A pixel interpolation circuit for calculating interpolation pixel data from quantized two-dimensional image data, comprising:

first means for inputting original digital image data, including actual pixel values taken from an originally input image;

second means for extracting some of the actual pixel values taken from the originally input image as pixel data required for interpolation, from the original digital image data where the pixel data required for interpolation excludes any interpolated pixels;

third means for selecting predetermined pixel data from the pixel data required for interpolation;

fourth means for calculating a threshold value from the predetermined pixel data;

fifth means for binary-coding the predetermined pixel data based upon the threshold value to determine a two-dimensional direction of pixel value change;

sixth means for discriminating an interpolation direction based upon the binary coded predetermined pixel data and the two-dimensional direction of pixel value change;

seventh means for selecting a plurality of reference pixels from the original digital image data, in the interpolation direction; and eighth means for calculating the interpolation pixel data from the plurality of reference pixels.

15. The pixel interpolation circuit of claim 14, wherein the pixel data required for extraction includes a plurality of pixels proximately located to an pixel of the input digital image data.

16. The pixel interpolation circuit of claim 15, wherein the plurality of pixels include six pixels proximate to the input pixel.

17. The pixel interpolation circuit of claim 14, wherein the second means includes a delay circuit for delaying the input pixel to extract the pixel data required for interpolation.

18. The pixel interpolation circuit of claim 17, wherein the delay circuit generates a plurality of pixels for every other input pixel of the digital image data.

19. The pixel interpolation circuit of claim 17, wherein the eighth means calculates the interpolation pixel data from two proximately located interpolation reference pixels.

20. The pixel interpolation circuit of claim 19, wherein the two proximately located interpolation reference pixels are relatively located in one of three selectable interpolation directions.

21. The pixel interpolation circuit of claim 20, wherein the three selectable interpolation directions include vertical, right slanted and left slanted.

22. The pixel interpolation circuit of claim 14, wherein the sixth means includes a prestored interpolation table from which the interpolation direction is discriminated.

23. The pixel interpolation circuit of claim 22, wherein the binary coded predetermined pixel data are used as addresses by the sixth means to access the interpolation direction from the prestored interpolation table.

24. The pixel interpolation circuit of claim 14, wherein the interpolation direction is one of a vertical direction, a right slanted direction and a left slanted direction.

25. The pixel interpolation circuit of claim 14, wherein the fourth means calculates the threshold value by averaging a maximum value and a minimum value from the digital image data.

26. The pixel interpolation circuit of claim 14, wherein the eighth means calculates the interpolation pixel data by averaging the two proximately located reference pixels.

27. A pixel interpolation circuit for calculating interpolation pixel data from two-dimensional image data, comprising:

input means for inputting original digital image data, including actual pixel values taken from an originally input image;

extracting means for extracting some of the actual pixel values taken from the originally input image as pixel data required for interpolation, from the original digital image data, wherein the pixel data required for interpolation excludes any interpolated pixels;

memory means for storing a plurality of interpolation direction results; and selecting means for selecting between the plurality of interpolation direction results based upon the pixel data required for interpolation and a two-dimensional direction of pixel value change and thereby designating a portion of the pixel data required for interpolation, in the selected interpolation direction, from which the interpolation pixel data is calculated.

28. The pixel interpolation circuit of claim 27, wherein the pixel data required for interpolation includes a plurality of pixels proximately located to an input pixel of the digital image data.

29. The pixel interpolation circuit of claim 28, wherein the plurality of pixels include six pixels proximate to the input pixel.

30. The pixel interpolation circuit of claim 27, wherein the extracting means includes a delay circuit for delaying the input pixel to extract the pixel data required for interpolation.

31. The pixel interpolation circuit of claim 30, wherein the delay circuit generates a plurality of pixels for every other input pixel of the digital image data.

32. The pixel interpolation circuit of claim 30, further comprising:

calculation means for calculating the interpolation pixel data from two proximately located reference pixels.

33. The pixel interpolation circuit of claim 32, wherein the two proximately located reference pixels are relatively located in one of three selectable interpolation directions.

34. The pixel interpolation circuit of claim 33, wherein the three selectable interpolation directions include vertical, right slanted and left slanted.

35. The pixel interpolation circuit of claim 32, wherein the calculation means calculates the interpolation pixel data by averaging the two proximately located reference pixels.

36. The pixel interpolation circuit of claim 27, wherein the memory means includes a prestored interpolation table from which the interpolation direction result is selected.

37. The pixel interpolation circuit of claim 36, wherein the pixel data required for interpolation are used as addresses by the selection means to access an interpolation direction result from the prestored interpolation table.

38. The pixel interpolation circuit of claim 27, wherein the interpolation direction results include a vertical direction, a right slanted direction and a left slanted direction.

39. A pixel interpolation circuit for calculating interpolation pixel data from two-dimensional image data, including actual pixel values taken from an originally input image, comprising:

first means for selecting pixel data required for interpolation from the two-dimensional image data, wherein the pixel data required for interpolation excludes any interpolated pixels;

memory means for storing a plurality of interpolation direction results; and selection means for selecting one of the stored interpolation direction results based upon the pixel data required for interpolation, and a two-dimensional direction of pixel value change and thereby designating a portion of the pixel data required for interpolation, in the selected interpolation direction, from which the interpolation pixel data is calculated.

40. The pixel interpolation circuit of claim 39, wherein the pixel data required for interpolation includes a plurality of pixels proximately located to an input pixel of the image data.

41. The pixel interpolation circuit of claim 40, wherein the plurality of pixels include six pixels located proximate to the input pixel.

42. The pixel interpolation circuit of claim 39, wherein the first means includes a delay circuit for delaying an input pixel to extract and select a plurality of pixels.

43. The pixel interpolation circuit of claim 42, wherein the delay circuit generates a plurality of pixels for every other input pixel of the input image data.

44. The pixel interpolation circuit of claim 42, wherein the selection means further includes calculation means for calculating the interpolation pixel data from two proximately located reference pixels.

45. The pixel interpolation circuit of claim 44, wherein the two proximately located reference pixels are relatively located in one of three selectable interpolation directions.

46. The pixel interpolation circuit of claim 45, wherein the three selectable interpolation directions include vertical, right slanted and left slanted.

47. The pixel interpolation circuit of claim 44, wherein the calculation means calculates the interpolation pixel data by averaging the two proximately located reference pixels.

48. The pixel interpolation circuit of claim 39, wherein the memory means includes a prestored interpolation table from which the interpolation direction is selected.

49. The pixel interpolation circuit of claim 48, wherein the pixel data required for interpolation are used as addresses by the selection means to access the interpolation direction from the prestored interpolation table.

50. The pixel interpolation circuit of claim 39, wherein the interpolation direction is one of a vertical direction, a right slanted direction and a left slanted direction.

51. A receiver, including a pixel interpolation circuit, of a transceiver which transmits quantized image data having an error correction code, including a device for replacing uncorrected error data of received data with interpolation pixel data obtained by the pixel interpolation circuit, the pixel interpolation circuit comprising:

first means for inputting original digital image data, including actual pixel values taken from an originally input image;

second means for extracting some of the actual pixel values taken from the originally input image as pixel data required for interpolation, from the original digital image data, where the pixel data required for interpolation includes every other pixel in two consecutive horizontal reference lines and excludes any interpolated pixels;

third means for calculating a threshold value from the pixel data required for interpolation;

fourth means for binary-coding the pixel data required for interpolation based upon the threshold value to determine a two-dimensional direction of pixel value change;

fifth means for discriminating an interpolation direction based upon the binary coded pixel data required for interpolation and the two-dimensional direction of pixel value change;

sixth means for selecting a plurality of reference pixels from the original digital image data, in the interpolation direction; and seventh means for calculating the interpolation pixel data from the plurality of reference pixels.

52. The receiver of claim 51, wherein the pixel data required for interpolation includes a plurality of pixels proximately located to an pixel of the input digital image data.

53. The receiver of claim 52, wherein the plurality of pixels include six pixels proximate to the input pixel.

54. The receiver of claim 50, wherein the second means includes a delay circuit for delaying the input pixel to extract the pixel data required for interpolation.

55. The receiver of claim 54, wherein the delay circuit generates a plurality of pixels for every other input pixel of the digital image data.

56. The receiver of claim 54, wherein the seventh means calculates the interpolation pixel data from two proximately located interpolation reference pixels.

57. The receiver of claim 56, wherein the two proximately located wherein reference pixels are relatively located in one of three selectable interpolation directions.

58. The receiver of claim 57, wherein the three selectable interpolation directions include vertical, right slanted and left slanted.

59. The receiver of claim 51, wherein the fifth means includes a prestored interpolation table from which the interpolation direction is discriminated.

60. The receiver of claim 59, wherein the binary coded pixel data required for interpolation are used as addresses by the fifth means to access the interpolation direction from the prestored interpolation table.

61. The receiver of claim 51, wherein the interpolation direction is one of a vertical direction, a right slanted direction and a left slanted direction.

62. The receiver of claim 51, wherein the third means calculates the threshold value by averaging a maximum value and a minimum value from the digital image data.

63. The receiver of claim 51, wherein the seventh means calculates the interpolation pixel data by averaging the two proximately located reference pixels.

64. A receiver of a transceiver which transmits quantized image data having an error correction code, including a device for replacing uncorrected error data of received data with interpolation pixel data obtained by a pixel interpolation circuit, the pixel interpolation circuit comprising:

first means for inputting original digital image data, including actual pixel values taken from an originally input image;

second means for extracting some of the actual pixel values taken from the originally input image as pixel data required for interpolation, from the original digital image data, where the pixel data required for interpolation includes every other pixel in two consecutive horizontal reference lines and excludes any interpolated pixels;

third means for selecting predetermined pixel data from the pixel data required for interpolation;

fourth means for calculating a threshold value from the predetermined pixel data;

fifth means for binary-coding the predetermined pixel data based upon the threshold value to determine a two-dimensional direction of pixel value change;

sixth means for discriminating an interpolation direction based upon the binary coded predetermined pixel data and the two-dimensional direction of pixel value change;

seventh means for selecting a plurality of reference pixels from the original digital image data, in the interpolation direction; and eighth means for calculating the interpolation pixel data from the plurality of reference pixels.

65. The receiver of claim 64, wherein the extracted pixel data required for interpolation includes a plurality of pixels proximately located to an pixel of the input digital image data.

66. The receiver of claim 65, wherein the plurality of pixels include six pixels proximate to the input pixel.

67. The receiver of claim 64, wherein the second means includes a delay circuit for delaying the input pixel to extract the pixel data required for interpolation.

68. The receiver of claim 67, wherein the delay circuit generates a plurality of pixels for every other input pixel of the digital image data.

69. The receiver of claim 67, wherein the eighth means calculates the interpolation pixel data from two proximately located interpolation reference pixels.

70. The receiver of claim 69, wherein the two proximately located interpolation reference pixels are relatively located in one of three selectable interpolation directions.

71. The receiver of claim 70, wherein the three selectable interpolation directions include vertical, right slanted and left slanted.

72. The receiver of claim 64, wherein the sixth means includes a prestored interpolation table from which the interpolation direction is discriminated.

73. The receiver of claim 72, wherein the binary coded predetermined pixel data are used as addresses by the sixth means to access the interpolation direction from the prestored interpolation table.

74. The receiver of claim 64, wherein the selectable interpolation direction is one of a vertical direction, a right slanted direction and a left slanted direction.

75. The receiver of claim 64, wherein said fourth means calculates the threshold value by averaging a maximum value and a minimum value from the digital image data.

76. The receiver of claim 64, wherein the eighth means calculates the interpolation pixel data by averaging the two proximately located reference pixels.

* * * * *